United States Patent [19]
Jacobs

[11] Patent Number: 5,768,142
[45] Date of Patent: Jun. 16, 1998

[54] METHOD AND APPARATUS FOR STORING AND SELECTIVELY RETRIEVING PRODUCT DATA BASED ON EMBEDDED EXPERT SUITABILITY RATINGS

[75] Inventor: Herbert H. Jacobs, LaJolla, Calif.

[73] Assignee: American Greetings Corporation, Cleveland, Ohio

[21] Appl. No.: 455,538

[22] Filed: May 31, 1995

[51] Int. Cl.⁶ .............................. G06F 17/00; G06G 7/48
[52] U.S. Cl. .................. 364/479.01; 364/479.02; 364/479.03; 364/474.04; 364/479.06
[58] Field of Search ................ 364/499, 479.03, 364/479, 468, 401, 479.01, 479.02, 479.05, 479.06, 479.11; 235/381; 395/54, 155, 156, 157, 158, 159, 160, 161

[56] References Cited

U.S. PATENT DOCUMENTS

| Re. 32,115 | 4/1986 | Lockwood et al. | 235/381 |
|---|---|---|---|
| Re. 33,316 | 8/1990 | Katsuta et al. | 364/521 |
| 2,089,563 | 8/1937 | Luhrs | 229/8 |
| 3,454,956 | 7/1969 | Icenbice, Jr. et al. | 346/104 |
| 3,609,250 | 9/1971 | Morris | 179/100 |
| 3,637,934 | 1/1972 | Brewster | 178/6.6 A |
| 3,669,814 | 6/1972 | Faltin | 161/37 |

(List continued on next page.)

FOREIGN PATENT DOCUMENTS

| 1278862 | 5/1986 | Canada . |
|---|---|---|
| 2033966 | 1/1991 | Canada . |
| 2041298 | 4/1991 | Canada . |
| 79302164 | 10/1979 | European Pat. Off. . |
| 79104527 | 11/1979 | European Pat. Off. . |
| 83108181 | 8/1983 | European Pat. Off. . |
| 83306220 | 10/1983 | European Pat. Off. . |
| 89819937 | 1/1989 | European Pat. Off. . |
| 90313917 | 12/1990 | European Pat. Off. . |
| 91309669 | 10/1991 | European Pat. Off. . |

(List continued on next page.)

OTHER PUBLICATIONS

"Compositing Digital Images"; Porter, Thomas; Duff, Tom; *Computer Graphics;* vol. 18, No. 3; Jul. 1984; pp. 253–259.
"Now PC Users Say It With 'Voice Notes'"; William H. Bulkeley *Wall Street Journal;* pp. 81, 85.
"Touch–Screens for Intuitive Input", M. David Stone, *PC Magazine*, Aug. 1987, pp. 183–192.
"Touch Screens: A Viable Mouse Alternative", *PC Week*, p. 90.
"Man to Machine via Screen", *PC Week*, p. 41.
"Autoclerk" *ABA Journal*, Apr. 1992.
Gay groups put their cards on the table, so Hallmark lifts ban on using 'lesbian'; Hodges, Michael, *Detroit News*, Oct. 28, 1991, p. 1C.
"Toys, gifts for upcoming holiday shopping lists", Magid, Judy, *Salt Lake City Tribune*, Oct. 14, 1991.

(List continued on next page.)

*Primary Examiner*—Reba I. Elmore
*Assistant Examiner*—Ramesh Patel
*Attorney, Agent, or Firm*—Jones, Day, Reavis & Pogue

[57] ABSTRACT

An improved apparatus and method of storing, selectively retrieving and delivering product data includes a database of product data files and a computer that causes the data to be retrieved, displayed and delivered to the customer. The customer is asked to specify certain criteria relating to the kind of product he desires. Stored with the data relating to each product is an expert judgment factor that indicates how well the product would fill each possible criteria specified by the customer. Upon receiving the criteria entered by the customer, the computer calculates a suitability rating for each product by combining those judgment factors that relate to the customer entered criteria. The computer then presents to the customer the data relating to a limited number of the highest rated products. The customer selects the product that he wants and is preferably allowed to make changes to the product data. The computer then causes the product or data relating to the product to be delivered to the customer.

43 Claims, 37 Drawing Sheets

U.S. PATENT DOCUMENTS

| | | | |
|---|---|---|---|
| 3,688,276 | 8/1972 | Quinn | 340/172.5 |
| 3,704,362 | 11/1972 | Kolby et al. | 235/151.13 |
| 3,705,384 | 12/1972 | Wahlberg | 340/149 |
| 3,727,038 | 4/1973 | Ritter et al. | 235/151.1 |
| 3,757,037 | 9/1973 | Bialek | 178/6.6 A |
| 3,800,932 | 4/1974 | Dana | 194/10 |
| 3,819,854 | 6/1974 | Kolb | 18/6.7 R |
| 3,828,904 | 8/1974 | Naitou et al. | 194/10 |
| 3,829,833 | 8/1974 | Freeny, Jr. | 340/149 |
| 3,864,708 | 2/1975 | Allen | 354/290 |
| 3,898,930 | 8/1975 | Ikegami et al. | 101/316 |
| 3,911,397 | 10/1975 | Freeny, Jr. | 340/147 |
| 3,924,065 | 12/1975 | Freeny, Jr. | 178/66 |
| 3,932,036 | 1/1976 | Ueda et al. | 355/40 |
| 3,938,190 | 2/1976 | Semmlow et al. | 360/72 |
| 3,943,335 | 3/1976 | Kinker et al. | 235/61.7 B |
| 3,946,220 | 3/1976 | Brobeck et al. | 235/168 |
| 3,949,375 | 4/1976 | Ciarlo | 340/172.5 |
| 3,970,992 | 7/1976 | Boothroyd et al. | 340/172.5 |
| 3,990,710 | 11/1976 | Hughes | 274/1 R |
| 4,007,362 | 2/1977 | Sindermann | 235/151 |
| 4,023,013 | 5/1977 | Kinker | 235/61.7 B |
| 4,034,839 | 7/1977 | Lee | 194/10 |
| 4,041,467 | 8/1977 | Cota et al. | 364/900 |
| 4,058,056 | 11/1977 | Rubin | 101/93.19 |
| 4,069,896 | 1/1978 | Rottmann et al. | 186/1 B |
| 4,070,223 | 1/1978 | Stalzer | 156/264 |
| 4,070,698 | 1/1978 | Curtis et al. | 360/12 |
| 4,071,911 | 1/1978 | Mazur | 364/900 |
| 4,073,368 | 2/1978 | Mustapick | 186/1 C |
| 4,085,445 | 4/1978 | Blevins et al. | 364/900 |
| 4,096,933 | 6/1978 | Massa | 194/100 |
| 4,112,421 | 9/1978 | Freeny, Jr. | 343/112 |
| 4,144,656 | 3/1979 | Podkopaev et al. | 35/9 |
| 4,160,271 | 7/1979 | Grayson et al. | 364/400 |
| 4,173,024 | 10/1979 | Miller | 358/115 |
| 4,190,819 | 2/1980 | Burgyan | 340/23 |
| 4,193,114 | 3/1980 | Benini | 364/200 |
| 4,209,588 | 6/1980 | Freeny, Jr. | 343/112 |
| 4,209,787 | 6/1980 | Freeny, Jr. | 343/112 |
| 4,216,286 | 8/1980 | Greene et al. | 430/203 |
| 4,220,991 | 9/1980 | Hamano et al. | 364/405 |
| 4,224,601 | 9/1980 | Davidson | 346/150 |
| 4,232,317 | 11/1980 | Freeny, Jr. | 343/112 |
| 4,232,334 | 11/1980 | Dyson | 358/93 |
| 4,239,380 | 12/1980 | Goldsholl | 355/52 |
| 4,247,759 | 1/1981 | Yuris et al. | 235/381 |
| 4,260,229 | 4/1981 | Bloomstein | 352/50 |
| 4,261,012 | 4/1981 | Maloomian | 358/93 |
| 4,265,371 | 5/1981 | Desai et al. | 222/70 |
| 4,270,182 | 5/1981 | Asija | 364/900 |
| 4,275,449 | 6/1981 | Aish | 364/512 |
| 4,300,040 | 11/1981 | Gould et al. | 235/381 |
| 4,305,131 | 12/1981 | Best | 364/521 |
| 4,308,017 | 12/1981 | Laughon et al. | 434/169 |
| 4,318,121 | 3/1982 | Taite et al. | 358/22 |
| 4,319,336 | 3/1982 | Anderson et al. | 364/900 |
| 4,328,544 | 5/1982 | Baldwin et al. | 364/405 |
| 4,329,710 | 5/1982 | Taylor | 358/81 |
| 4,339,134 | 7/1982 | Macheel | 273/138 |
| 4,354,613 | 10/1982 | Desai et al. | 221/4 |
| 4,358,824 | 11/1982 | Glickman et al. | 364/200 |
| 4,359,631 | 11/1982 | Lockwood et al. | 235/381 |
| 4,359,634 | 11/1982 | Saito et al. | 250/201 |
| 4,396,307 | 8/1983 | Shah et al. | 400/625 |
| 4,412,292 | 10/1983 | Sedam et al. | 364/479 |
| 4,414,467 | 11/1983 | Gould et al. | 235/381 |
| 4,414,896 | 11/1983 | Fischer | 101/211 |
| 4,417,322 | 11/1983 | Berry et al. | 364/900 |
| 4,417,722 | 11/1983 | Ishii et al. | 266/250 |
| 4,429,385 | 1/1984 | Cichelli et al. | 370/92 |
| 4,431,323 | 2/1984 | Kulow | 400/625 |
| 4,434,467 | 2/1984 | Scott | 364/400 |
| 4,435,772 | 3/1984 | Suzuki et al. | 364/520 |
| 4,438,326 | 3/1984 | Uchida | 235/379 |
| 4,441,160 | 4/1984 | Azcua et al. | 364/900 |
| 4,449,186 | 5/1984 | Kelly et al. | 364/407 |
| 4,458,802 | 7/1984 | Maciver et al. | 194/4 R |
| 4,459,676 | 7/1984 | Oguchi | 364/521 |
| 4,460,957 | 7/1984 | Eggebrecht et al. | 364/200 |
| 4,463,874 | 8/1984 | Friedman et al. | 221/238 |
| 4,467,349 | 8/1984 | Maloomian | 358/93 |
| 4,481,590 | 11/1984 | Otten | 364/479 |
| 4,484,304 | 11/1984 | Anderson et al. | 364/900 |
| 4,486,774 | 12/1984 | Maloomian | 358/93 |
| 4,488,244 | 12/1984 | Freeman | 364/525 |
| 4,489,389 | 12/1984 | Beckwith et al. | 364/522 |
| 4,495,582 | 1/1985 | Dessert et al. | 364/469 |
| 4,498,139 | 2/1985 | Malinovsky | 364/518 |
| 4,517,578 | 5/1985 | Tazaki | 346/140 |
| 4,519,037 | 5/1985 | Brodeur et al. | 364/400 |
| 4,519,522 | 5/1985 | McElwee | 221/13 |
| 4,520,451 | 5/1985 | McLaughlin | 364/900 |
| 4,528,643 | 7/1985 | Freeny, Jr. | 364/900 |
| 4,546,434 | 10/1985 | Gioello | 364/300 |
| 4,553,222 | 11/1985 | Kurland et al. | 364/900 |
| 4,559,598 | 12/1985 | Goldwasser et al. | 364/419 |
| 4,567,359 | 1/1986 | Lockwood | 235/381 |
| 4,575,813 | 3/1986 | Bartlett et al. | 364/900 |
| 4,577,206 | 3/1986 | Hibino | 346/139 |
| 4,591,281 | 5/1986 | Howard et al. | 400/126 |
| 4,591,983 | 5/1986 | Bennett et al. | 364/403 |
| 4,596,924 | 6/1986 | Watanabe | 235/379 |
| 4,598,376 | 7/1986 | Burton et al. | 364/470 |
| 4,598,810 | 7/1986 | Shore et al. | 194/205 |
| 4,599,598 | 7/1986 | Komoda et al. | 340/310 |
| 4,602,299 | 7/1986 | Saito | 360/60 |
| 4,608,662 | 8/1986 | Watanabe et al. | 364/900 |
| 4,610,200 | 9/1986 | Metso | 101/126 |
| 4,616,327 | 10/1986 | Rosewarne et al. | 364/518 |
| 4,623,292 | 11/1986 | Suzuki et al. | 414/114 |
| 4,623,964 | 11/1986 | Getz et al. | 364/401 |
| 4,625,275 | 11/1986 | Smith | 364/401 |
| 4,627,015 | 12/1986 | Stephens | 364/900 |
| 4,644,401 | 2/1987 | Gaskins | 358/183 |
| 4,646,250 | 2/1987 | Childress | 364/518 |
| 4,649,513 | 3/1987 | Martin et al. | 364/900 |
| 4,650,977 | 3/1987 | Couch | 235/379 |
| 4,652,998 | 3/1987 | Koze et al. | 364/412 |
| 4,654,799 | 3/1987 | Ogaki et al. | 364/479 |
| 4,655,026 | 4/1987 | Wigoda | 53/55 |
| 4,664,546 | 5/1987 | Rünzi | 400/624 |
| 4,668,150 | 5/1987 | Blumberg | 414/273 |
| 4,672,554 | 6/1987 | Ogaki | 364/479 |
| 4,674,041 | 6/1987 | Lemon et al. | 364/401 |
| 4,674,055 | 6/1987 | Ogaki et al. | 364/479 |
| 4,677,565 | 6/1987 | Ogaki et al. | 364/479 |
| 4,677,570 | 6/1987 | Taki | 364/518 |
| 4,683,536 | 7/1987 | Yamamoto | 364/408 |
| 4,699,532 | 10/1987 | Smith | 400/104 |
| 4,700,181 | 10/1987 | Maine et al. | 340/747 |
| 4,700,317 | 10/1987 | Watanabe et al. | 364/488 |
| 4,700,318 | 10/1987 | Ockman | 364/518 |
| 4,703,465 | 10/1987 | Parker | 369/30 |
| 4,710,885 | 12/1987 | Litteken | 364/518 |
| 4,712,174 | 12/1987 | Minkler, II | 364/200 |
| 4,714,936 | 12/1987 | Helinski et al. | 346/140 |
| 4,719,885 | 1/1988 | Nagano et al. | 123/179 |
| 4,722,053 | 1/1988 | Dubno et al. | 364/401 |
| 4,723,212 | 2/1988 | Mindrum et al. | 364/401 |
| 4,726,697 | 2/1988 | Maedge et al. | 400/625 |
| 4,727,589 | 2/1988 | Hirose et al. | 382/56 |

| | | | |
|---|---|---|---|
| 4,733,362 | 3/1988 | Haraguchi | 364/479 |
| 4,736,306 | 4/1988 | Christensen et al. | 364/513 |
| 4,740,904 | 4/1988 | Nagle | 364/520 |
| 4,745,560 | 5/1988 | Decker et al. | 364/519 |
| 4,750,122 | 6/1988 | Kaji et al. | 364/419 |
| 4,750,131 | 6/1988 | Martinez | 364/476 |
| 4,750,151 | 6/1988 | Baus | 364/900 |
| 4,764,867 | 8/1988 | Hess | 364/200 |
| 4,764,880 | 8/1988 | Pearl | 364/519 |
| 4,766,548 | 8/1988 | Cedrone et al. | 364/479 |
| 4,766,581 | 8/1988 | Korn et al. | 369/30 |
| 4,771,401 | 9/1988 | Kaufman et al. | 364/900 |
| 4,772,882 | 9/1988 | Mical | 340/709 |
| 4,773,009 | 9/1988 | Kucera et al. | 364/419 |
| 4,775,935 | 10/1988 | Yourick | 364/401 |
| 4,779,080 | 10/1988 | Coughlin et al. | 340/712 |
| 4,786,229 | 11/1988 | Henderson | 414/786 |
| 4,787,050 | 11/1988 | Suzuki | 364/479 |
| 4,789,147 | 12/1988 | Berger et al. | 270/1.1 |
| 4,789,907 | 12/1988 | Fischetti et al. | 360/33.1 |
| 4,794,403 | 12/1988 | Sleber et al. | 346/33 |
| 4,801,375 | 1/1989 | Padilla | 210/100 |
| 4,802,170 | 1/1989 | Trottier | 371/40 |
| 4,811,240 | 3/1989 | Ballou et al. | 364/518 |
| 4,811,247 | 3/1989 | Malady et al. | 364/550 |
| 4,814,592 | 3/1989 | Bradt et al. | 235/381 |
| 4,817,005 | 3/1989 | Kubota et al. | 364/468 |
| 4,817,042 | 3/1989 | Pintsov | 364/478 |
| 4,817,043 | 3/1989 | Brown | 364/518 |
| 4,818,854 | 4/1989 | Davies et al. | 235/381 |
| 4,821,197 | 4/1989 | Kenik et al. | 364/468 |
| 4,822,365 | 4/1989 | Walker et al. | 623/20 |
| 4,833,307 | 5/1989 | Gonzalez-Justiz | 235/375 |
| 4,835,683 | 5/1989 | Phillips et al. | 364/200 |
| 4,839,505 | 6/1989 | Bradt et al. | 235/381 |
| 4,839,829 | 6/1989 | Freedman | 364/519 |
| 4,845,635 | 7/1989 | Rosselli | 364/474.01 |
| 4,845,653 | 7/1989 | Conrad et al. | 364/521 |
| 4,847,473 | 7/1989 | Lee et al. | 235/381 |
| 4,847,761 | 7/1989 | Ferriter et al. | 364/401 |
| 4,852,013 | 7/1989 | Durst, Jr. et al. | 364/478 |
| 4,856,653 | 8/1989 | Ackeret | 206/387 |
| 4,862,376 | 8/1989 | Ferriter et al. | 364/468 |
| 4,864,502 | 9/1989 | Kucera et al. | 364/419 |
| 4,866,661 | 9/1989 | de Prins | 364/900 |
| 4,870,576 | 9/1989 | Tornetta | 364/401 |
| 4,873,643 | 10/1989 | Powell et al. | 364/468 |
| 4,882,675 | 11/1989 | Nichtberger et al. | 364/401 |
| 4,884,199 | 11/1989 | Boothroyd et al. | 364/408 |
| 4,887,217 | 12/1989 | Sherman et al. | 364/468 |
| 4,891,660 | 1/1990 | Biondo, Jr. | 354/412 |
| 4,896,791 | 1/1990 | Smith | 221/7 |
| 4,903,815 | 2/1990 | Hirschfeld et al. | 194/205 |
| 4,916,637 | 4/1990 | Allen et al. | 364/513 |
| 4,918,604 | 4/1990 | Baum | 364/413.01 |
| 4,924,385 | 5/1990 | Dote | 364/300 |
| 4,937,439 | 6/1990 | Wanninger et al. | 235/456 |
| 4,949,257 | 8/1990 | Orbach | 364/401 |
| 4,951,203 | 8/1990 | Halamka | 364/419 |
| 4,954,956 | 9/1990 | Yamakawa et al. | 364/419 |
| 4,954,981 | 9/1990 | Dehner, Jr. et al. | 364/900 |
| 4,961,507 | 10/1990 | Higgins | 221/129 |
| 4,964,043 | 10/1990 | Galvin | 364/401 |
| 4,970,655 | 11/1990 | Winn et al. | 364/479 |
| 4,972,318 | 11/1990 | Brown et al. | 364/403 |
| 4,974,170 | 11/1990 | Bouve et al. | 364/518 |
| 4,982,337 | 1/1991 | Burr et al. | 364/479 |
| 4,982,343 | 1/1991 | Hourvltz et al. | 364/521 |
| 4,982,346 | 1/1991 | Girouard et al. | 364/550 |
| 4,991,108 | 2/1991 | Hamilton | 364/514 |
| 4,992,940 | 2/1991 | Dworkin | 364/401 |
| 4,993,587 | 2/1991 | Abe | 221/21 |
| 4,999,065 | 3/1991 | Wilfert | 156/64 |
| 5,007,084 | 4/1991 | Materna et al. | 380/24 |
| 5,008,810 | 4/1991 | Kessel et al. | 364/200 |
| 5,016,183 | 5/1991 | Shyong | 364/470 |
| 5,017,953 | 5/1991 | Biondo, Jr. | 354/83 |
| 5,018,085 | 5/1991 | Smith, Jr. | 364/526 |
| 5,020,958 | 6/1991 | Tuttobene | 414/281 |
| 5,021,953 | 6/1991 | Webber et al. | 364/407 |
| 5,025,397 | 6/1991 | Suzuki | 364/519 |
| 5,025,399 | 6/1991 | Wendt et al. | 364/519 |
| 5,029,099 | 7/1991 | Goodman | 364/479 |
| 5,032,989 | 7/1991 | Tornetta | 364/401 |
| 5,036,472 | 7/1991 | Buckley et al. | 364/479 |
| 5,038,293 | 8/1991 | Goodman | 364/479 |
| 5,040,132 | 8/1991 | Schuricht et al. | 364/523 |
| 5,047,613 | 9/1991 | Swegen et al. | 235/379 |
| 5,047,959 | 9/1991 | Phillips et al. | 364/521 |
| 5,053,956 | 10/1991 | Donald et al. | 364/401 |
| 5,056,029 | 10/1991 | Cannon | 364/468 |
| 5,061,098 | 10/1991 | Engelhardt et al. | 400/625 |
| 5,062,147 | 10/1991 | Pickett et al. | 364/900 |
| 5,084,817 | 1/1992 | Kumano et al. | 364/419 |
| 5,088,052 | 2/1992 | Spielman et al. | 395/158 |
| 5,088,586 | 2/1992 | Isobe et al. | 194/205 |
| 5,099,422 | 3/1992 | Foresman et al. | 364/401 |
| 5,109,337 | 4/1992 | Ferriter et al. | 364/401 |
| 5,111,392 | 5/1992 | Malin | 364/401 |
| 5,115,504 | 5/1992 | Belove et al. | 395/600 |
| 5,119,475 | 6/1992 | Smith et al. | 395/156 |
| 5,132,915 | 7/1992 | Goodman | 364/479 |
| 5,146,403 | 9/1992 | Goodman | 364/401 |
| 5,148,370 | 9/1992 | Litt et al. | 364/468 |
| 5,153,825 | 10/1992 | Yauk et al. | 364/401 |
| 5,163,006 | 11/1992 | Deziel | 364/470 |
| 5,172,245 | 12/1992 | Kita et al. | 358/403 |
| 5,187,797 | 2/1993 | Nielsen et al. | 395/800 |
| 5,195,030 | 3/1993 | White | 364/401 |
| 5,200,888 | 4/1993 | Hashimoto | 364/400 |
| 5,206,804 | 4/1993 | Thies et al. | 364/401 |
| 5,208,745 | 5/1993 | Quentin et al. | 364/188 |
| 5,241,671 | 8/1993 | Reed et al. | 395/600 |
| 5,243,174 | 9/1993 | Veeneman et al. | 235/381 |
| 5,339,239 | 8/1994 | Manabe et al. | 364/401 |
| 5,513,116 | 4/1996 | Buckley et al. | 364/479.03 |
| 5,546,316 | 8/1996 | Buckley et al. | 364/479.03 |
| 5,550,746 | 8/1996 | Jacobs | 364/479.01 |
| 5,559,714 | 9/1996 | Banks et al. | 364/479.03 |
| 5,561,604 | 10/1996 | Buckley et al. | 364/479.03 |
| 5,583,763 | 12/1996 | Atcheson et al. | 364/551.01 |

FOREIGN PATENT DOCUMENTS

| | | |
|---|---|---|
| 87 13494 | 9/1987 | France . |
| 89 09224 | 6/1989 | France . |
| 3919726 | 6/1989 | Germany . |
| 57-144078 | 2/1984 | Japan . |
| 5933573 | 2/1984 | Japan . |
| 59-194263 | 5/1984 | Japan . |
| 1005827 | 5/1963 | United Kingdom . |
| 1388942 | 4/1972 | United Kingdom . |
| 2050106 | 4/1980 | United Kingdom . |
| 2065412 | 10/1980 | United Kingdom . |
| 2092354 | 9/1981 | United Kingdom . |
| 2105075 | 5/1982 | United Kingdom . |
| 2119600 | 4/1983 | United Kingdom . |
| 2150728 | 11/1984 | United Kingdom . |
| 2177245 | 5/1986 | United Kingdom . |
| 2222341 | 6/1988 | United Kingdom . |
| 2208460 | 7/1988 | United Kingdom . |
| 2 228 125 | 8/1990 | United Kingdom . |
| 2240897 | 8/1990 | United Kingdom . |
| 2 246 929 | 12/1992 | United Kingdom . |
| PCT/NO81/ | | |

| | | |
|---|---|---|
| PCT/AU82/ 00028 | 7/1981 | WIPO. |
| PCT/US82/ 00123 | 4/1982 | WIPO. |
| PCT/US83/ 0115.3 | 8/1982 | WIPO. |
| PCT/US90/ 00628 | 5/1983 | WIPO. |
| PCT/US89/ 06283 | 10/1989 | WIPO. |
| PCT/EP90/ 05364 | 11/1989 | WIPO. |
| PCT/FR91/ 02079 | 6/1991 | WIPO. |
| PCT/US92/ 00650 | 8/1991 | WIPO. |
| 02603 | 10/1992 | WIPO. |

OTHER PUBLICATIONS

"If you care enough to keyboard the best", Bombeck, Erma, *Star-Ledger,* Oct. 17, 1991.

"Software Tools for Writers", Holder, Wayne, *BYTE Publications Inc.,* Jul. 1992, pp. 128–163.

"Pioneering Perspective", Yeazel, Lynn A. *Optical Information Systems,* Feb. 1986, pp. 36, 37.

"Retailers Beginning To Tune in Video Displays", *Advertising Age,* Nov. 1985, p. 66.

"Computers, Fiction, and Poetry", McKean, Kevin *BYTE Publications,* Jul. 1992, pp. 50–53.

"Creative Writing with Computers", Owens, Peter, *Popular Computing,* Jan. 1984, pp. 128–132.

"Interactive Fiction: Six Micro Stories", Liddil, Bob, *BYTE Publications, Inc.* Sep. 1981, p. 436.

"GOSUB: Poet: Return Computers and the Poetic Muse", Marcus, Stephen, *Educational Technology,* Aug., 1984 pp. 15–20.

"Comp–U–Store System Could Change Retail Economics", *Direct Marketing,* Jul. 1983, pp. 101–107.

"Setting Up Shop On Computer Screens", Gatty, Bob, *Nation's Business,* Mar. 1984, pp. 57–58.

"EDR puts Auto Insurance Policy 'On Line'", Mooney, Barbara, *Crain's Cleveland Business,* Mar. 30, 1992, p. 23.

"TouchSelect Turns Ordinary Monitors Into Touch–Screens", Zelnick, Nate, *PC Magazine,* Dec. 17, 1991, p. 42.

"Maintenance by Modem: Processing Problems Can Be Solved Remotely"; Kreisher, Keith; *Modern Plastics;* Jan. 1990; p. 44.

"The Touchables"; *Informationweek;* Apr. 13, 1992; p. 44.

"Card Compete In New Outlets"; Toth, Debora; *Graphic Arts Monthly;* Dec. 1991; pp. 48–50.

"How Computerized Cards Make This Shop Truly A Treat"; Hohman, Edward J.; *Greetings Magazine;* Jan. 1987; pp. 12–13 and 24.

"Ryhme is Money with The Magical Poet"; *The Computer Poet Corp. Brochure.*

"This Computer Can Ryhme . . . For Three Bucks Each Time"; *Changing Times;* Jan. 1986.

"Cardmarketing . . . Your Way to a Powerful Database"; Corliss, Paul W., Jr.; *Dynamic Controls, Inc.*

"These Instant–Win Games Talk Back"; *ADWeek's Promote;* May 1, 19__; p. 4.

"CASPIR, Computer Aided Searching and Patent Image Retrieval", pp. 1, 8, 9, 10, 12, 13.

"Point–Of–Sale Terminal System with Clerical Facilities/Functions", G. Allmendinger, A. Bette, K.H. Engler, B. Haeusser and R. Muehlenbrock, *IBM Technical Disclosure Bulletin,* Jan. 1976, pp. 2554, 2555.

"Knowledge–Assisted Document Retrieval: I. The Natural––Language Interface"; Biswas, Bezdek, Marques, Subramanian; *Journal of the American Society For Information Science;* pp. 83–96; Mar. 1987.

"Knowledge–Assisted Document Retrieval: II. The Retrieval Process"; Biswas, Bezdek, Subramanian, Marques, *Journal of the American Society For Information Science;* pp. 97–110; Mar. 1987.

"$T^3R$: A New Approach to the Design of Document Retrieval Systems"; W.B. Croft and R.H. Thompson; *Journal of the American Society For Information Science;* pp. 389–404; Nov. 1987.

"Integrating Mechanisms for Storage and Retrieval of Land Data"; Andrew Frank; *Surveying and Mapping,* vol. 46, No. 2, pp. 107–121.

"Retrieval of HELP Information for Novice Users of Interactive Computer Systems"; Andrew M. Cohill; *Human Factors;* Jun. 1985; pp. 335–343.

"Automatic Tex Generation"; R. Marsh; *Br Telecom Technol J* vol. 6 No. 4; Oct. 1988; pp. 84–88.

"Advanced Feedback Methods in Information Retrieval"; G. Salton, E.A. Fox, E. Voorhees; *Journal of the American Society for Information Science;* May 1985, pp. 200–210.

"Producing Geological Illustrations Using PC–Based Computer–Aided Drafting"; K. Cameron, D. Cameron, P. Kelleher; *Computers & Geosciences,* vol. 14, No. 3 pp. 291–297; 1988.

"Adapting of String Indexing Systems For Retrieval Using Proximity Operators"; Timothy C. Craven, *Information Processing & Management;* vol. 24, No. 2, pp. 133–140, 1988.

"A language for simple interactive retrieval from a database system"; Perry Jones and Michael Shave; *Data & Knowledge Engineering,* 2, 1987, pp. 303–321.

"Automated Storage and Retrieval of Work Standards"; Richard A. Bihr; *Computers ind. Engng,* vol. 13, Nos. 1–4, pp. 312–316, 1987.

"A Novice User's Interface to Information Retreival Systems"; R.G. Crawford and H.S. Becker; *Information Processing & Management,* vol. 22, No. 4, pp. 287–298, 1986. Novel Filing Systems Applicable To An Automted Office: A State–Of–The–Art Study; F. Mark Restorick; *Information Processing & Management;* vol. 22, No. 2, pp. 151–172, 1986.

Thesaurus For End–User Indexing and Retrieval; Gary W. Strong, M. Carl Drott; *Information Processing & Management;* vol. 22, No. 6, pp. 487–492, 1986.

"OAKDEC, A Program For Studying The Effects on Users of a Procedural Expert System for Database Searching"; Charles T. Meadow, *Information Processing & Management,* vol. 24, No. 4, pp. 449–457, 1988.

"WYSIWIS Revised: Early Experiences with Multiuser Interfaces"; M. Stefik, D.G. Bobrow, G. Foster, S. Lanning, and D. Tatar; *ACM Transactions on Office Information Systems,* vol. 5, No. 2, Apr. 1987, pp. 147–167.

"Criteria For the Evaluation of Text Storage and Retrieval Software"; Paul Nieuwenhuysen, *The Electronic Library,* Jun. 1988, vol. 6, No. 3; pp. 160–166.

"A Visual User Interface for Map Information Retrieval Based on Semantic Significance"; M. Tanaka and T. Ichikawa; *IEEE Transactions On Software Engineering,* vol. 14, No. 5, pp. 666–670, May 1988.

"Interactive Document Display And Its Use In Information Retrieval; J.D. Bovey and P.J. Brown; *Journal of Documentation*, vol. 43, No. 2, Jun. 1987, pp. 125–137.

"Image Retrieval System Based on Object Features"; Akio Yamamoto and Mikio Takagi, *IEEE Montech* 1987, pp. 131–134.

"Retrieval Techniques"; Nicholas J. Belkin, W. Bruce Croft; *Annual Review of Information Science and Technology*, vol. 22, 1987, pp. 108–145.

"Video–Graphic Query Facility for Database Retrieval"; Nancy H. McDonald, *Visual Computer*, 1986; pp. 72–77.

"Targeted Marketing", Paul Corliss, *Foodmarketing;* vol. 1, No. 1, Jan./Feb. 1989.

"Melpas–1 Ticket–Issuing Apparatus" by Ken 'Ichi Murato, Tadahiro Okura, Eliji Suzuki & Masataka Kobayashi; *Mitsubishi Denki Giho*. vol. 55, No. 4 pp. 35–39 (1981).

"Point–Of–Sale Terminal System With Clerical Facilities/Functions"; by G. Allmendinger, A. Bette, J.H. Engler, B. Haeusser, and R. Muehlenbrock; *IBM Technical Disclosure Bulletin;* vol. 18, No. 8, Jan. 1976; pp. 2554–2555.

Filing and Retrieval of Unstructured Information: Some Systems Considerations; J. Bansler, et al.; *Espirit '84* Brochure, pp. 295–313.

The Interactive Display Design Tool: An Application Program for Human Factors Part Task Simulation Development; Mark W. Smith, et al. 1899 IEEE; pp. 856–859.

"A Frame–based Interface for Question–Answering Systems"; Toshihisa Takagi, et al. 1985 IEEE; pp. 388–393.

"The Use of Adaptive Mechanisms For Selection of Search Strategies in Document Retrieval Systems"; W. Bruce Croft, et al.; Department of Computer and Infomation Science, University of Massachusetts, pp. 95–110.

"An Interactiive Database End User Facility For the Definition and Manipulation of Forms"; A.H.F. Laender, et al.; School of Computing Studies and accountancy, University of East Anglia, Norwich, NR 4 7TJ, England, pp. 40–54.

"CAD Generation of Accident Diagrams For Local Agencies"; Willard Lyman, et al.; *Microcomputer Within Transporation* Brochure; pp. 657–664.

"Which Way to Go With Interactive Video"; 1987 Interac Corporation Brochure.

"Interactive Video Merchandising"; By Video Inc. Brochure, May 1988.

"Vision 1000 The Total Promotion Delivery Vehicle"; Advanced Promotion Technologies —Brochure.

"Food Chain Employees Scanning Technology In Instant Win/Prize Drawing Promotion"; Incentives In Action Brochure.

"Direct Marketing Goes Electronic", Larry Riggs, *Sales & Marketing Management*, vol. 134, No. 1, Jan. 14, 1985, pp. 59–60.

Videodisc: Product Search System Launched for Architects and Interior Designers, *Videodisc and Optical Disk*, vol. 5, No. 4, Jul. 1985, pp. 244–247.

Current Spring 1987 Sale Catalog.

Current Christmas 1987 Catalog.

Current Birthday 1987 Catalog.

Current Valentine 1987 Catalog.

Photo enlargements via vending machine; Kodak Create–A–Print 35 mm enlargement center; *Machine Design*, vol. 60; No. 9, p. 12.

METHOD AND APPARATUS FOR STORING AND SELECTIVELY RETRIEVING PRODUCT DATA BASED ON EMBEDDED EXPERT SUITABILITY RATINGS

FIELD OF THE INVENTION

This invention relates to machines and methods that store, retrieve and deliver data. More particularly, the invention relates to machines and methods that store product images, video data, audio recordings or other data in digital or analog form and retrieve portions of such data in response to data entries by a customer. These machines and methods also display the retrieved data portions to the customer and allow the customer to select and, in some cases, modify data relating to the product he desires. Then the data may be delivered to the customer in the form of a printed product, a sound recording or a video image or the customer may be allowed to place an order for the data or a related product. Examples of such machines and methods are those that produce greeting cards, other social expression products, photographs, motion pictures, television programs, musical recordings, gift products, literary works and reference data.

BACKGROUND OF THE INVENTION

In a conventional retail, catalogue or library environment, customers are able to browse quickly and conveniently through large physical displays of products, in the course of which they inspect images, read words, listen to music and/or engage in other reviewing activities, until they find a specific product most suitable for their needs, interests or tastes. Under these circumstances, customers can and do exercise their discriminating judgments and mental processes to make selections.

Recently, machines have been introduced that replace these large physical product displays by storing data relating to the products in magnetic or optical storage devices. The customer can then retrieve and review the data relating to products falling within certain categories on a video screen and audio system, by entering criteria on a keyboard or touchscreen that is connected by a programmed computer to the storage devices holding the data. The product data selected for this display is identified by labels that match the criteria entered by the customer. From the product data displayed to him, the customer selects the product that he likes the best. Then the machine either prints the product or delivers the product or data to the customer in some other form. An example of such a machine is the social expression card vending machine shown and described in U.S. Pat. No. 5,056,029, issued to Thomas G. Cannon.

While the card vending machine shown in the Cannon patent provides an efficient means for storing many different kinds of greeting cards and for retrieving and displaying those cards matching the customer's needs, that machine, as well as other known machines, has several drawbacks. One drawback is that these machines can retrieve and display only those product designs that are identified by labels that match exactly the criteria specified by the customer. For example, in using a social expression card vending machine, the customer may tell the machine that he wants a "birthday" card for his "mother" that conveys a "warm" feeling.

The computer in the machine will then search the card storage file for all card designs that are identified by the labels, "birthday," "mother," and "warm," and only those card designs will be presented to the customer. However, some card designs can convey messages so broad in scope that they cannot be pigeon-holed exclusively in the "birthday," "mother," and "warm" categories, yet they may be very close to what the customer wants. If those card designs were arbitrarily identified by the labels, "birthday," "mother" and "warm," they would indeed be retrieved in response to the criteria specified by the customer. On the other hand, they would not be retrieved in response to a "Christmas," "aunt," and "breezy" criteria input, even though some of them would satisfy those criteria equally as well. Because the presently known machines are limited in this respect, they cannot use a large database of product designs to its fullest potential in meeting customer needs.

Indeed, the number of product designs that must be stored in the database of one of the presently available machines is extremely large in relation to the number of different combinations of customer needs that it can meet. Because of the exact correspondence that is required between the labels and the customer criteria, the number of stored designs must be equal to the number of possible combinations of the various criteria that a customer can specify, multiplied by the average number of card designs that a vendor would want to display in response to a set of criteria input by the customer. For instance, if the customer were given five possible criteria to choose from each of four categories, that would result in 625 ($=5^4$) possible combinations. If the vendor wanted to display an average of ten card designs in response to each combination that a customer might choose, then a total of 6,250 product designs would be required in the database. That would be a large database, compared to the modest number of criteria choices given the customer.

Another problem with the present machines is that they do not allow the customer to consider product designs that might, except for one component of the design, meet his needs very well. If a more suitable component could be substituted for the less suitable one, many product designs could be made to come very close to meeting the criteria specified by the customer. This is another example of how the present machines fail to use all the cards in their databases to their fullest potential.

SUMMARY OF THE INVENTION

An object of this invention is to provide an improved method and apparatus for storing and selectively retrieving product data that can use a relatively small database of product designs to serve the diverse needs of customers.

Another object is to provide an improved method and apparatus for storing and selectively retrieving product data that can use a database of general purpose and multipurpose product designs to serve the diverse needs of customers.

Still another object is to provide an improved method and apparatus for storing and selectively retrieving product data that will allow the customer to have greater input in the design of his product, by allowing him to combine various product components of his choice and to replace parts of the design with parts that better suit his needs.

These and other objects are achieved by a method that includes the steps of storing product data relating to a plurality of products or components thereof in a data storage device, identifying the product data relating to each product or component by a set of one or more factors that indicate the suitability of the product or component for various possible customer needs, requesting a customer to specify a set of criteria relating to his needs and receiving the requested criteria from the customer. The method further includes the step of calculating a suitability rating for each product or component by combining by an algorithm the factors that indicate the suitability of the product or component for the needs that the customer identified by his selected criteria. Also, the method includes the steps of selecting a group of products and/or combinations of components for display to the customer based on the suitability ratings of the products and/or combinations of components, displaying the data relating to the selected group of products and/or combinations of components to the customer and requesting the customer to select one of the products or combinations of components whose data are displayed to him. The method further includes the steps of receiving the customer's selection of a product or a combination of components and delivering to the customer the product or combination of components selected by the customer. In the case of social expression cards, the term "component" refers to individual or combined elements of text or graphics or entire blocks or pages of text or graphics.

In a preferred embodiment, the foregoing method includes the step of storing product data relating to separable or replaceable components. The data for such components may be stored separately or together as data for complete products. The suitability rating of each separable or replaceable component is calculated by combining by a first algorithm the factors that indicate the suitability of the component for the criterion or criteria identified by the customer. Suitability ratings may be characterized by a set of words or numerical values and may cover the range from zero percent, or no suitability, to 100 percent, or perfect suitability. Then, the suitability ratings of all the separable or replaceable components of each product are combined by a second algorithm to determine the suitability rating of the design of the entire product. Of course, if all component suitability ratings were either zero or 100 percent, it would be unnecessary to apply the second algorithm. As one variation, the algorithms may be designed to be applied in the reverse order. The first algorithm would calculate the combined suitability ratings of the various components forming a design with respect to each criterion and the second algorithm would combine the suitability ratings of the all the criteria selected by the customer. As another variation, combined suitability ratings for all components of a product may be precalculated and stored in association with each criterion. Those products whose suitability ratings exceed a minimum threshold value or meet another appropriate standard are then displayed to the customer. If the number of products qualifying for display is not high enough, then the products not qualifying are tested to determine whether they would qualify if their separable components with low suitability ratings were omitted or their replaceable components with low suitability ratings were replaced with components having higher suitability ratings. The products that would qualify for display by changing their components are then changed accordingly and displayed to the customer.

In another embodiment, the method includes the step of storing components of products and the suitability ratings of the components are calculated separately. The components with the highest suitability ratings are displayed separately to the customer, categorized according to the part of the complete product to which they pertain. The customer then selects one component from each product category and the computer combines the data for these components in order to display the data for a complete product.

In yet another embodiment, the method may include allowance in the data for a product or the textual components of a product for fill-in or substitute words or phrases, whereby the customer may modify the data to make the product suitable for a particular purpose. This modification capability is taken into consideration in determining the suitability factors of a particular product or component.

In a further embodiment, the method may allow the customer or the owner of the apparatus that performs the method to respond to menu choices or enter command instructions to restrict entire classes of products or components from display eligibility. Such command instructions or the response to such menu choices would cause individual suitability factors to be reduced to zero or would block access to an entire file or sub-file. In social expression card vending machines, this feature could be used to allow only texts in certain languages to be available for display or to prevent designs or components with sexual themes from being available for display.

The objects of the invention are also achieved by an apparatus that includes a data storage device in which are stored data relating to products and/or components of products, the data for each product or component being identified by a set of one or more factors, each factor being indicative of the product's suitability for a specific customer need. The apparatus also includes a display device that displays choices of criteria corresponding to customer needs and an input device that receives the criteria selected by customers. In addition, the apparatus includes a computer that receives from the input device the selected criteria and from the storage device the factors identifying the data for each product design or component, calculates a suitability rating for each product or component and based on those suitability ratings determines which product or component data to retrieve from the storage device for display to the customer. The display device of the apparatus receives the data retrieved by the computer and displays it to the customer. The display device also prompts the customer to make a selection from the displayed product and component data and the input device receives the product or component combination selected by the customer. The apparatus also includes a printer or other device for delivering to the customer the selected product or data relating to the selected product.

In another embodiment, the apparatus may include a data entry means that allows the customer, following his selection of a product, to modify the product in certain respects. In the case of a social expression card vending machine, this data entry means might allow the customer to enter personalizing text or graphic indicia in either designated locations or blank spaces. The computer would store the indicia and then download it to a printer or other delivery device, along with the other parts of the product when the time comes for printing the product or delivering the product to the customer.

DESCRIPTION OF A PREFERRED EMBODIMENT

Figure 1:
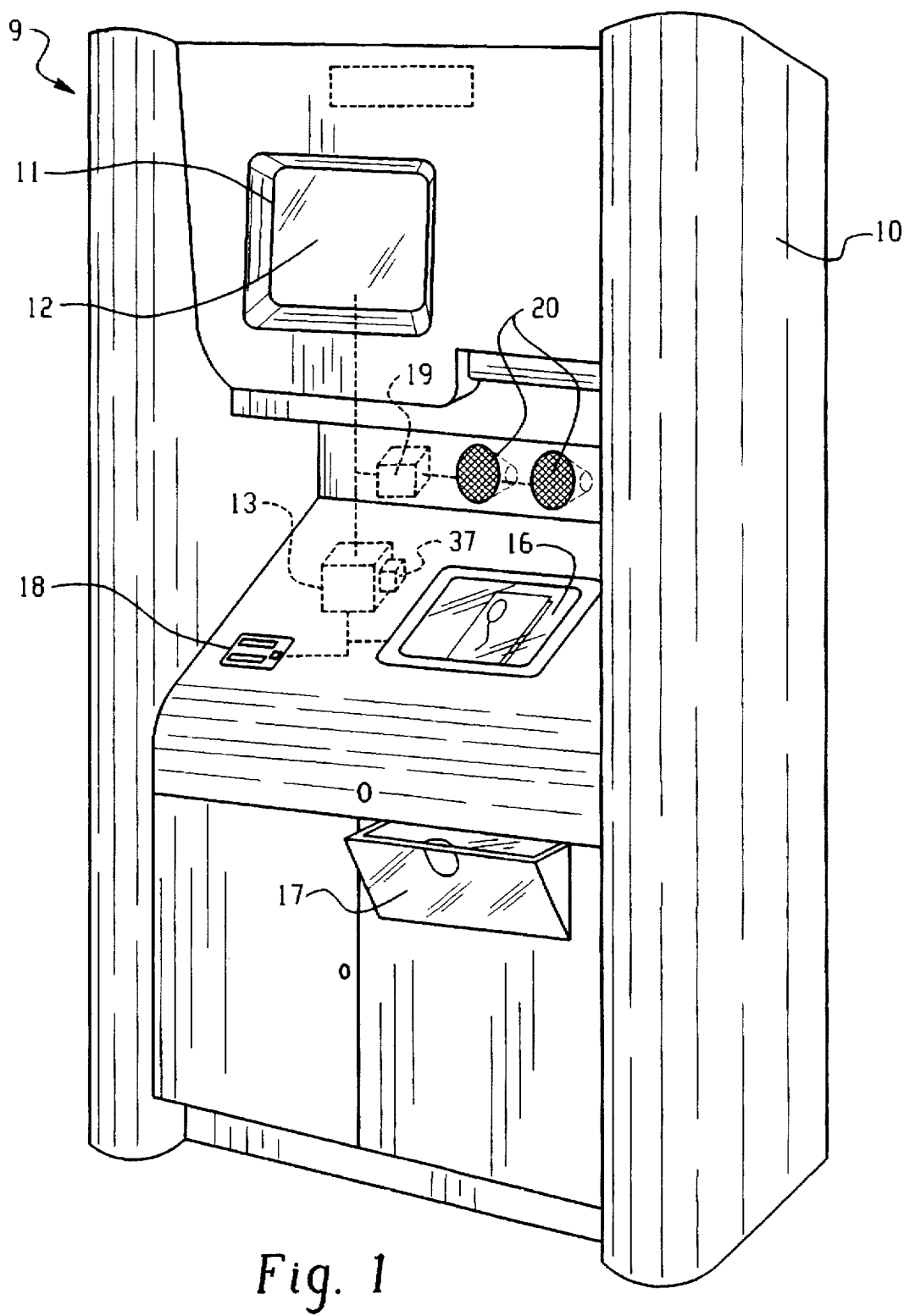
FIG. 1 is a perspective view of an apparatus for storing and selectively retrieving data relating to social expression cards, showing one embodiment of the present invention.

The apparatus 9 shown in FIG. 1 is designed for the on-site making and dispensing of social expression cards in a retail store. The apparatus 9 includes a kiosk 10 that houses a video monitor 11, a computer 13, a printer 16, and various accessories.

The video monitor 11 displays various card designs, card design components and card design criteria, from which customers are asked to make selections. The video monitor 11 is preferably CTX 5468A Super VGA color monitor with a 0.28 dot pitch. The monitor 11 is covered by a touchscreen 12. The touchscreen 12 is a transparent, pressure sensitive plate capable of sensing a location where it is touched by a customer. One touchscreen that may be utilized with the present invention is a model E-274 from Elographics Company of Oak Ridge, Tenn.

The monitor 11 and touchscreen 12 are connected to the computer 13, which manages the presentation of the various card designs, card design components and card design criteria that are displayed on the monitor 11. The customer makes selections from these designs, components and criteria by pressing the locations of the touchscreen 12 that cover the appropriate portions of the monitor 11. The touchscreen 12 then sends these selections to the computer 13. In addition to the touchscreen 12, other customer data entry devices, such as a mouse, a keyboard or stylus, may be connected to the computer 13.

The computer 13 preferably has mini-tower chassis with dual fans, a 90 mHz Pentium Intel chip upgradable processing system, a 32 megabyte random access memory (RAM), a sound blaster compatible sound board with a 16 bit midi capacity, a Sony internal CD-ROM, an NEC 4X bus adapter SCSI-2, an ATI Mach 64 video accelerator card with a two megabyte Vram, an Elographics touchscreen board, a non-bootable 1.44 megabyte Teac or Sony floppy disk drive, a 256k cache, a 200 watt power supply, three parallel printer ports and two serial printer ports. The computer 13 is preferably loaded with Microsoft Window 95 software and Fastlynx 2.0 transfer software.

Figure 3:
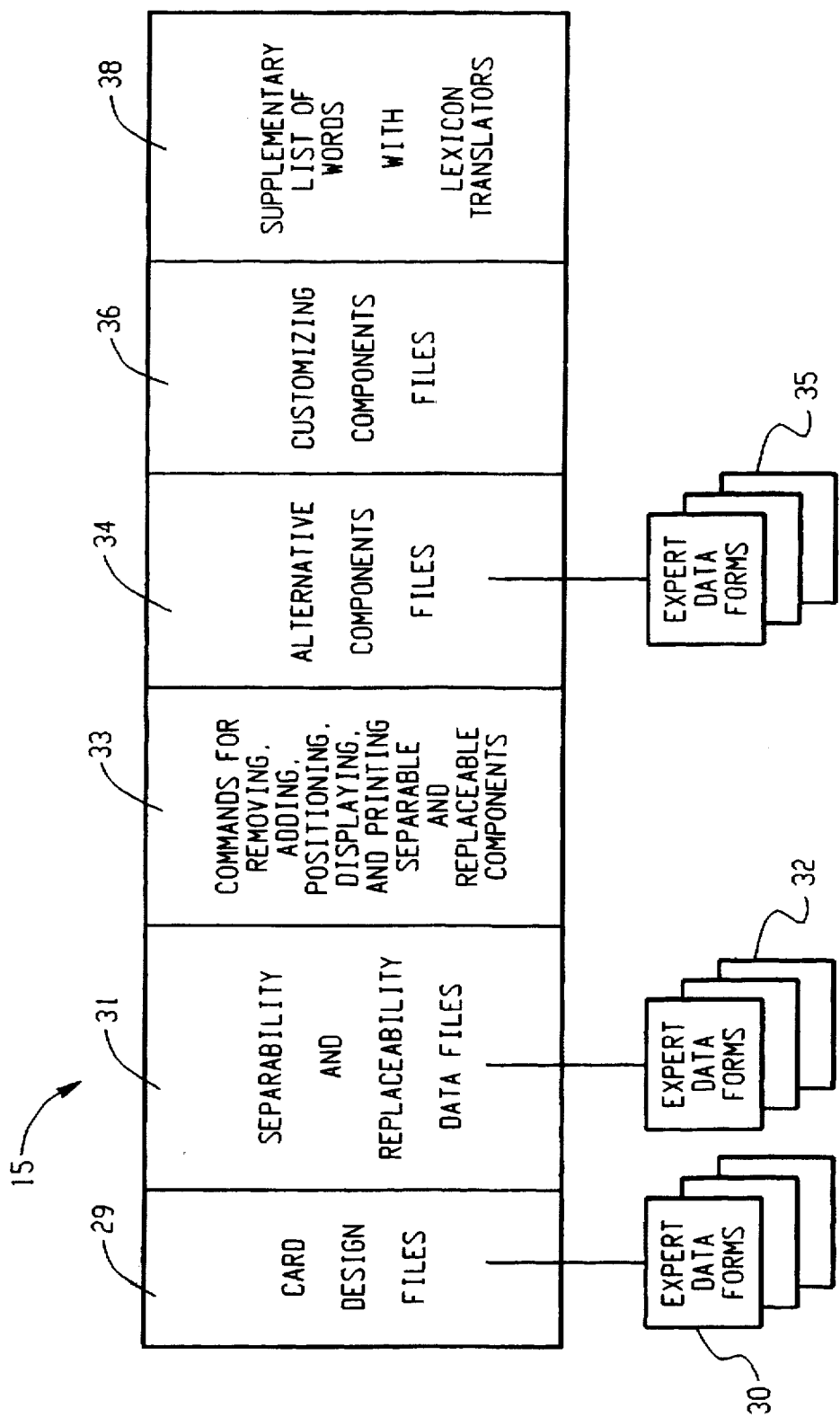
FIG. 3 is a block diagram showing the components of the main card file of a data storage device that is part of the apparatus of FIG. 1.

The computer 13 includes a data storage device that houses a main card design file 15, shown in FIG. 3. The data storage device may consist of any combination of digital or analog data storage systems. The digital data storage systems may include magnetic disks or tapes, electronic storage devices or optical storage devices and these storage media may be capable of temporary and/or permanent data storage. Some or all of the data storage systems may be located outside the apparatus 9 at a remote location.

The computer 13 is also connected to the printer 16, which is equipped with a tray holding blank or partially pre-printed card stock. Printer 16 prints a card design received from the computer 13 on the card stock, either automatically or by a command received from the customer. The printer 16 then delivers the printed card to a bin 17 for customer pick-up or allows the customer to actuate a delivery mechanism or to retrieve the card directly from the printer. The printer 16 is capable of detecting its paper loading status and automatically reloading paper to prepare for the next operation without control instructions from the computer 13. The printer 16 is preferably a Hewlett-Packard 1200C ink jet printer.

An optional part of the apparatus 9 is a payment device 18 that is designed to receive money from customers in payment for printed cards. The payment device 18 is connected to the computer 13, which sends the payment device 18 instructions of the amount of money to collect. The computer 13 also senses when the payment device 18 receives the payment and allows the printer 16 to print a card only when payment is received. The payment device 18 may include a coin acceptor that has a Model C-120 electronic validator with a standard (S10 compatible) body, available from Coin Controls Inc., 1859 Howard Street, Elk Grove Village, Ill. 60007. The device 18 may also include Mars VFM4 electronic bill acceptor with an upstacker body, available from Mars Electronics International, 1301 Wilson Drive, West Chester, Pa. 19380. In addition, device 18 may have a vending controller board for accepting credit cards, including a thermal printer, a cutter mechanism and a magnetic stripe reader, per Standard Industries specification dated May 23, 1993, available from Standard Industries, Kontrolle Division, 14250 Gannet Street, La Mirada, Calif. 90638.

Another optional part of the apparatus 9 is a sound system 19 with speakers 20, that allows the computer 13 to send verbal operating instructions to the customer. The computer 13 may also be equipped to send messages through the speakers to potential customers, encouraging them to use the machine. The speakers 20 are preferably Altec ACS-5 speakers.

Figure 2:
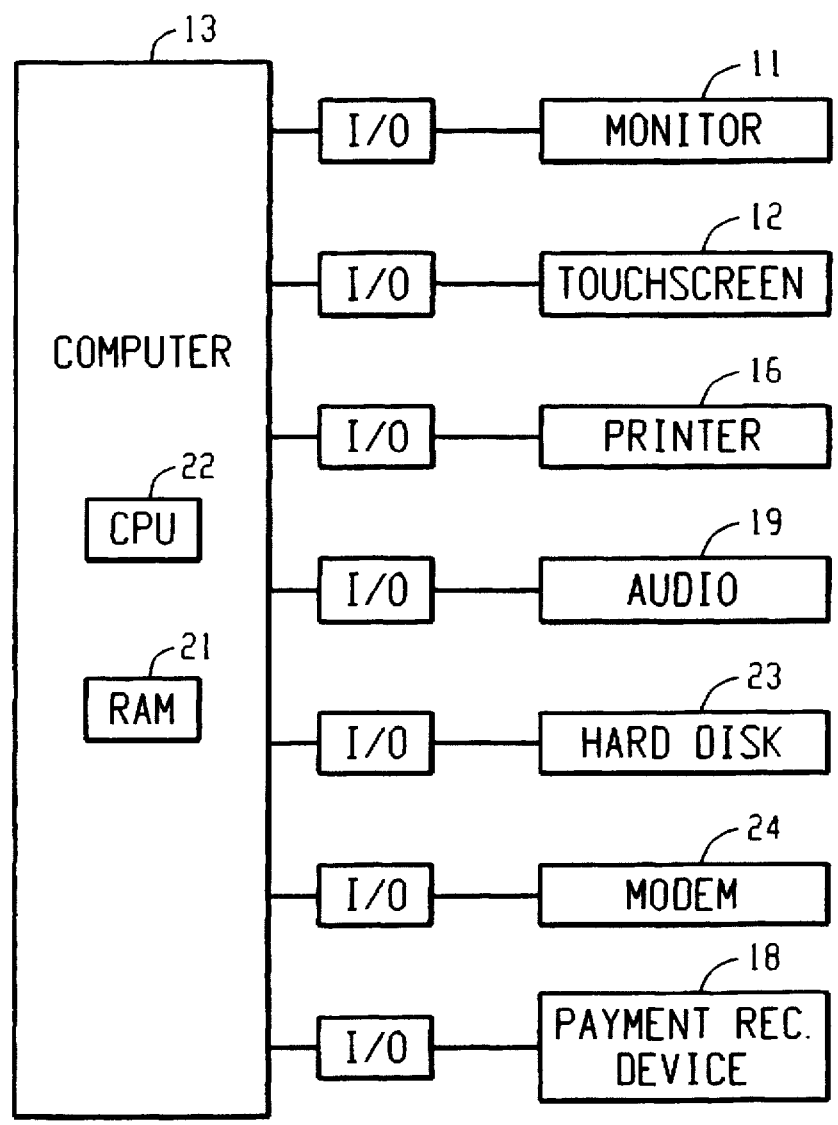
FIG. 2 is a block diagram of a computer used in the apparatus of FIG. 1, with interfacing peripheral equipment attached to the computer.

As shown in the block diagram of FIG. 2, the computer 13 includes a 32-megabyte random access memory (RAM) 21 and a central processing unit (CPU) 22. The peripheral units include the monitor 11, the touchscreen 12, the printer 16, including a paper loading device not shown, the audio system 19, a one gigabyte Western Digital hard disk 23, a modem 24 and the payment device 18. These peripheral units are each coupled to the computer 13 by means of an I/O interface.

By use of the modem 24 (FIG. 2), the computer 13 may be telephonically accessed from a central location to enable immediate greeting card additions and updates to the stored greeting card designs, in order to keep up to date with holidays and current events. The modem connection may also enable reordering of card stock, periodic maintenance checks and data gathering operations for statistical data accumulation and accounting purposes.

The greeting card designs to be displayed on the monitor 11 are preferably stored in a compressed state by use of a Joint Photographics Expert Group (JPEG) algorithm. Suitable JPEG compression/decompression systems are available from Optibase Corporation, 7800 Deering Ave., Canoga Park, Calif. 91304 or from LEAD Technologies Inc., 8701 Mallard Creek Road, Charlotte, N.C. 28262.

The greeting card print images are preferably stored in a lossless compressed format. In the range below 10 to 1, the JPEG algorithm recommended for the design data is essentially lossless and can be used also for storing the print image data. However, for the print image data, inherently lossless compression techniques are preferred. A greeting card print image can be reduced from one megabyte memory to about 100 kilobytes memory using these compression techniques.

The main card design file 15 of the storage device 14 is partitioned as shown in FIG. 3. The partition 29 has a file of complete card designs and/or design components. The partition 29 also contains all the commands for displaying and printing each design. The partition 29 may also contain duplicate copies of the card design files, so that one copy can be used to display a design and the other copy can be used to print the design.

Each card design file in the partition 29 also contains a data matrix that lists each criterion that can be presented for customer selection on the display monitor 11. For each of these criteria, the matrix contains expert judgment factors indicating how well each separable component of the design meets the criteria. An example of a very simple matrix for one card design file is shown in the following table, Table 1:

TABLE 1

|  | Heading | Graphics | Text |
| --- | --- | --- | --- |
| English Lang. | 1.0 | 1.0 | 1.0 |
| Spanish Lang. | 0.5 | 0.9 | 0 |
| French Lang. | 0 | 0.2 | 0 |
| Birthday | 0.5 | 0.7 | 0.9 |
| Anniversary | 0.8 | 1.0 | 0.9 |
| Thank You | 0.3 | 0.5 | 0.4 |
| Girlfriend | 1.0 | 0.8 | 0.6 |
| Lover | 0 | 0.7 | 0.7 |
| Classmate | 0.2 | 0.8 | 0.7 |
| 0–2 Years | 0 | 0.4 | 0.5 |
| 20–35 Years | 0.9 | 0.7 | 0.5 |
| Over 65 Years | 0.8 | 0.7 | 0.2 |
| Traditional | 0.6 | 0.5 | 0.7 |
| Humorous | 0.8 | 0.7 | 0.9 |
| Off-Beat | 0.3 | 0.4 | 0.4 |
| Juvenile | 0.2 | 0.2 | 0.3 |

For the card design identified by the matrix of Table 1, the separable card design components are the heading, the graphics and the text. The numbers in each of the columns labelled, "Heading," "Graphics" and "Text" are factors that represent a card expert's estimate of the probability that the card component will meet each of the various criteria listed in the far left-hand column. Preferably, these factors are created by card experts who review the card designs and record the factors on expert data forms 30 (FIG. 3) or enter the factors directly into the files stored in the partition 29. The card experts should be people who are skilled in the art of greeting card design and marketing. Their judgments should reflect their expert knowledge of the current tastes of various kinds of card customers, market research and test data, card design conventions and other relevant factors. After the card experts write their findings on data forms 30, the data on those forms is entered in the files of partition 29. Where any places in the data matrix for a card design or component are left blank, the factor is assumed to be zero.

The separability and replaceability data files of partition 31 of the Main Card Design File 15 (FIG. 3) contains more expert judgment data pertaining to each of the card files stored in the partition 29. These judgment data indicate whether each component of each card design can be omitted from the design and, if it can be, whether it needs to be replaced by an alternative component. For example, the data in the partition 31 might indicate whether the caption, "Happy Birthday Mom" could be omitted or replaced by another caption without destroying the integrity of the card design. The partition 31 data might also indicate whether the word, "Mom," which might appear several places in the design, could be replaced by "Mother," "Sister," or "Father." The data in partition 31 are preferably created by card experts who review the card designs and record their findings on data forms 32 (FIG. 3). The data on forms 32 are then entered in the partition 31.

The partition 33 of the main file 15 (FIG. 3) contains all the computer commands necessary to remove, add, position, display and print each of the separable or replaceable components of each card design. These commands should be organized in such a way that all the commands for any combination of components can be retrieved together or the commands for each component can be retrieved separately. That will enable some separable or replaceable components to be included as parts of larger separable or replaceable components. For instance, the heading, "Thinking of You Mom," may be a separable or replaceable component of a particular card design, while the word, "Mom," that is part of that heading is also a separable or replaceable element by itself.

The main card design file 15 also has a partition 34 (FIG. 3) that stores files of alternative components of words, phrases, texts and graphic elements. These components may vary in spelling, content, meaning, form, size or language from those components for which they are considered to be alternatives. The alternative components are available to replace the replaceable components of the card designs stored in the partition 29. Like the files of the card designs stored in the partition 29, the files of the spare components in the partition 34 contain the commands for displaying and printing the components, as well as expert judgment factors indicating each component's probable suitability for each of the criteria presented for customer selection on the display monitor 11. These expert judgment factors are first written on forms 35 (FIG. 3) and then entered in the replacement component files of the partition 34. The spare component files in partition 34 also contain category indicia, indicating which parts and/or locations of each card design the component is designed to serve, such as "Heading," "Text," "Border," "Graphics," or "Page 1," "Page 2" or "Page 3."

In an alternative embodiment, the partitions 29 and 34 may be combined. Replacement component data files would then be stored in conjunction with the main card design files.

The card designs, design components and replacement components may include blank spaces and blank page portions designed for the customer to fill in with textual or graphic indicia, in order to customize the design for a specific purpose. The availability of such customizing potential would be considered in determining the expert judgment factors, both those stored in the partition 29 and the omission-replaceability factors stored in partition 31 to be stored for the design or component.

As an optional feature, the main card design file 15 has a partition 36 (FIG. 3) that contains files of customizing components that can be inserted in the card designs stored in the partition 29. Each customizing component consists of text or graphics or a combination of text and graphics that is designed to give a personal touch to a card design. The customizing component may relate to one or more personal characteristics of the sender or receiver, the nature of the relationship between the sender and the receiver, the nature of the sending occasion, or to an experience shared by the sender and the receiver. The files of these customizing components contain the commands necessary to display and print the components, as well as labels that correspond to sets of customer answers to questions. The questions are designed to determine the characteristics of the sender and receiver, the nature of their relationship, the sending occasion and other matters relevant to one or more of the customizing components. The questions are stored in the computer 13 and are asked of the customer via the display monitor 11. The touchscreen 12 receives the customer's answers and sends them to the computer 13. The computer 13 compares these answers with the labels stored in the customizing component files of the partition 36 and retrieves the display commands for the customizing components that have the best matching labels. Those customizing components are then displayed on the display monitor 11, so that the customer may select one or more of them for insertion in his chosen card design.

The computer 13 may be programmed to allow the customer, the owner or licensee of the apparatus 9 or the owner of the premises on which the apparatus 2 is located to restrict entire classes of designs or components from display eligibility. A menu can be presented on the monitor 11 that allows a person to enter on the touchscreen 12 commands to the computer 13 that will accomplish this purpose. Alternatively, a box 37 (FIG. 1) may be provided inside the computer that has buttons for sending such commands to the computer 13. Such commands would cause individual suitability factors to be reduced to zero or would block access to an entire file or sub-file. By means of such blocking, the card designs or components displayed for customer selection can be restricted to those containing texts in certain languages or designs or components with sexual themes'may be prevented from display.

Figure 4:
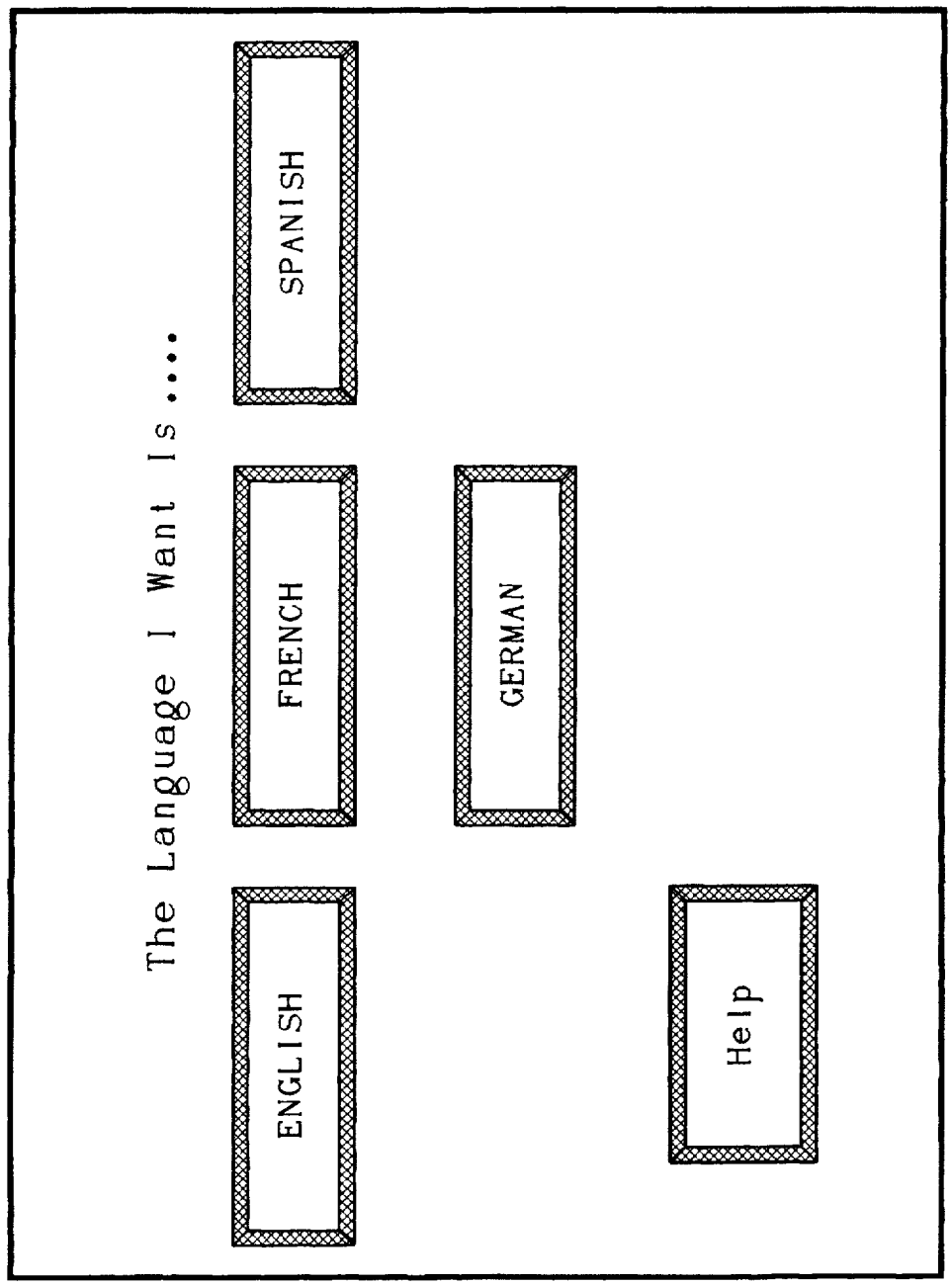
FIGS. 4 through 11 and 30 show representative displays that can be shown on video monitor of the apparatus of FIG. 1.
Figure 5:
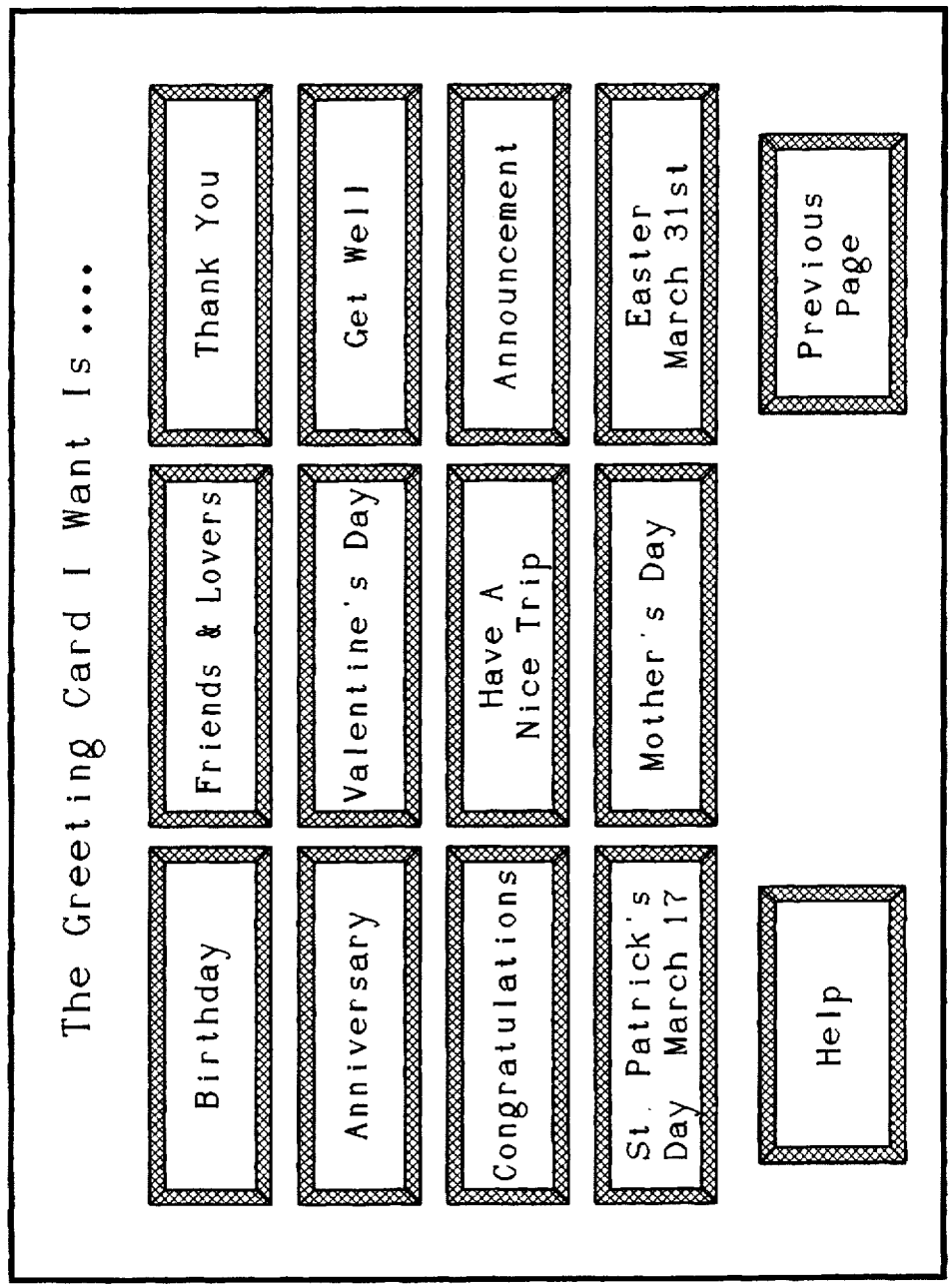
Figure 6:
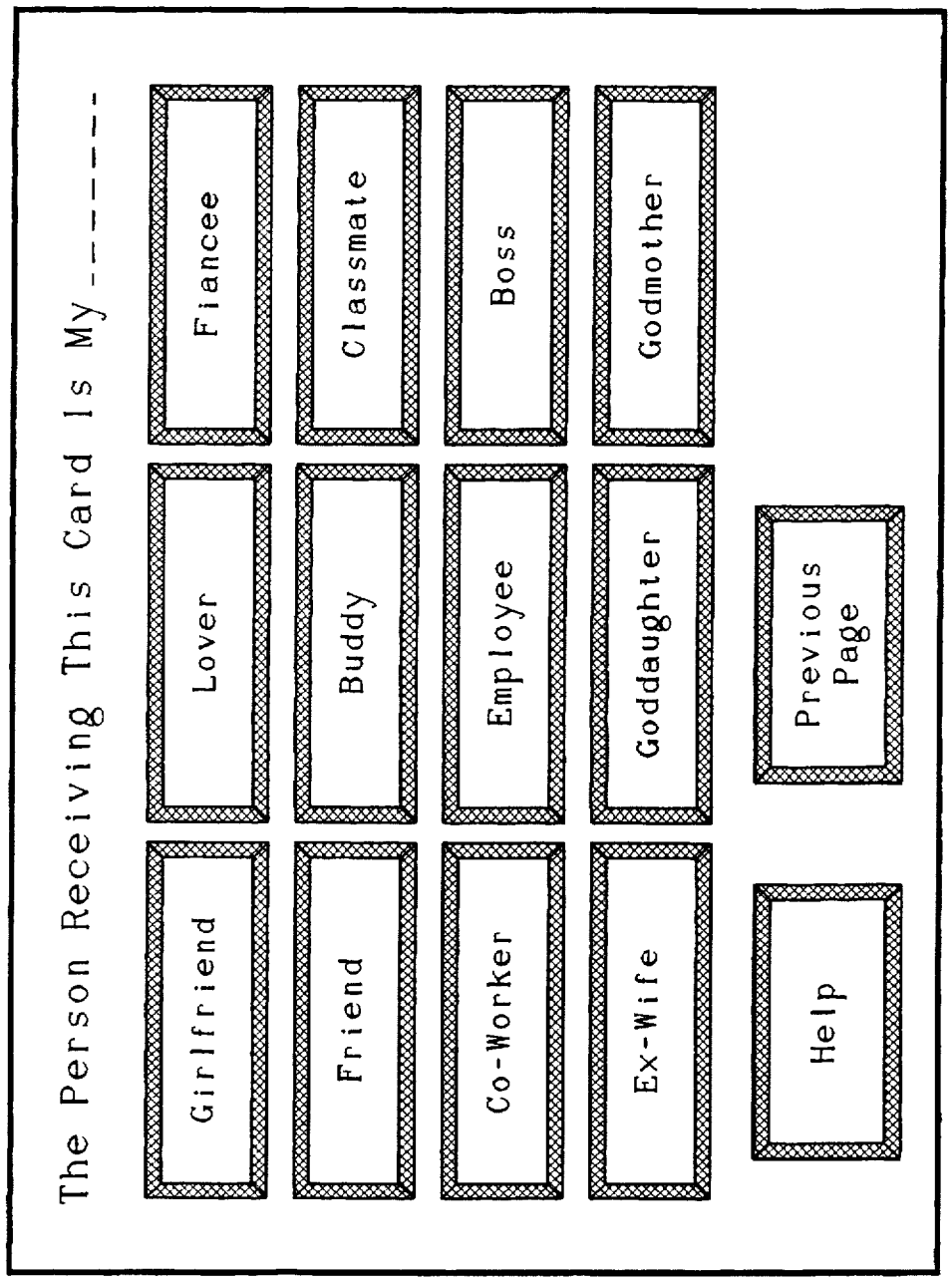
Figure 7:
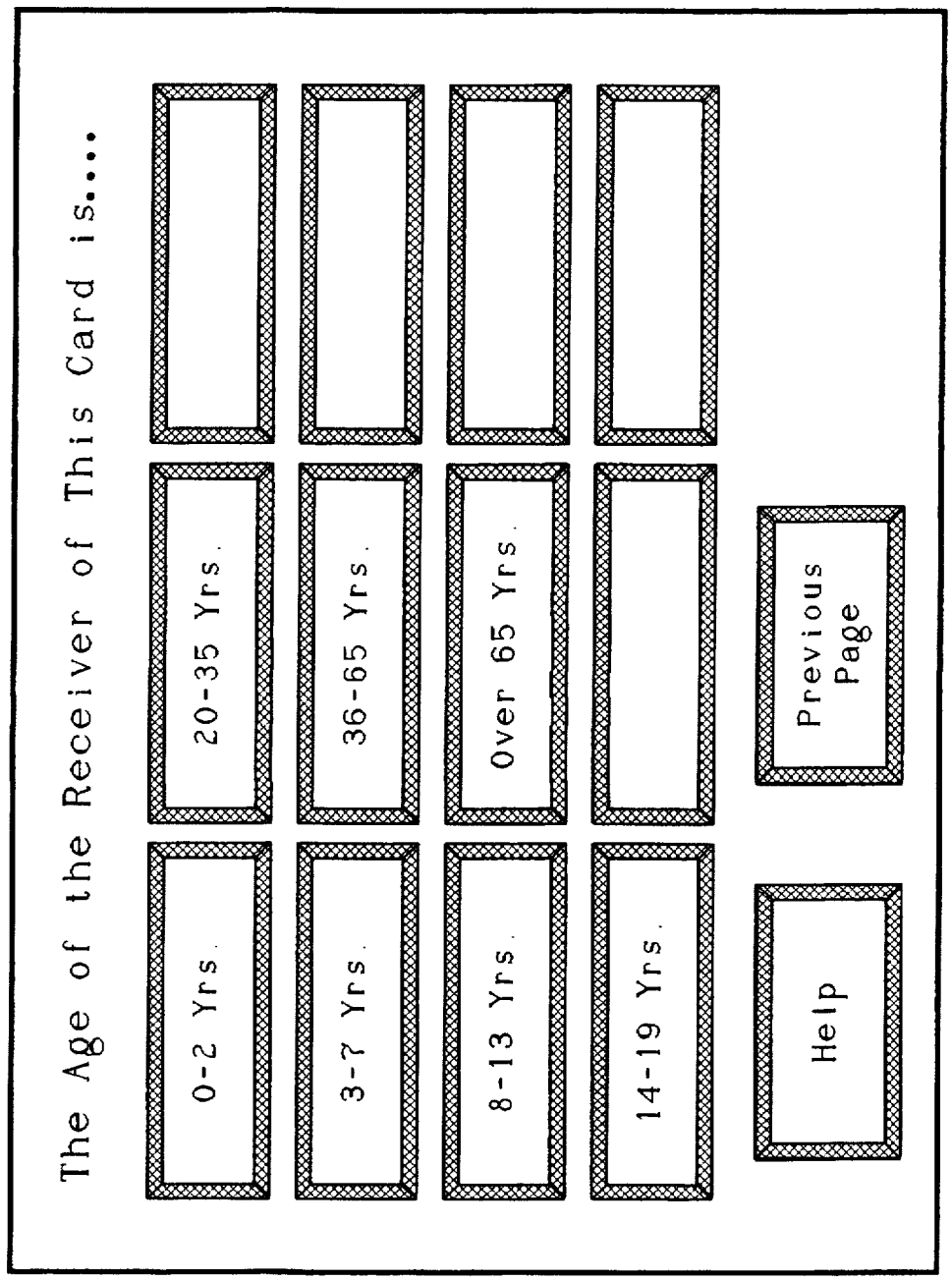
Figure 8:
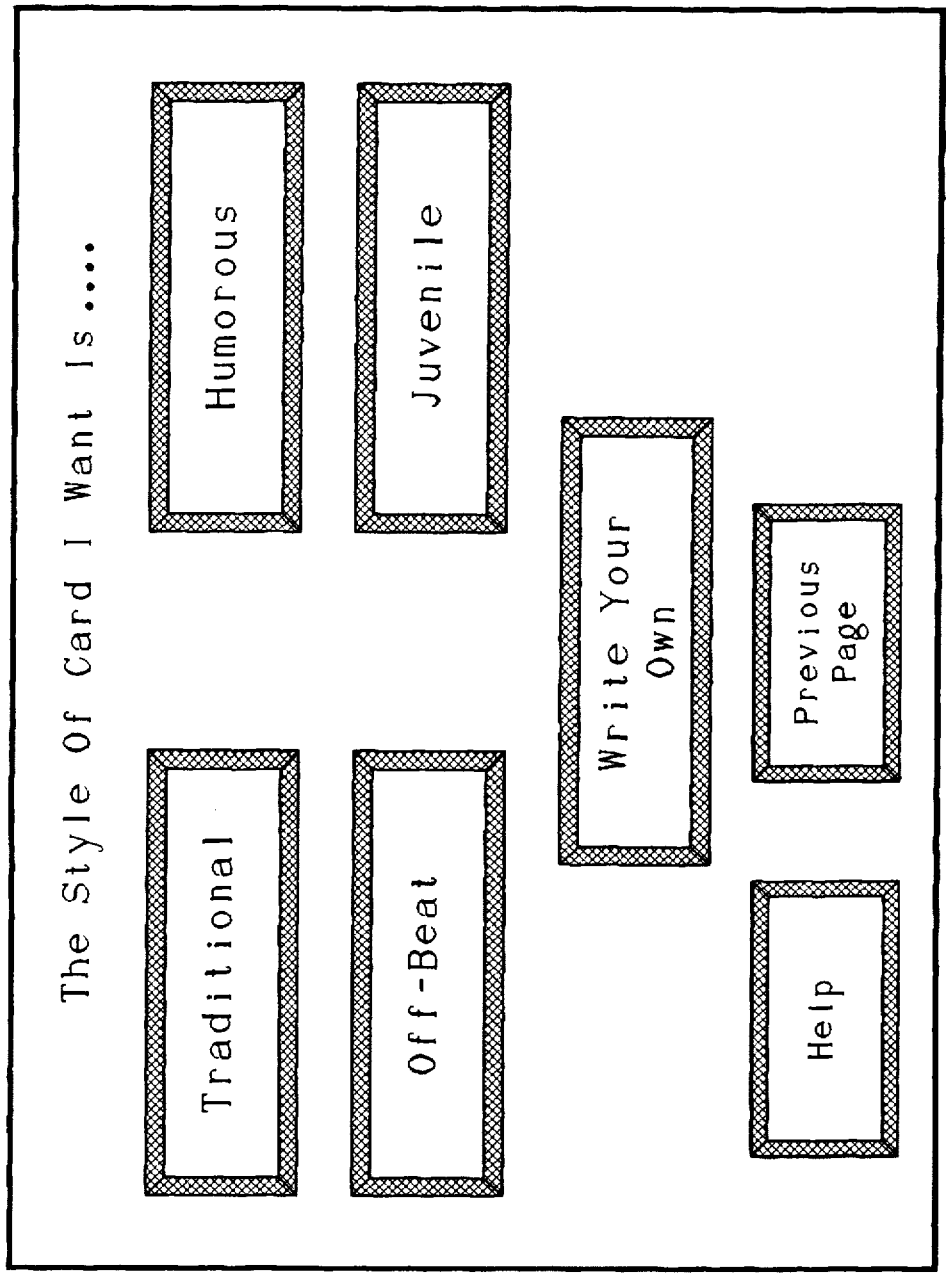

In the operation of the apparatus 9, the computer 13 first displays on the monitor 11 a menu of language choices, such as "English," "French," "German," and "Spanish," as shown in FIG. 4. When the customer selects one of these languages by pressing the touchscreen 12, a command is sent to the computer 13, blocking out the files of all card designs and design components that contain textual elements in other languages. Then, the computer 13 displays on the monitor 11 a menu of sending occasions, representing the first set of criteria choices from which the customer is asked to make a selection. An example of such a display in FIG. 5 shows the criteria choices of "Birthday," "Anniversary," "Congratulations," "St. Patrick's Day," "Friends & Lovers," "Valentine's Day," "Have A Nice Trip," "Mother's Day," "Thank You," "Get Well," "Announcement," and "Easter." When the customer makes his selection by pressing the touchscreen 12, the selection is sent to a storage file in the computer 13. Then, the computer 13 displays on the monitor 11 a second set of card design criteria, an example of which is shown in FIG. 6. The contents of this second set of criteria may be, but need not be, dependent on the customer's choice from the first set of criteria. In this example, the second criteria choices relate to the type of person who will be receiving the card and the buttons are labelled, "Girlfriend," "Friend," "Co-Worker," "Ex-Wife," "Lover," "Buddy," "Employee," "Goddaughter," "Fiancee," "Classmate," "Boss," and "Godmother." After the customer chooses one of these criteria and the answer is stored in the computer 13, the monitor 11 displays a third set of criteria, an example of which is shown in FIG. 7. Again, the contents of this third set of criteria may or may not be dependent on a previous criterion chosen by the customer. In this example, the third set relates to the age of the person who will be receiving the card and includes the criteria, "0 to 2 years," "3 to 7 years," "8 to 13 years," "14 to 19 years," "20 to 35 years," "36 to 65 years," and "over 65 years." When the customer's selection from that set of criteria has been stored in the computer 13, the monitor 11 displays a fourth set of criteria relating to the style of the card design desired. This display, shown in FIG. 8, includes the criteria, "Traditional," "Humorous," "Juvenile," and "Write Your Own." Other sets of criteria, relating to such categories as the gender of the sender or the recipient, the number of senders or recipients and the mode of address, may be presented on further screen displays. However, for this example, the number of categories is limited to four. On each succeeding menu screen, the criterion choices preferably would, but need not, depend upon the criterion chosen from the previous menu.

Figure 9:
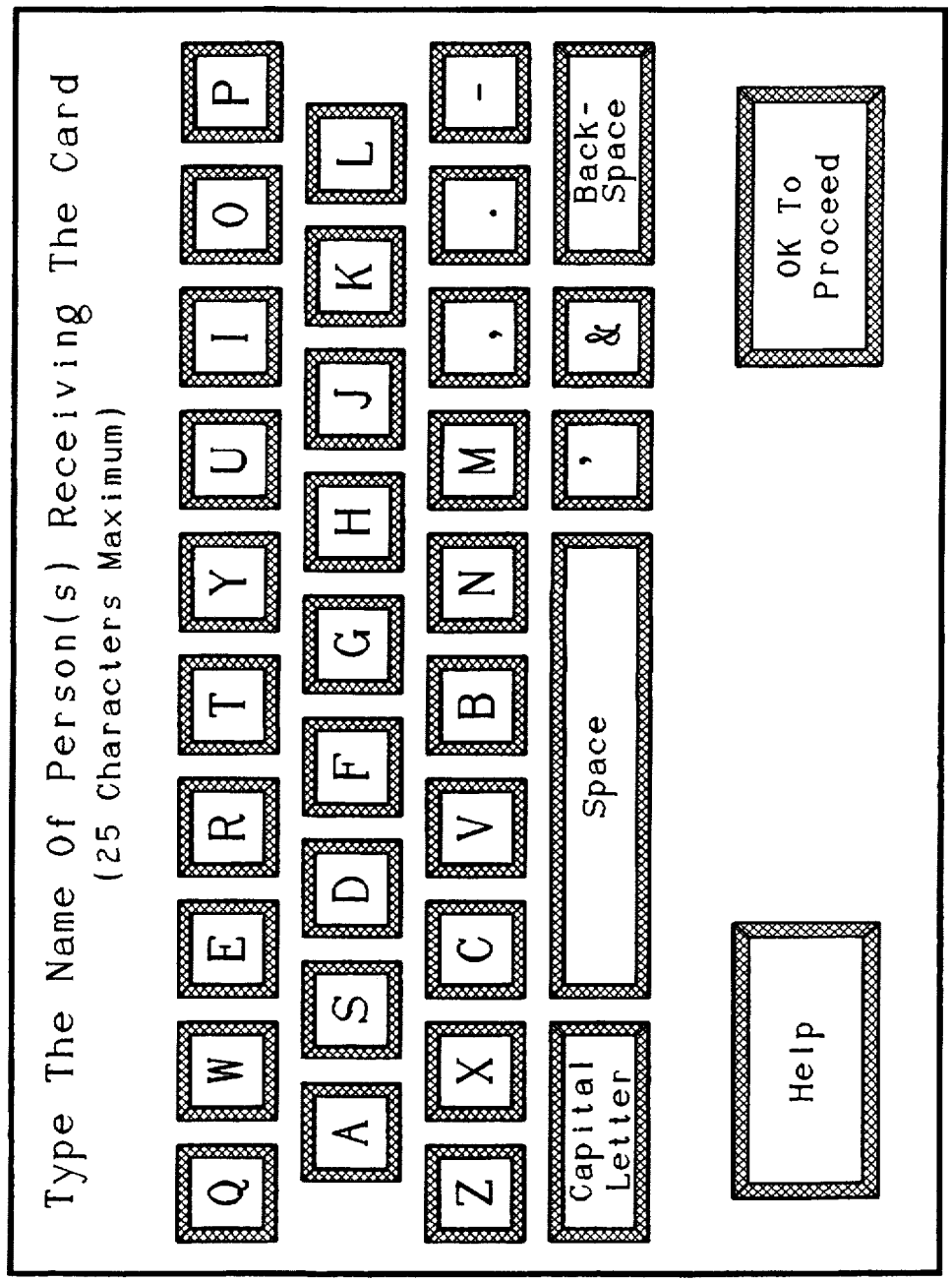

Alternatively, the computer may be equipped with a lexicon translator 38 (FIG. 3) that allows the customer to enter his own criteria words and phrases, by means of a keyboard shown in FIG. 9. The lexicon translator 38 correlates the words entered by the customer with the standard words and phrases used in creating the expert judgment factor matrices for each card design.

After the customer selects one card design criterion from each of the category displays presented on the monitor 11, the computer 13 uses this criteria to evaluate each of the card designs that are stored in the partition 29 of the main file 15.

The computer 13 performs that evaluation by retrieving the expert judgement factors for each of the criteria selected by the customer that are stored in the matrix of judgement factors stored with each card design file in the partition 29. The computer 13 then calculates a suitability rating for each card design by combining those judgement factors by means of one or more algorithms. The algorithms used may be very simple or they may be more complex. Examples of algorithms which possess the desired properties are given by the following equations:

Algorithm 1.0

$$(SR)_{AiK}=[(j_{Ai1})(j_{Ai2})\cdots(j_{Aim})]$$

This algorithm may also be stated using the multiplication $\Pi$ notation:

$$(SR)_{AiK} = \prod_{k=1}^{m} j_{Aik}$$

where:

$(SR)_{AiK}$=the combined suitability rating for design component i of design A with respect to criteria 1 through m (consisting of the set K) identified by the customer (or, after translation by the lexicon translator); and $j_{Aik}$=the expert judgement factor measuring the probability that component i of card design A will be suitable for the criterion k selected by the customer.

Algorithm 2.0

$$(SR)_{AK}=[(SR)_{A1}(SR)_{A2}\cdots(SR)_{An}]$$

Using the $\Pi$ notation, this algorithm would be:

$$(SR)_{AK} = \prod_{i=1}^{n} (SR)_{AiK}$$

where:

$(SR)_{AK}$=the suitability rating for design A comprising components 1 through n for any customer-specified set of criteria K.

The application of the Algorithms 1.0 and 2.0 in succession may be represented by the following equation:

$$(SR)_{AK} = \prod_{i=1}^{n} \prod_{k=1}^{m} j_{Aik}$$

Alternatively, the mathematical operations may be performed in a reverse sequence by applying the following Algorithms 1.1 and 2.1 sequentially:

Algorithm 1.1

$$(SR)_{AIk} = \prod_{i=1}^{n} j_{Aik}$$

where:

$(SR)_{AIk}$=the combined suitability rating for all components 1 through n, of design A, with respect to the criterion k selected by the customer.

Algorithm 2.1

$$(SR)_{AK} = \prod_{k=1}^{m} j_{A/k}$$

The reverse sequence performed by Algorithms 1.1 and 2.1 would allow the values corresponding to $(SR)_{A/k}$ to be calculated in advance of any customer operating the apparatus 11. These values would be stored by the computer 13 in association with the judgement factor matrix attached to each design. This procedure might speed up the transaction time when customers operate the machine. If the judgment factors are changed in response to past customer selections or for any other reason, then the computer would calculate new $(SR)_{A/k}$ values and store them with the judgement factor matrix of each card design. Of course, this procedure could not be used with any system that allows components to be replaced.

A more complicated algorithm would be one that uses indices to weight the judgement factors for different components of the card design and also indices to weight the judgement factors for different categories of criteria, as illustrated below:

Algorithm 1.2

$$(SR)_{AiK} = \prod_{k=1}^{m} X_k j_{Aik}$$

where $X_k$=the weighting factor applied to judgement factor $j_{Aik}$ to represent the importance to be attached to the category of criteria from which criterion k is drawn.

Algorithm 2.2

$$(SR)_{AK} = \prod_{i=1}^{n} Y_i (SR)_{AiK}$$

where $Y_i$=the weighting factor applied to the suitability rating $(SR)_{AiK}$ for component i (representing the combined judgement factors for criteria 1 through m) for the purpose of designating the relative importance to be attached to the category of components from which component i is drawn.

The application of Algorithms 1.2 and 2.2 in succession is represented by the following equation:

$$(SR)_{AK} = \prod_{i=1}^{n} \sum_{k=1}^{m} x_k Y_i j_{Aik}$$

Other algorithms may be used that expand or compress the range of suitability values derived from combinations of component-criterion judgment factors. The following is an example of such an algorithm:

$$(SR)_{AK} = \prod_{i=1}^{n} \sum_{k=1}^{m} X_k Y_i (j_{Aik})^p$$

where:

$p$ is an exponent whose value may be a fractional or whole number greater than zero, such as 2 which would cause the judgment factors to be squared thus magnifying their differences, or 0.5 which would cause the judgment factors to be square-rooted thus diminishing their differences.

Of course the foregoing algorithms are shown by way of example only. Many other algorithms may be used, while remaining within the scope of the claimed invention. A simple algorithm might comprise a series of screening passes. On the first pass, only designs or components having expert judgment factors that are 1.0 for each of the criteria selected by the customer would be selected for display to the customer. On the second pass, only designs or components having expert judgment factors over 0.9 would be selected, and so on, with each pass having a lower judgment factor threshold. Such an algorithm might identify an adequate number of eligible designs very quickly without the computer having to perform calculations for every design and component stored in the main design file 15.

To show how the computer 13 would calculate the suitability rating of a particular card design using the algorithm of Equation 1, suppose the customer had selected the following criteria: "English" from the screen display of FIG. 4, "Birthday" from the screen display of FIG. 5, "Buddy" from the screen display of FIG. 6, "20–35 Years" from the screen display of FIG. 7 and "Traditional" from the screen display of FIG. 8. Also, suppose that one of the card designs in the partition 29 had a matrix of judgement factors in which: the Heading component was rated 1.0 for the "English" criterion, 1.0 for the "Birthday" criterion, 0.5 for the "Buddy" criterion, 0.7 for the "20–35 Years" criterion and 0.6 for the "Traditional" criterion; the Text component was rated 1.0 for the "English" criterion, 1.0 for the "Birthday" criterion, 0.9 for the "Buddy" criterion, 0.8 for the "20–35 Years" criterion and 0.8 for the "Traditional" criterion; and the Graphics component was rated 1.0 for the "English" criterion, 1.0 for the "Birthday" criterion, 0.8 for the "Buddy" criterion, 0.9 for the "20–35 Years" criterion and 0.7 for the "Traditional" criterion. Using Algorithms 1.0 and 2.0 above, the computer 13 would perform the calculation shown in the following Example 1:

EXAMPLE 1

$(SR)_{AK}$=(1) (1) (0.5) (0.7) (0.6) (1) (1) (0.9) (0.8) (0.8) (1) (1) (0.8) (0.9) (0.7)

$(SR)_{AK}$=0.0610848

After determining the suitability ratings of all the card designs stored in the partition 29, the computer 13 ranks these ratings from the highest to the lowest. It then retrieves the display commands for the card designs with the highest ratings. The standard used by the computer for this retrieval process can be all the card designs having ratings above a certain threshold value, a fixed number of the highest rated designs, such as the ten highest rated designs, a random sample of ten designs drawn from the top twenty, or the computer 13 may be programmed with any other standard deemed desirable. After retrieving display commands for these designs, the computer displays the designs on the monitor 11, preferably in the order of their suitability ratings, from the highest to the lowest. If the screening pass technique is used for the algorithm that calculates the suitability ratings, then the card designs may be displayed immediately, in the order in which the computer determines that the designs have met the threshold judgment factor screening criterion.

Figure 10:
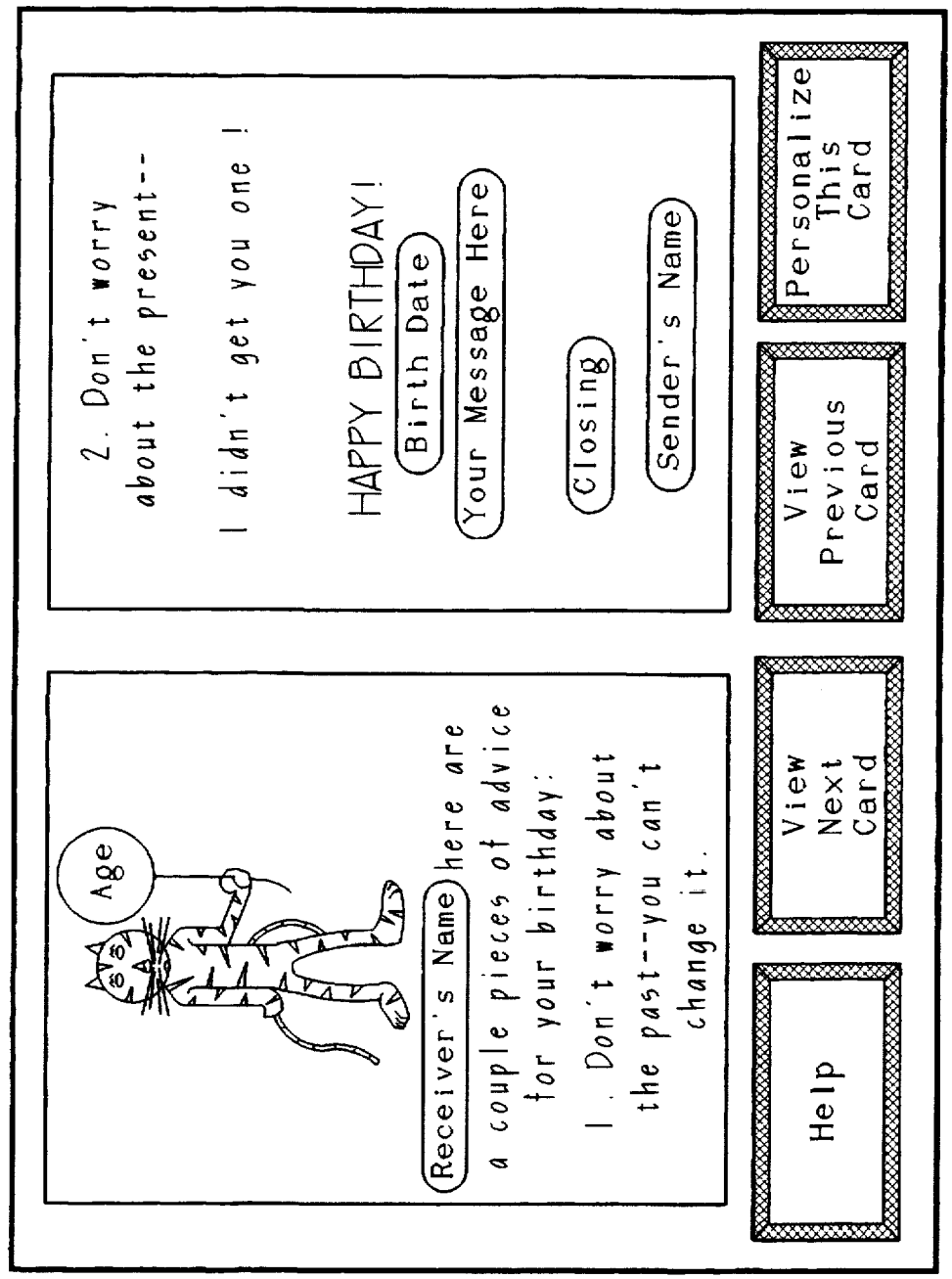

The customer then reviews the card designs retrieved by the computer, paging through the designs by means of a button or other input indicia displayed on the apparatus 9. An example of a screen displaying one of the retrieved card designs is shown in FIG. 10. The designs may be displayed either individually or in groups of several designs. The computer 13 may be programmed to allow the customer to see designs in addition to those selected for initial display. In that case, a button should be displayed on the monitor 11 allowing the customer to select that option. The number of additional designs displayed can be a fixed number or all the designs having a rating above a threshold value. Also, the computer 13 can be programmed to allow the customer to make several requests to see more card designs. In that case, a button should also be displayed on the monitor 11 allowing the customer to scroll back and forth through all card designs previously displayed. Another button might allow the customer to hold in a screen inset a small version of a design of possible interest, while the customer looks at other designs. Still another button might enable the customer to indicate that a design is or is not of potential interest and to include or exclude that design during the next review.

In addition to retrieving the highest rated card designs for presentation to the customer, the computer 13 can also modify other designs whose ratings do not initially qualify for presentation. It can be programmed to do this under a variety of circumstances, such as when there are less than a minimum number of card designs having suitability ratings above a threshold rating or when the average of the highest ten or twenty suitability ratings is below a threshold rating. When one of those circumstances exists, the computer will re-evaluate some or all of the card designs having separable or replaceable components. It may be programmed to re-evaluate certain categories of those card designs, such as all card designs whose suitability ratings fall below a threshold value or a fixed number of the highest rated card designs whose suitability ratings fall below a threshold value. To re-evaluate a card design, the computer 13 calculates the suitability rating of each separable or replaceable design component using the same algorithm it used for calculating the suitability rating of the entire design. Then, it eliminates or replaces the card component having the lowest suitability rating. If the component is replaceable, the computer 13 searches for a replacement component of the same category as the original component (Heading, Text, Border, Graphics or Page 1, 2 or 3), having the highest suitability rating of all the components in that category. This searching is carried out among the separable components and replaceable components of the card designs stored in the partition 29, as well as the spare components stored in the partition 34. Using the expert judgment factors stored with each design component file, the computer 13 calculates the suitability rating of each component stored in the partition 34 and finds the component having the highest suitability rating. Then, it calculates a new suitability rating for the card design, using the judgment factors of both the remaining, unseparated components of the card design and the newly found component. If that new suitability rating is above the threshold value for displaying the card design, then the computer 13 retrieves the display commands for all the components of the new design and displays the design on the monitor 11.

To assist the computer 13 in searching and retrieving replacement components, a permanent or temporary data storage file may be established that has separate files for each of the separable and replaceable design components in the main storage file 15, including both the components of the complete card designs stored in partition 29 and the spare components stored in partition 34. Each of these files would hold the display and print commands and expert judgment factors for one component. With all the commands and judgment factors of all the components stored in one location, the computer 13 can search and retrieve all the component files more efficiently. Also, it may be easier to program the computer 13 to retrieve the commands for such components apart from the commands from the remaining parts of their card designs by the use of separate permanent or temporary storage files of such components.

In an alternate embodiment, the computer 13 may be programmed to search the spare components of partition 34 along with its search of the complete card designs in partition 29. The computer 13 would then select for display to the customer those spare components having suitability ratings that either are above a minimum threshold value or meet some other standard. A group of components would be selected for display from each card part category, as identified by their category indicia. Thus, the customer would be presented with a group of components from each part of a complete card design. The computer 13 would then give the customer the option of selecting either a complete card design retrieved from the partition 29 or a combination of components retrieved from the partition 34. The computer would also be programmed to accept only combinations of design components that consist of one component of each design category, such as "Heading," "Text," "Border," "Graphics," "Page 1," "Page 2" and "Page 3." Preferably, the computer 13 would accept only combinations of components that fit well together, according to matching indicia stored in partition 34 with the file of each component. If these matching indicia did not match, the computer would prompt the customer to select another component or component and would repeat that process until matching indicia of the components selected by the customer did match each other.

In a further alternate embodiment, the partition 29 of complete card designs may be eliminated, and only the card components of partition 34 would be searched by the computer 13 and then assembled and displayed for the customer's selection on the monitor 11.

Figure 30:
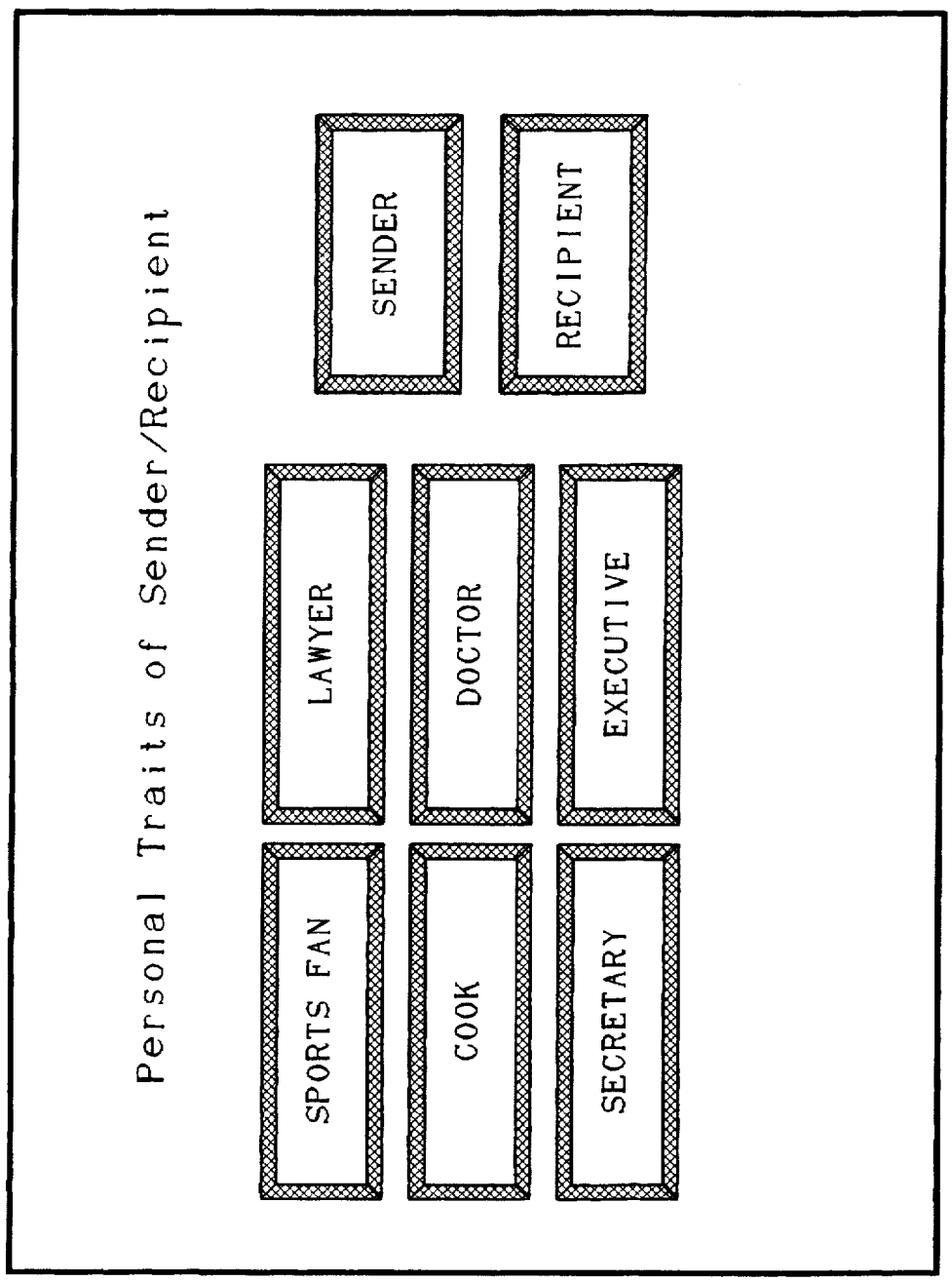

If the main card design file 15 has a partition 36 (FIG. 3) containing customizing components, the customer may be prompted by the monitor 11 to answer questions about the card receiver or sender, the sending occasion, or other matters relating to why the card is being sent. An example of a simple screen display that elicits such information is shown in FIG. 30. The customer then presses the appropriate boxes displayed on the monitor 11. Through the touchscreen 12, the computer 13 receives the customer's answers and retrieves customizing components from the partition 36 that have labels matching the customer's answers. The computer 13 then displays these customizing components on the monitor 11. The customer is then given the option of modifying the card design he has already selected by selecting one of the displayed customizing components to be inserted in a blank space on the card. If the customer makes such a selection by touching the touchscreen 12, the computer adds the print commands for the customizing component to the print commands for the card design previously selected by the customer.

Another feature that may be added to the apparatus 9 is that of allowing the customer to make modifications of his own creation to his selected card design. The customer may be prompted by the monitor 11 to type in his own text additions in specially designated or blank spaces in the design, or he may be given more sophisticated tools for changing his design, such as an electronic stylus. With either the stylus or the keyboard or both, the customer may be given the ability to eliminate certain parts of the design or add figures or lines to the design. All of the customer's changes are transmitted by the touchscreen 12 to the computer 13. The computer 13 then generates print commands embodying the changes and adds the commands to the original print commands of the design selected by the customer.

Figure 11:
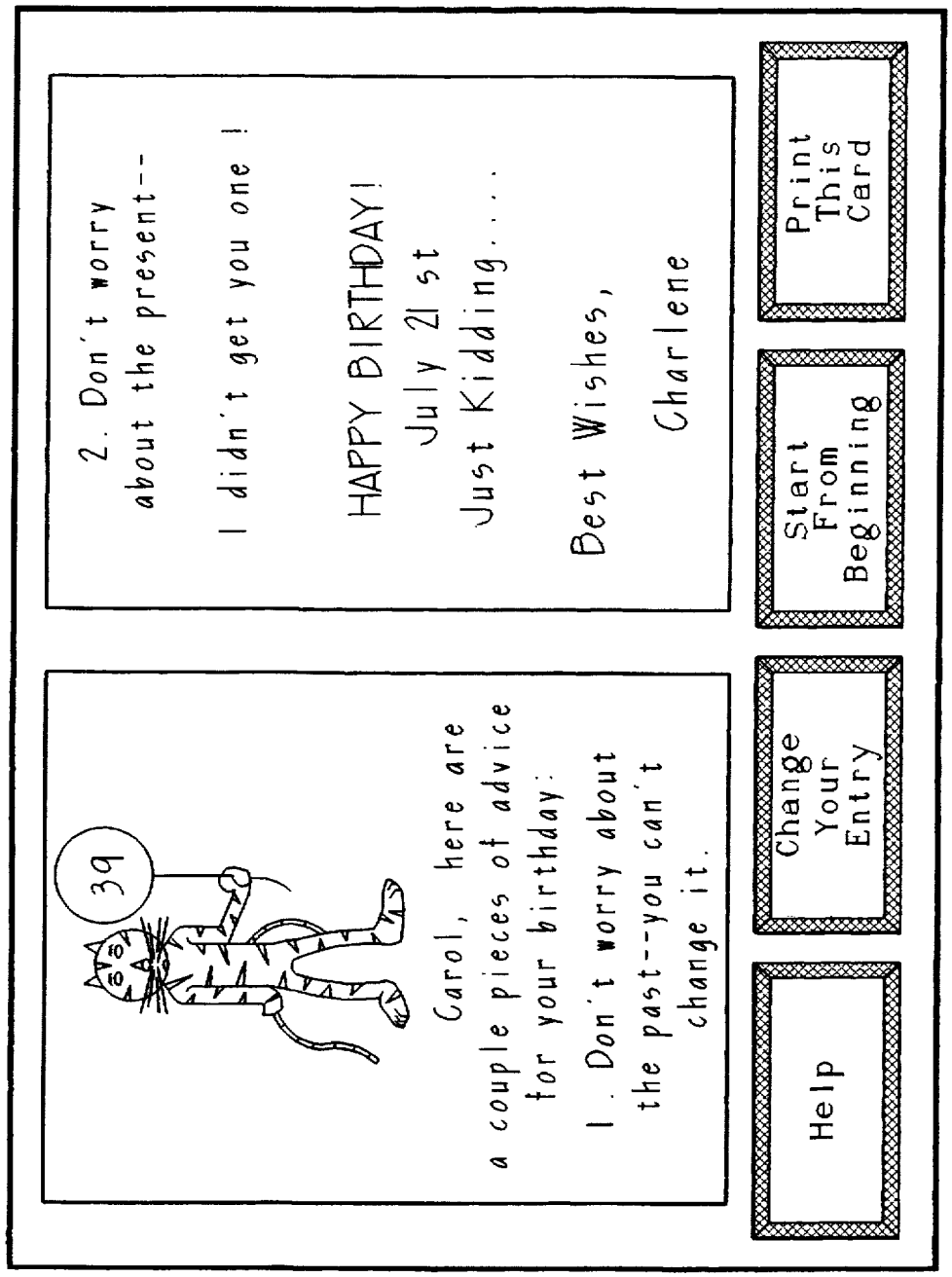

When the computer 13 receives the customer's selection of a card design or combination of components, as well as the changes that the customer has selected, the computer 13 shows the customer what the completed card would look like by means of a screen display such as that shown in FIG. 11. If the customer presses the "Print This Card" button on the screen display, the computer 13 sends the necessary print commands to the printer 16. The printer 16 prints the design or design components on blank or preprinted card stock stored in its feed tray or in a ready print status. Preferably, the printer 16 is placed in the kiosk 10 in front of a window that allows the customer to watch his design being printed. However, the printer 16 may be placed outside the kiosk 10, either at a nearby location or at a remote location. One printer 16 may be used to serve the apparatus 9 of several kiosks that are networked together.

If desired, the expert judgment factors stored in the card design files of partition 29 and in the spare components files of partition 34 may be changed after their associated card designs or components are either selected or rejected by a customer. The computer 13 may be programmed to increase by a small percentage the factors of selected designs and components and to decrease by a small percentage the factors of designs and components that were not selected by the customer. Of course, these changes would be made only to the factors that relate to the criteria chosen by the customer. Also, the computer 13 may be connected to the computers of other apparatus like the apparatus 9. Each of these computers would then be programmed to change the expert judgment factors stored in its associated data storage device in response to receiving indications of similar changes made to the same factors for the same product designs and components stored in other apparatus in the network. The computer may also be programmed to record on an auxiliary data storage device the customer entered criteria, the designs and components displayed and the customer's choice. These data may be downloaded to a data storage device, removed to a storage device or communicated to another facility so that they may be reviewed and analyzed.

If the kiosk 9 includes a payment device 18, then the device 18 prevents the print commands from the computer 13 from operating the printer 16 until the required amount of money has been deposited. The various functions performed by the computer 13 may each have a fee assigned to them, in which case the computer maintains a running total of the fees as it performs its functions and instructs the payment device 18 to require the deposit of the amount of the final total of fees before allowing the card design to be printed.

Figure 24A:
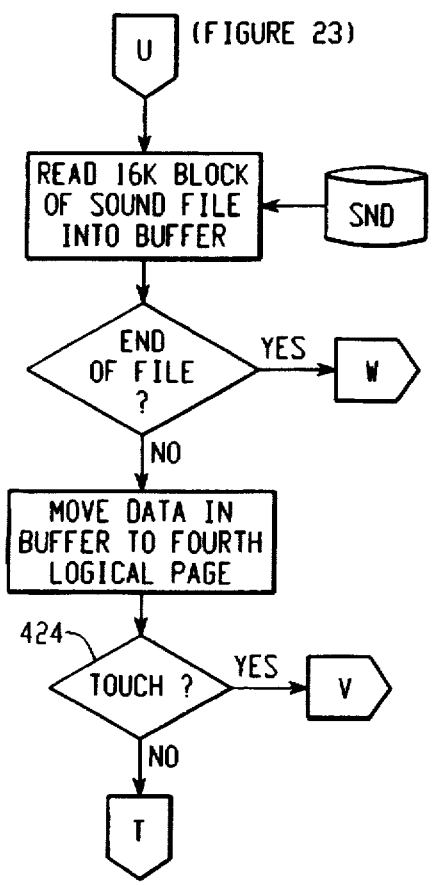
Figure 29A:
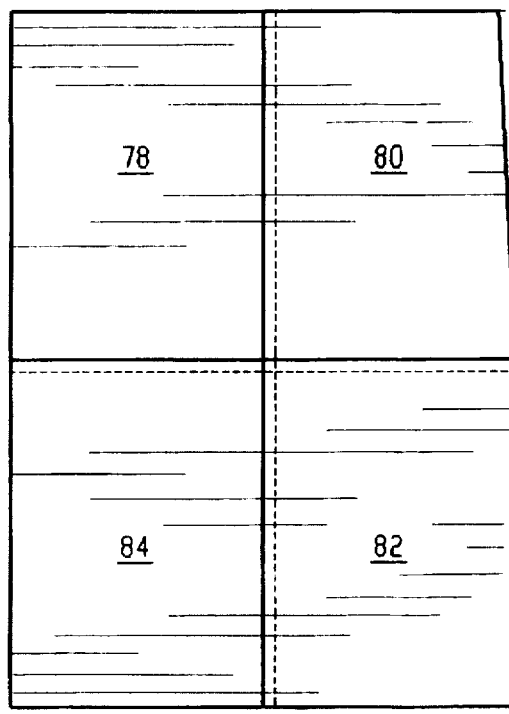
FIGS. 29a, 29b and 29c show an example of a sheet of card stock on which the apparatus of FIG. 1 may print selected social expression card designs.
Figure 29B:
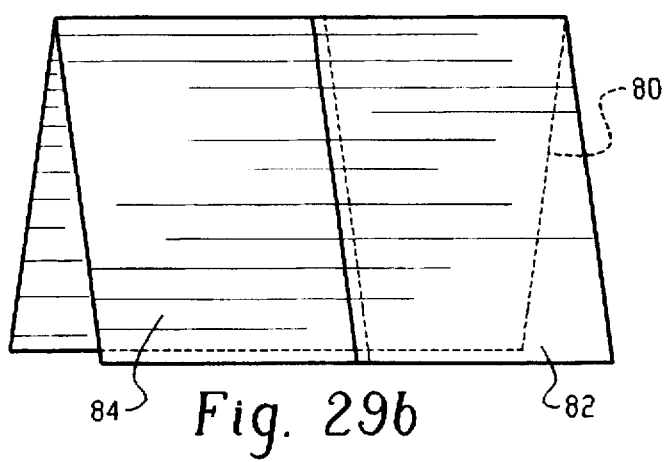
Figure 29C:
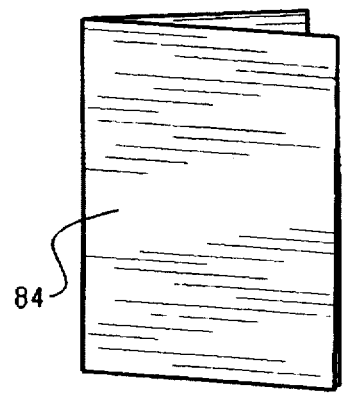

Upon completion of the printing process and when the printed card is ejected from the kiosk 9, it may be a flat sheet of card stock having quadrants 78, 80, 82 and 84, as shown in FIG. 29a. All the printing is done on one side of the flat card stock. Therefore, the card is folded twice in a predetermined manner so as to produce a card having print on both the inside and outside of the card. The card is intended to be folded such that quadrants 82, 80, 78 and 84 form the front, first page, second page and back, respectively. This may be accomplished by first folding the top half about a horizontal axis down behind the bottom half, as shown in FIG. 29b. Next, the left half is folded about a vertical axis so that it is positioned behind the right side, as shown in FIG. 24c. Once the card has been folded in this manner, it may be placed in an envelope available from a compartment on or adjacent to the kiosk 9. The printer 16 prints the cards such that the print appearing on quadrants 78 and 80 is inverse, or upside-down from the print appearing on quadrants 82 and 84. Thus, when the card is folded as described above, all the print appears right side up.

As it is desirable to have the edges of the card aligned when folded, the card may have prescored lines along the vertical and horizontal axes to indicate and facilitate folding. However, if the prescored lines are located along the central horizontal and vertical axes, the edges of the interior pages would protrude slightly due to the thickness of the paper. Therefore, to compensate for the thickness of the paper, the prescored lines may be located slightly off from and parallel to the exact central vertical and horizontal axes. Additionally, the right vertical edge of quadrant 80 may be slightly tapered as shown in FIG. 24a. The amount of the taper depends on the thickness and size of the paper and the amount of offset of the prescored lines from the center axes. For example, it may be seen that a card of 80# sheet stock, having a vertical length of 17 inches and a horizontal width of 11 inches, when folded according to the method described above, has edges that align with each other when the card contains a prescored vertical line $1/16$th inch to the left of the central vertical axis, a prescored horizontal line $1/16$th inch above the central vertical axis, and the right vertical edge of quadrant 80 tapered $1/16$th of an inch.

SYSTEM OPERATION

Figure 12:
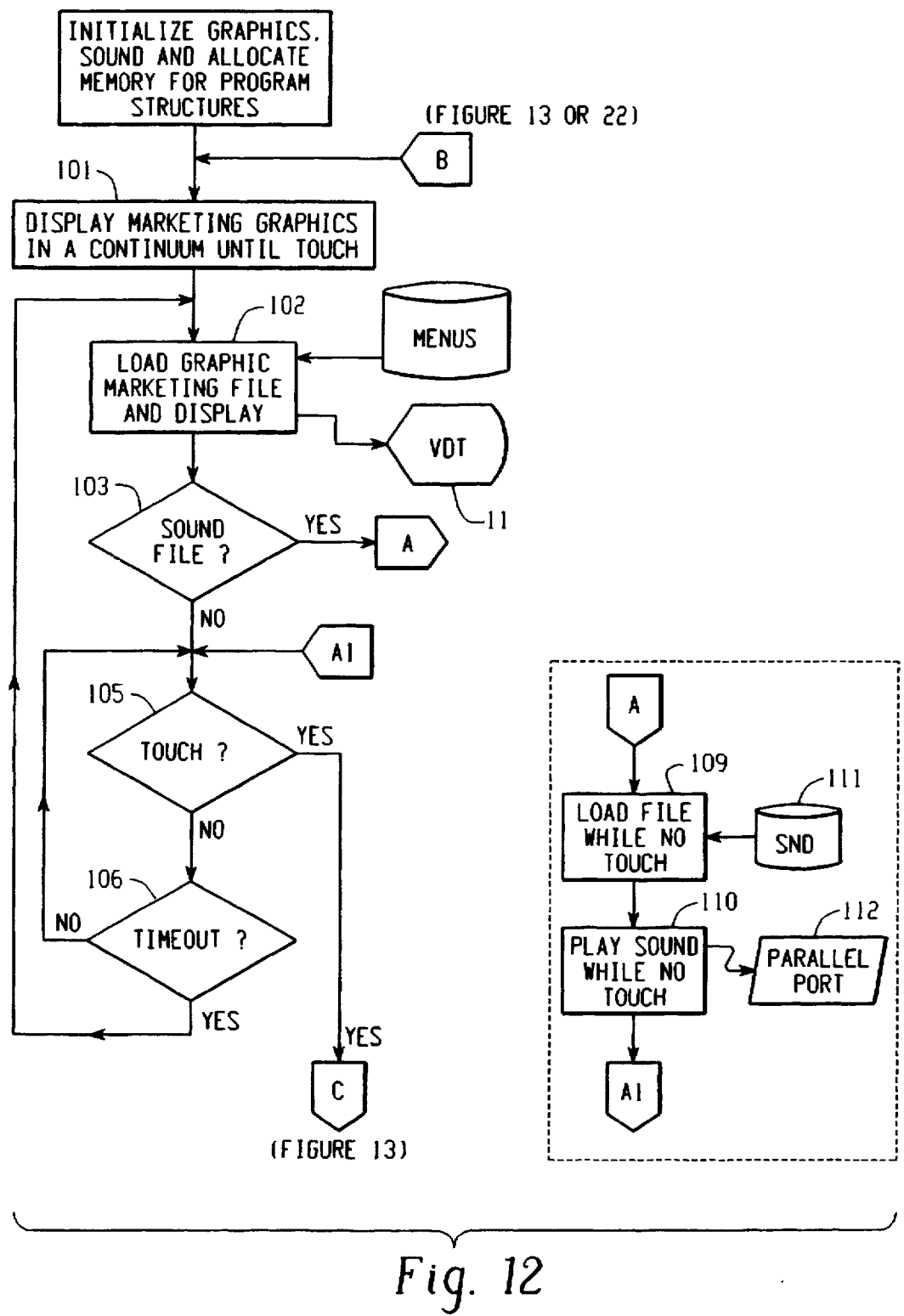
FIGS. 12 through 28 show flow diagrams of the operation of the apparatus of FIG. 1.

As shown in FIG. 12, the operation of the apparatus 9 may begin by presenting a recurring display of graphic images for the purpose of advertising, to attract the attention of customers passing by the unit. Each marketing graphic file is loaded from the hard disk 23 into RAM 21 and displayed on monitor 11 (FIG. 12, step 102). Then, the program checks for the existence of a sound file that may correspond to the current graphic image (step 103). This process of matching graphic displays with associated sound files may occur every time that an image is displayed. If an appropriate sound file exists, it is then read from the hard disk 23 into the RAM 21 and played through the audio system 19, attached with a special adapter to the parallel port 112 of the computer 13 (FIG. 12). During the loading and playing of the sound file, a touch on the touchscreen 12 can interrupt the process at any time.

Figure 13A:
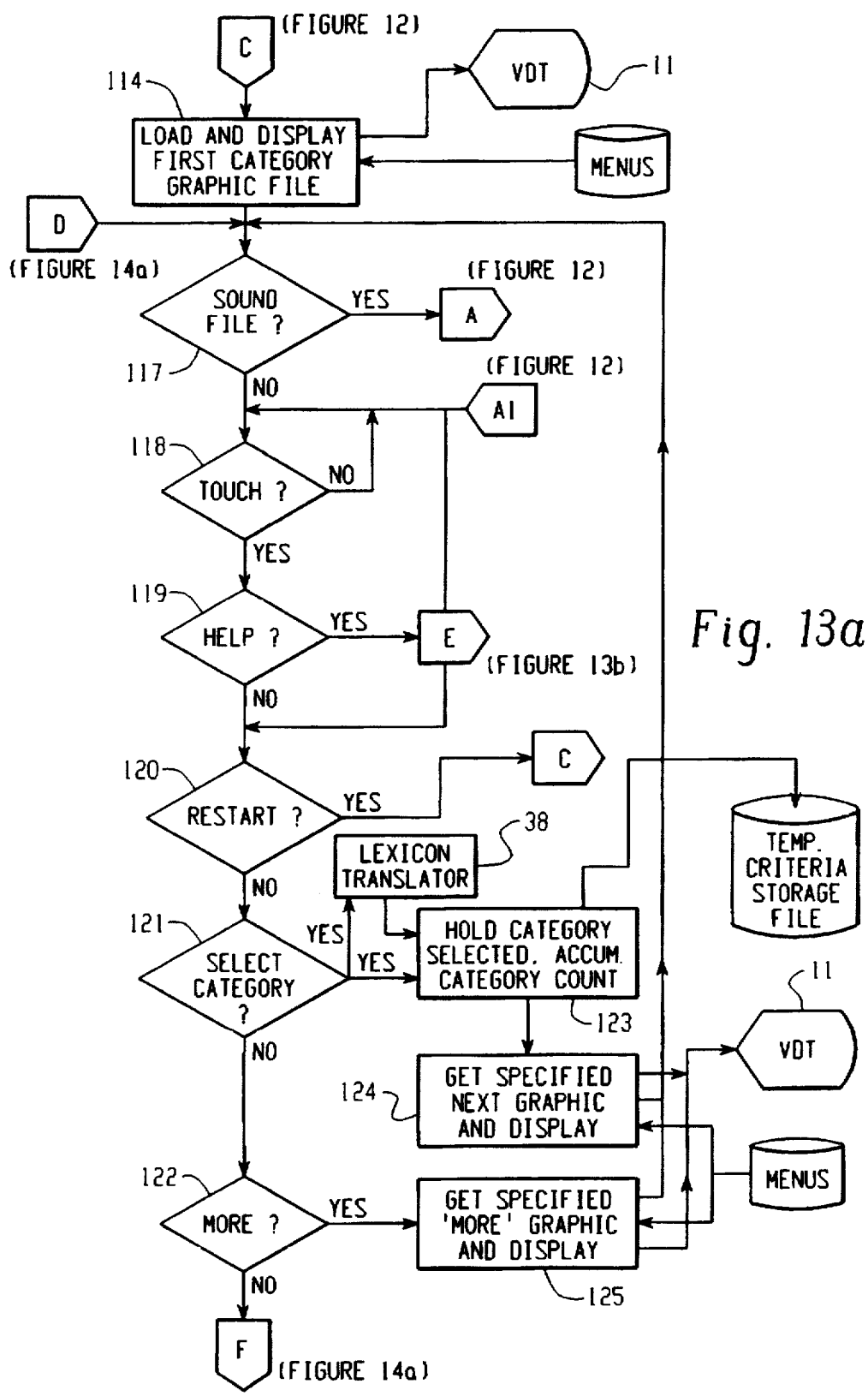
Figure 13B:
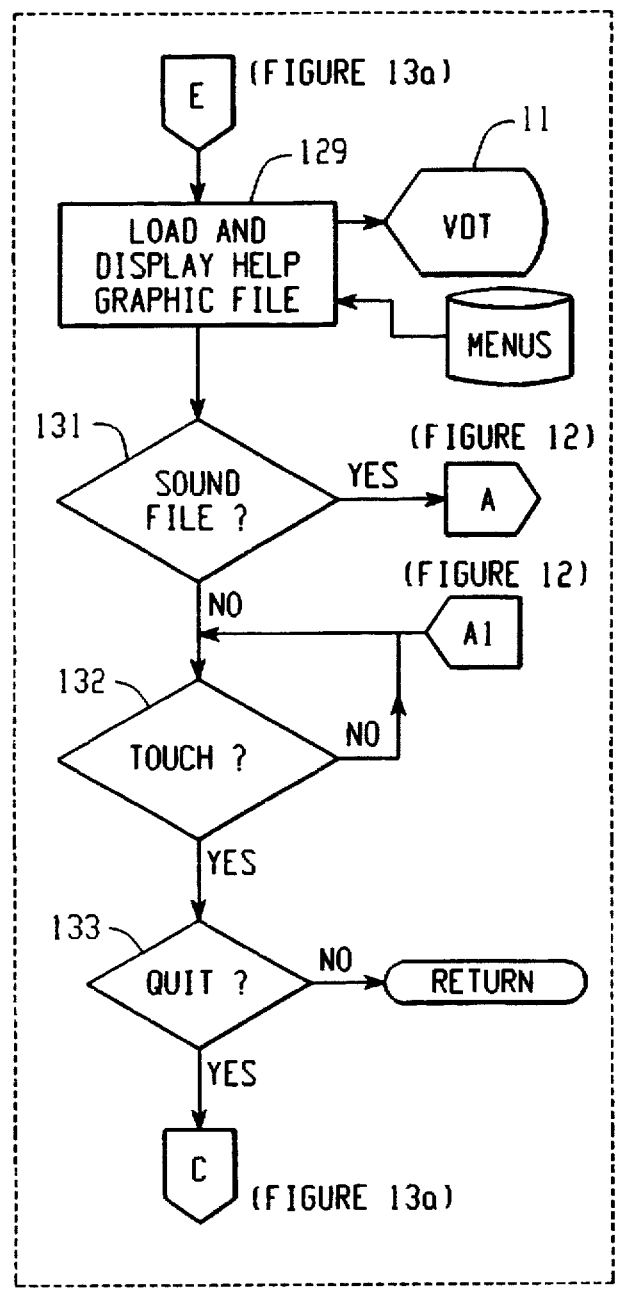

The card selection process begins at step 114 (FIG. 13). The first choices, for instance those shown in FIG. 4, are presented to the customer on the monitor 11. With the exception of the recurring marketing display, there is a timeout built into the touch routine. That is, if there is no touch detected within a preset interval, the program automatically returns to the cycling marketing screens (steps 101 to 106). From the first selection screen (FIG. 4), as well as all other selection screens (FIGS. 5 through 8), several actions are possible.

Program step 119 defines the processing of a help display in response to the touch of a help button, shown on all of the display screens in FIGS. 4 to 8. When any of these help buttons is pressed, a menu of help screens is displayed and the customer is invited to select one or more of the screens that he wishes to see. When the customer presses the return button on a help screen, the program redisplays the screen that was on the monitor 11 when the original help button was pressed. As shown in step 120 (FIG. 13), a customer can restart the process from any screen. This action will return the system to re-entry point 115, at the top of FIG. 13.

If the monitor 11 presents a choice of applications or categories, as shown starting in step 114 of FIG. 13, the choice selected by the customer in step 121 is saved in memory and the category counter is incremented (step 123). The specific category choice is contained in the action code element of the button definition and the next screen for display is identified from the next screen number. A screen may present the option to see additional responses to a given question which are not displayed on the present screen. Program step 122 defines a new selection screen at the same level.

Figure 14A:
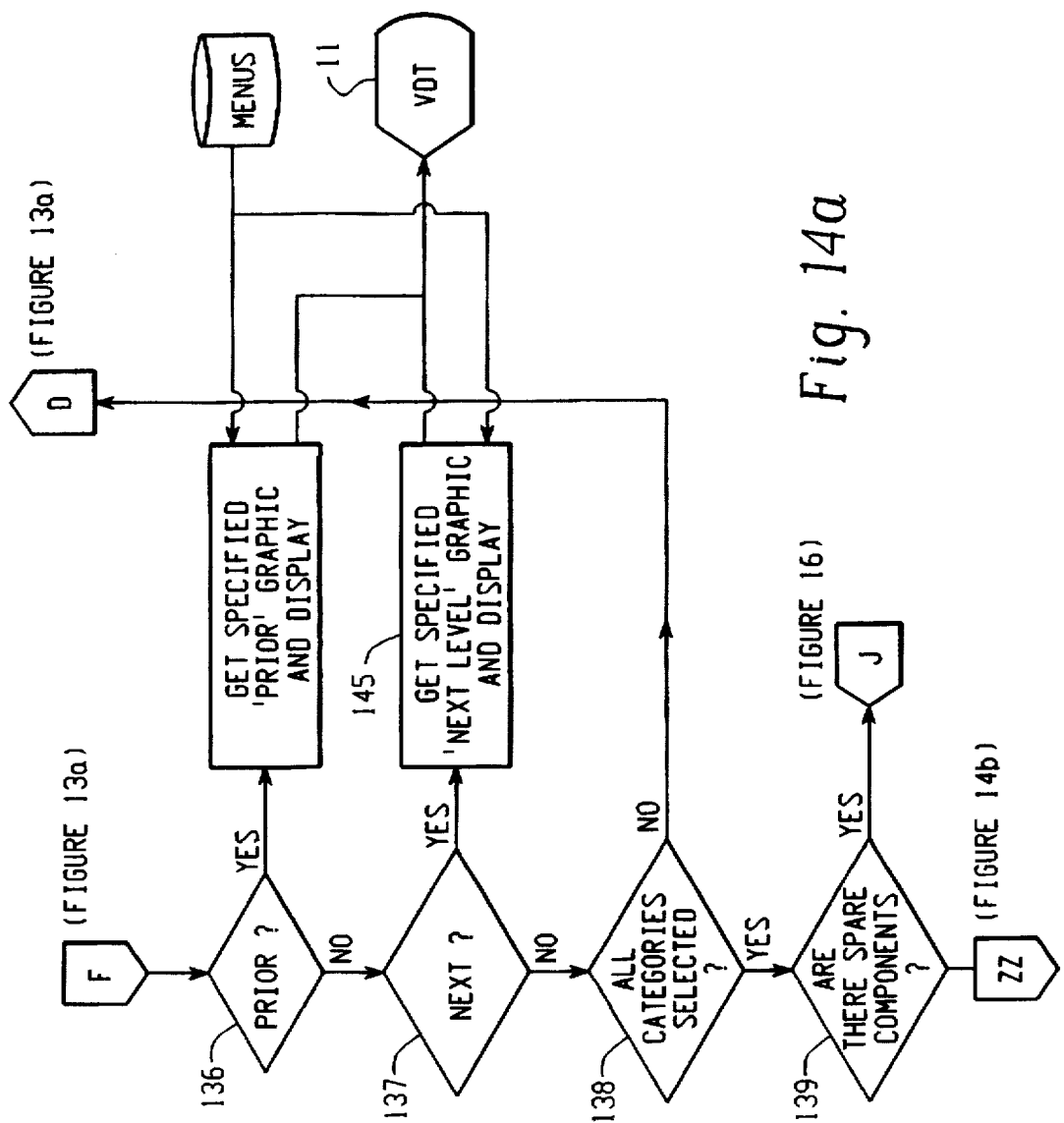
Figure 14B:
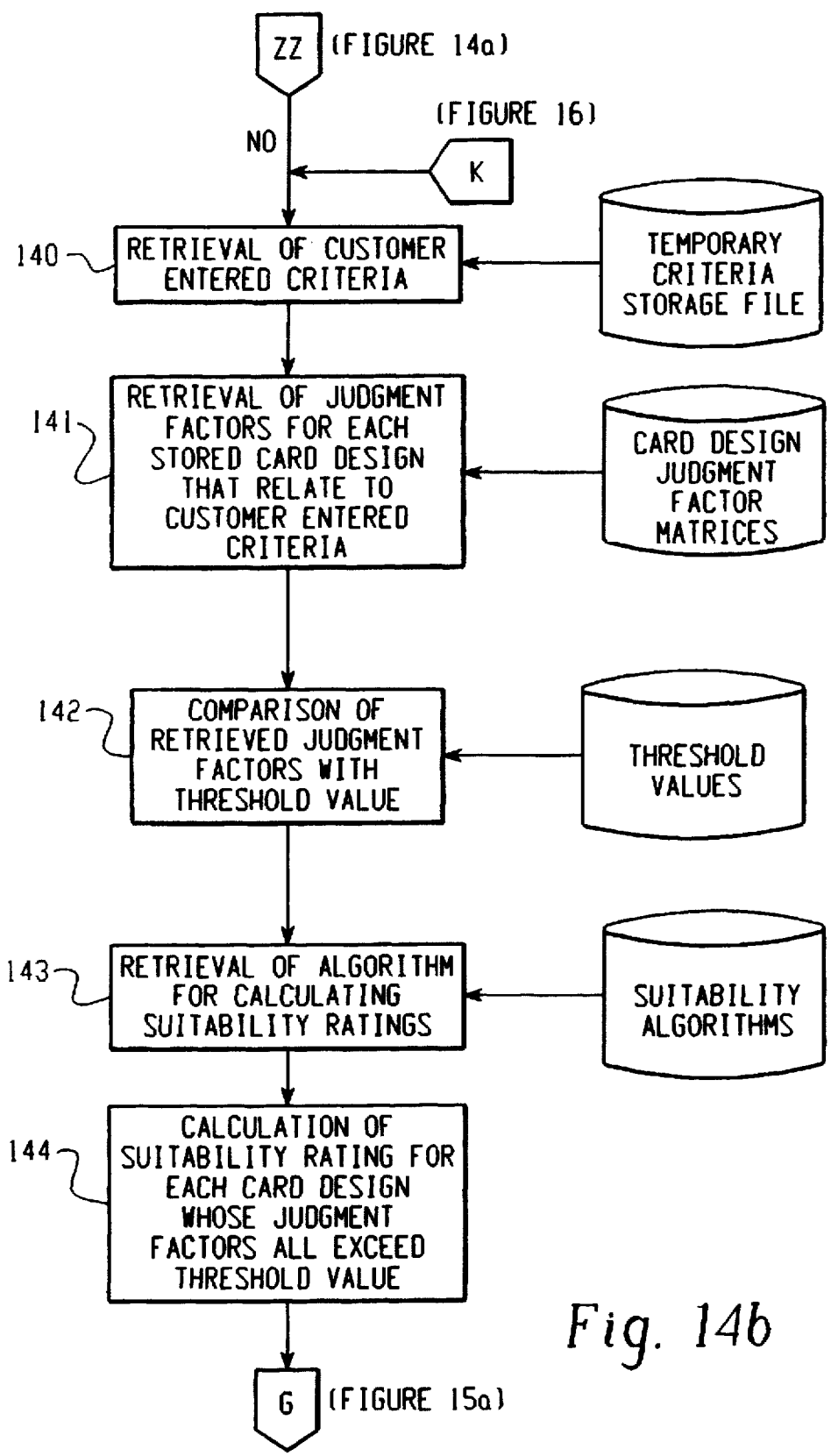

To reverse the menu flow, as traversed up to this point, the prior action many be taken from step 136 in FIG. 14. The screen defined in the prior screen number element of the current menu definition is then displayed. Any selections made on a screen appearing after the currently displayed screen are then blanked and the counter is reset.

Once all relevant selections at a given level have been made, the next level is presented at program step 137 (FIG. 14). FIGS. 5 through 8 show choices on subsequent levels that may be presented after a choice is made on the level shown in FIG. 4. The process of making selections at specific levels may be repeated until the customer has viewed all of the possible criteria and has selected those criteria best suiting his needs. The system may or may not include an "All Categories Selected?" query (step 138, FIG. 14), to determine whether the customer has selected a criterion from each category. If the answer to this query is "No," then the program goes back to step 117 (FIG. 13) through entry point C and progresses until step 138 is reached in order to ask the customer to select the missing criteria. However, this query is not necessary to the selection of card designs to be presented to the customer, because the algorithm by which the card designs are selected can be designed so that there does not need to be a customer-selected criteria from every category level.

As an optional feature of the apparatus 9, the computer 13 may be programmed to allow the customer to enter additional words to indicate criteria for his card design, rather than select from words presented in the screen displays of FIGS. 4 to 8. If this option is available, the keyboard of FIG. 9 is displayed on the monitor 11 in step 121 (FIG. 13) for each category level. The word or phrase entered by the customer is then sent to a lexicon translator 38, which correlates the word or words entered by the customer with one or more of the standard words or phrases for which expert judgment factors were created for the card designs stored in the card design file 15. The lexicon translator sends the correlated standard words or phrases to a temporary storage file of selected criteria (step 123, FIG. 13).

After receiving all the customer entered criteria, the computer 13 retrieves these criteria (step 140, FIG. 14) and also retrieves the judgment factors for each stored card design that relate to the customer criteria (step 141, FIG. 14). These judgment factors are preferably compared to a threshold value (step 142) and only those card designs that exceed that value are evaluated in the succeeding steps. Then, the suitability algorithm is retrieved and a suitability rating is determined for each card design (step 144). These suitability ratings are held in temporary storage (step 146, FIG. 15).

Figure 15A:
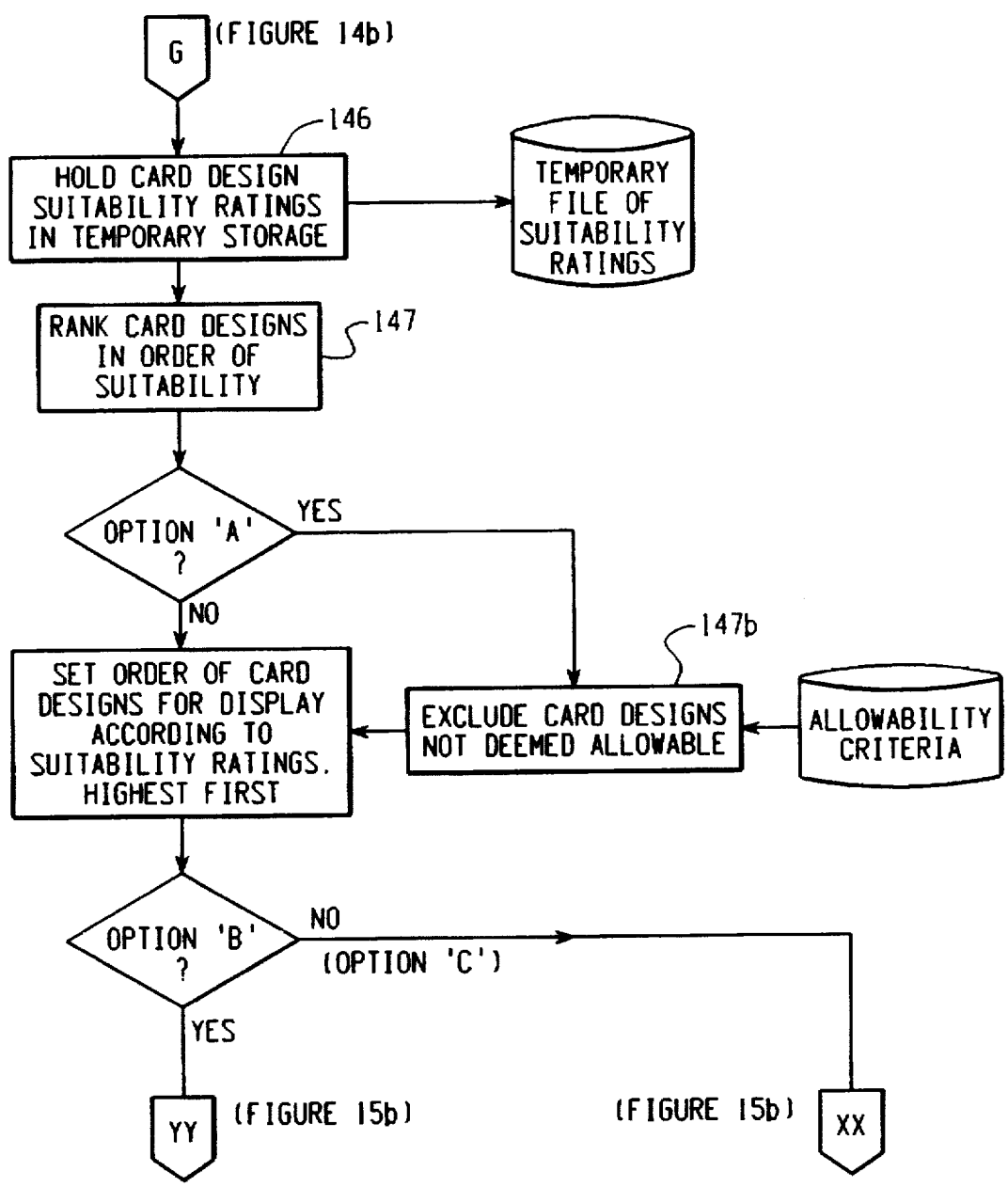
Figure 15B:
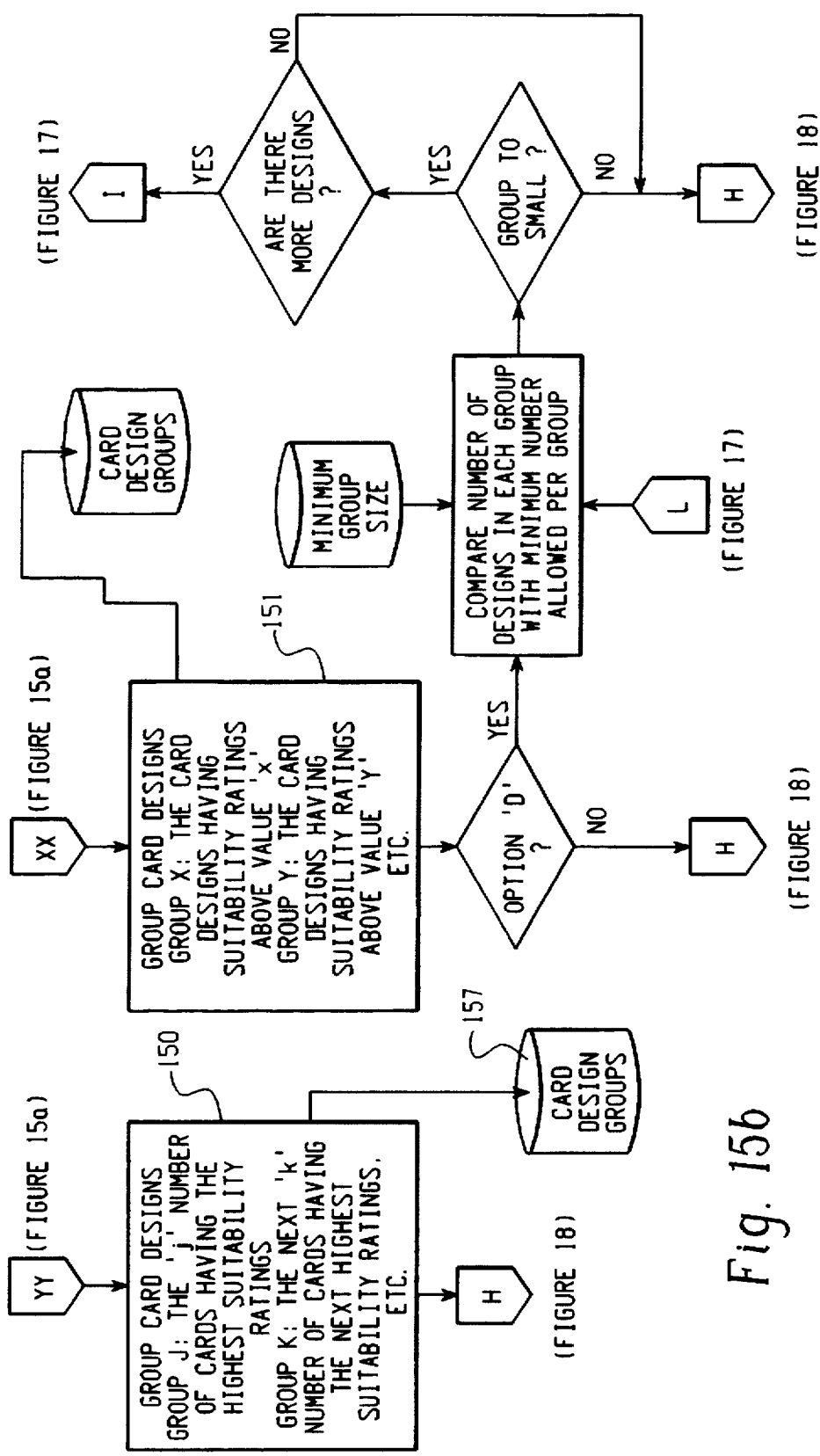
Figure 16A:
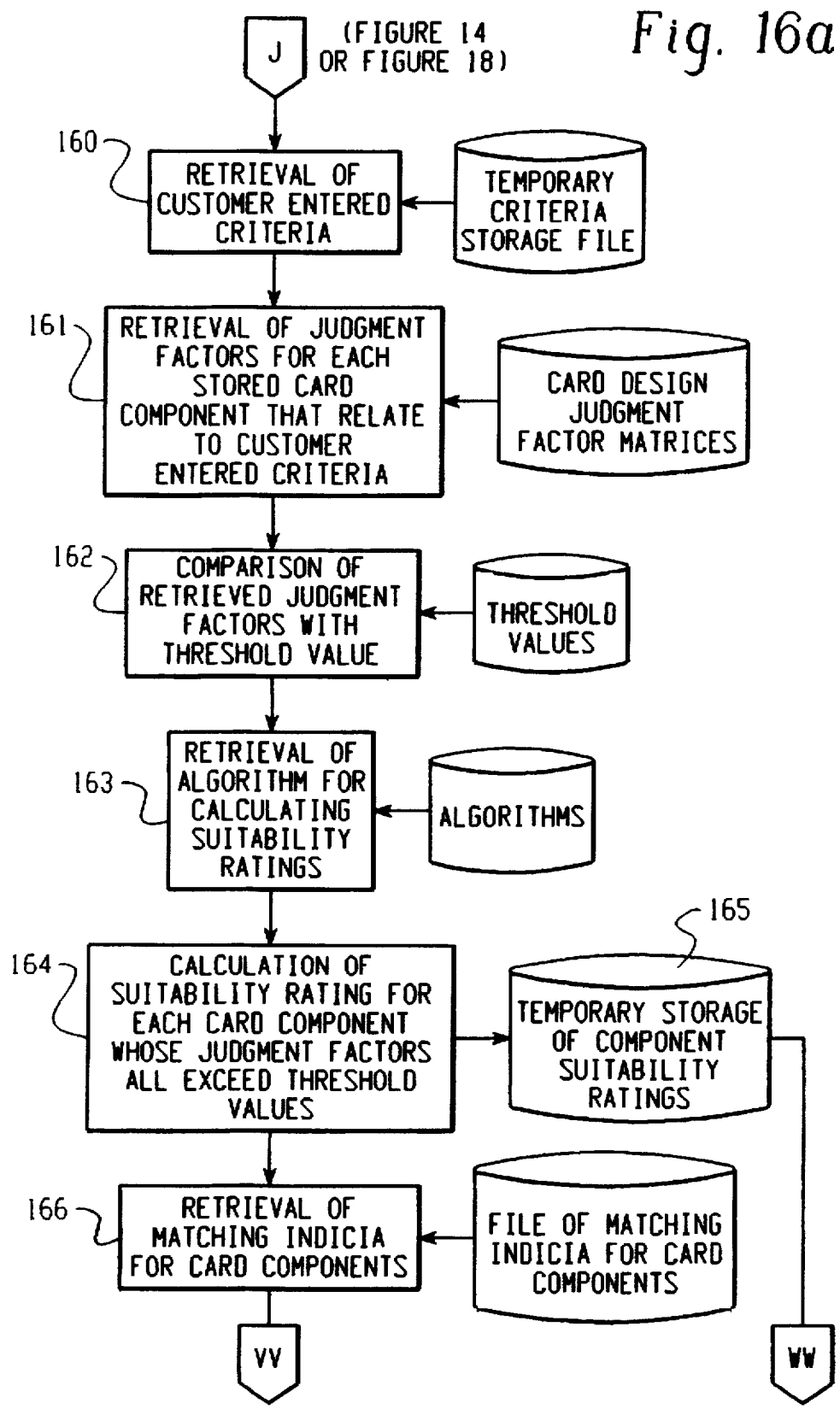
Figure 16B:
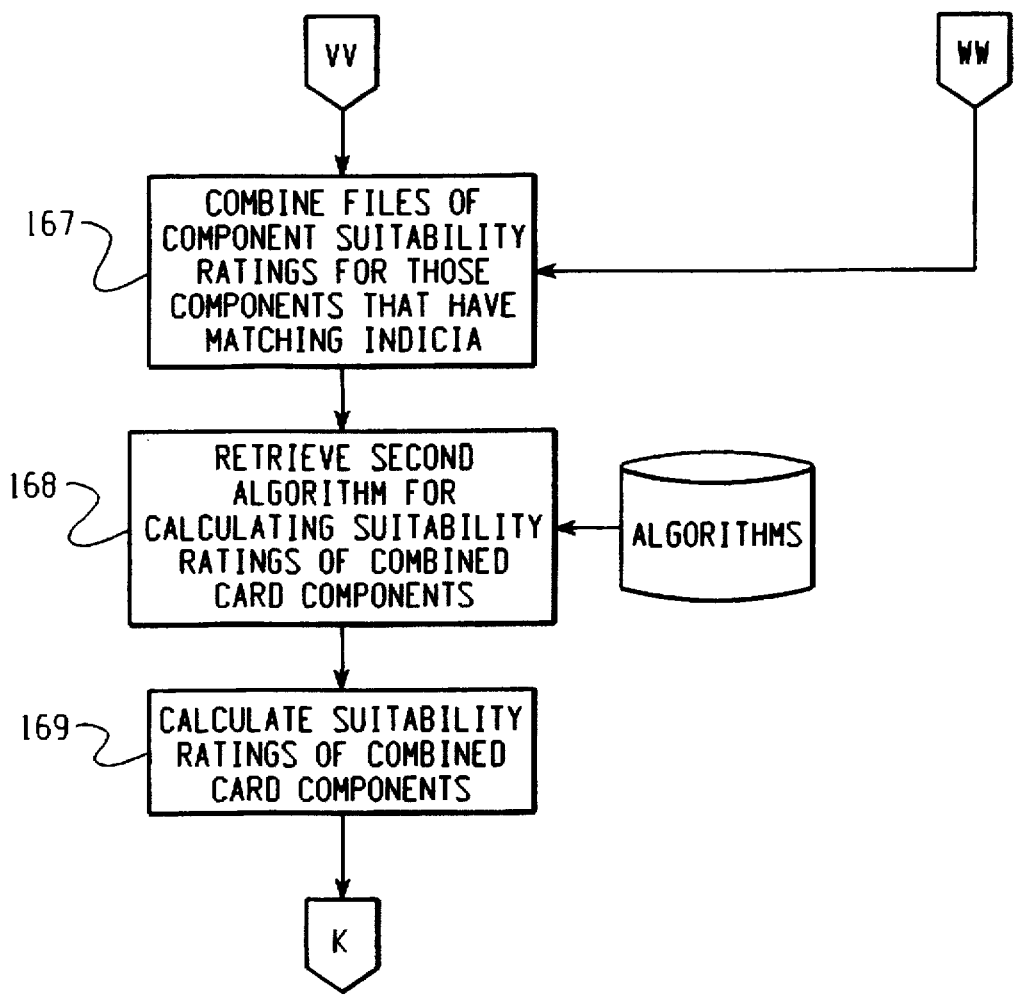

At the same time, if spare components of card designs are stored in partition 34 (FIG. 3), step 139 (FIG. 14) will cause the system to calculate suitability ratings for additional card designs made of these components, performing steps 160 to 169 in FIG. 16. The suitability ratings for these combined card components will also be held in temporary storage with the ratings of the other card designs (step 146, FIG. 15).

Figure 17A:
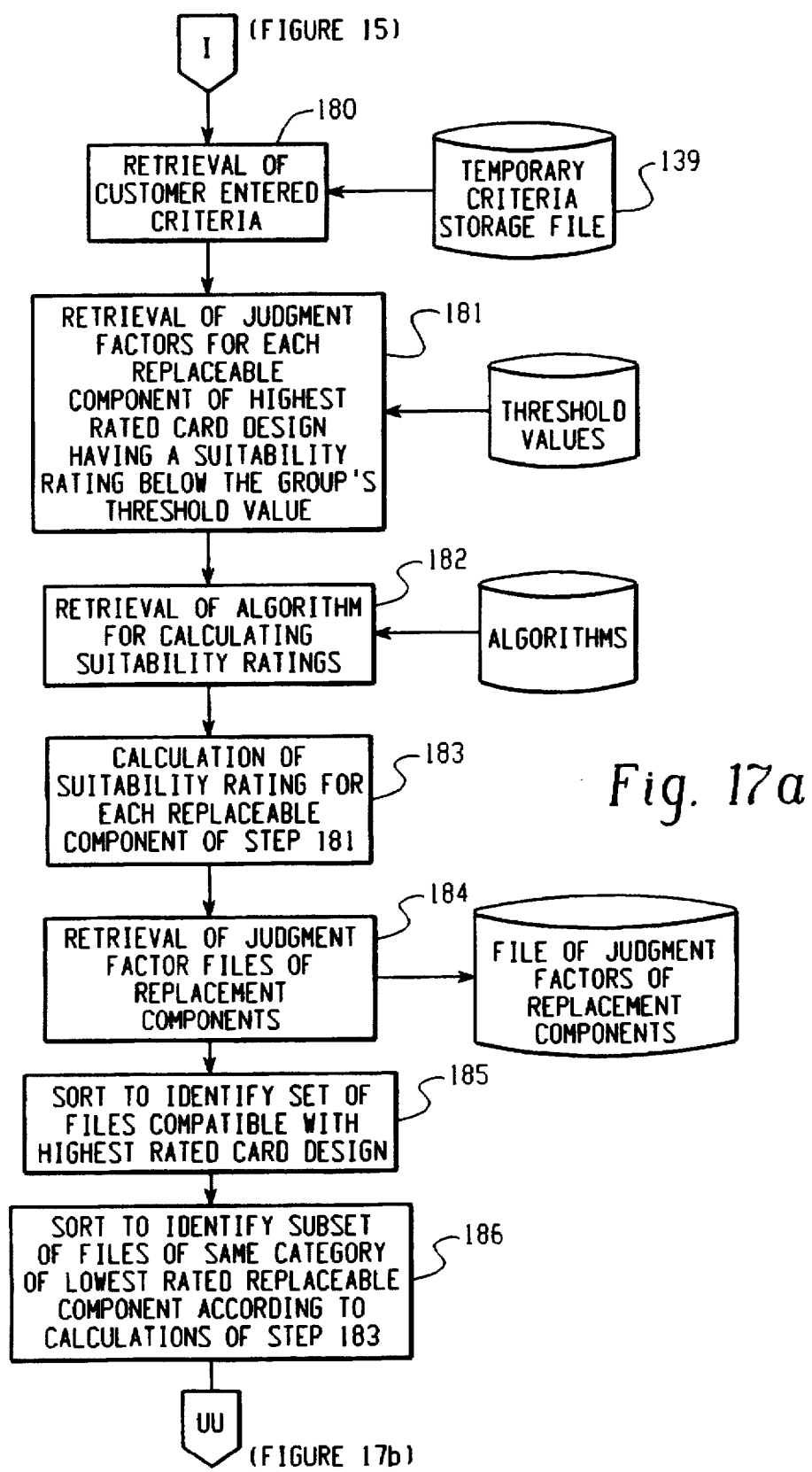
Figure 17B:
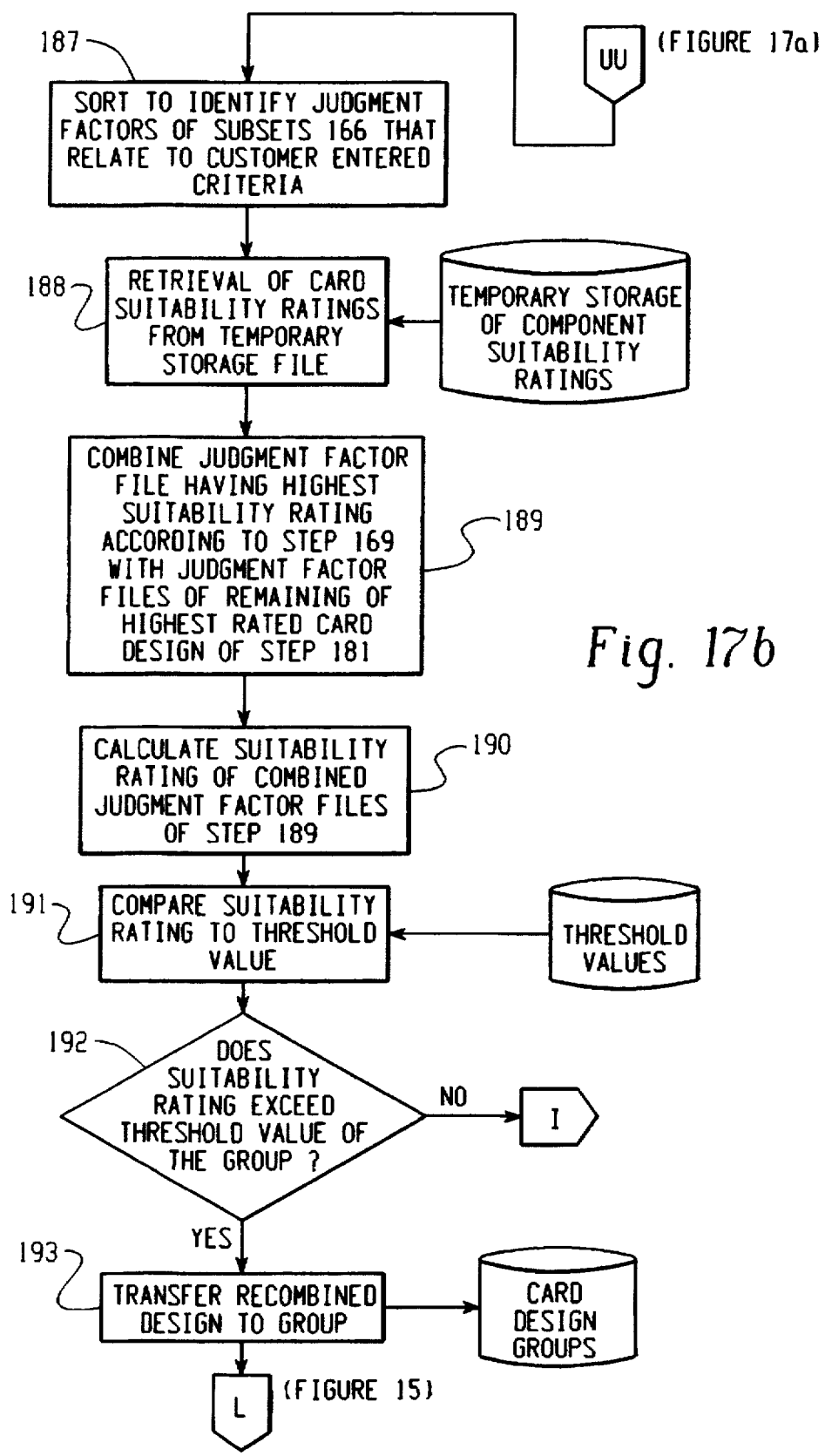
Figure 18:
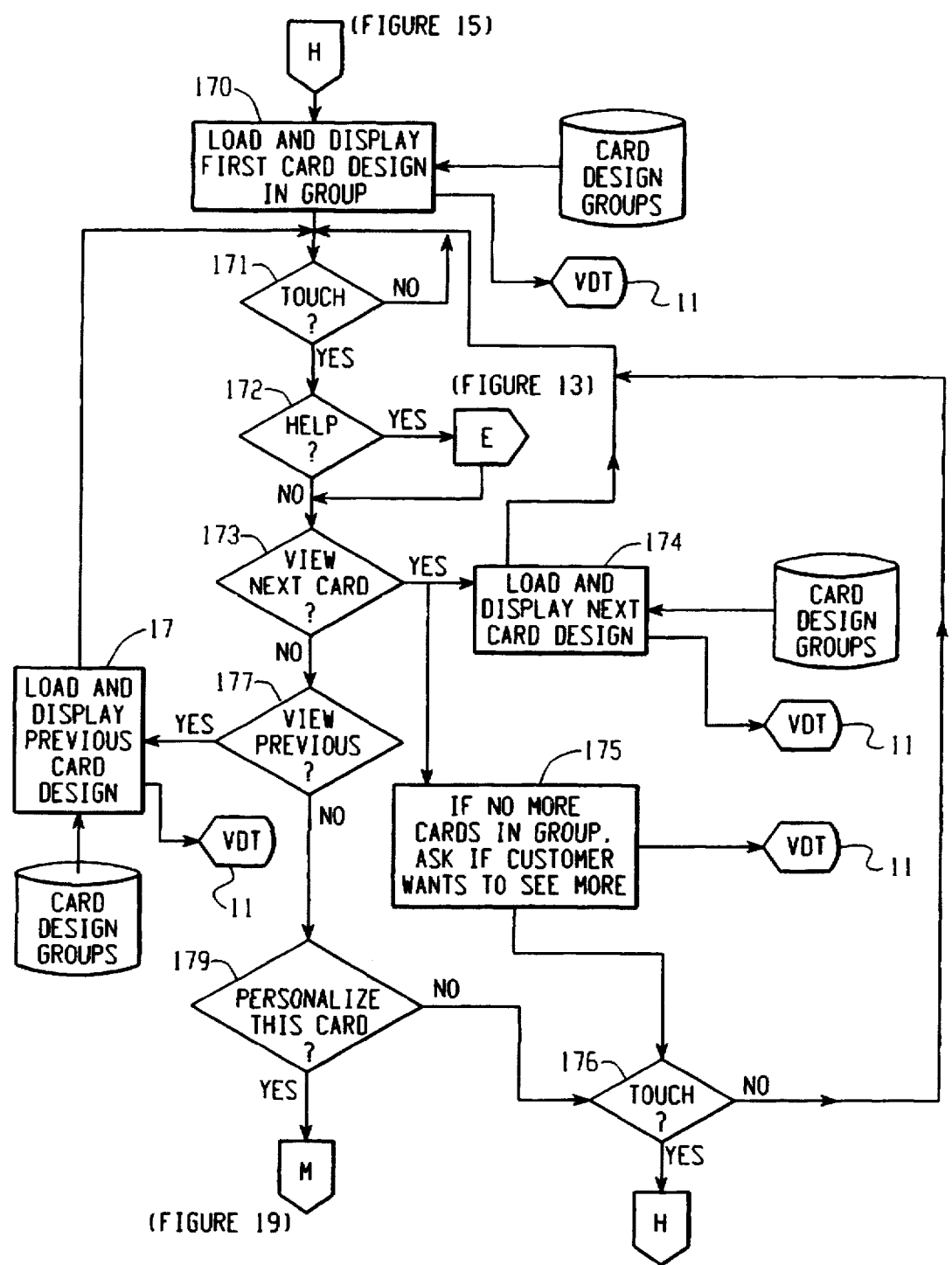

The card designs, including those made of combined card components, are then ranked according to their suitability ratings (step 147, FIG. 15). The card designs are then arranged in one of several presentation orders shown in FIG. 15. In Option A, certain card designs (such as sexually explicit designs) are excluded from presentation before any of the other options are considered (step 147b, FIG. 15). In Option B (step 150) the card designs are presented in groups, the first presentation group, Group J, comprising the "j" number of card designs having the highest suitability ratings, the next group, Group K, comprising the "k" number of card designs having the next highest suitability ratings, and so forth. The card designs in each group are then displayed to the customer and the customer is asked to select the card design that he prefers (steps 170 to 176 in FIG. 18). If the customer views all the card designs in a group without selecting any of them, he is asked whether he wants to view the designs in the next group (step 175, FIG. 18). In Option C (step 151), all card designs having suitability ratings above a value "x" are put in the first presentation group, Group X, those having suitability ratings above a value "y" are put in the next group, Group Y, and so forth. In Option D, the card design groups of Option C may be supplemented if they do not have more than a minimum number of designs, by adding card designs that barely miss the threshold levels for the groups. These designs are examined to determine if they have components that can be replaced with spare components from file 34 that would raise their suitability ratings (steps 180 to 193, FIG. 17). If that can be done, the modified designs are added to the group. The card designs grouped according to Options C and D are presented to the customer in the same manner as those grouped according to Option B (steps 170 to 176 in FIG. 18). The options 172, 173, 177 and 179 of FIG. 18 represent the choices presented to the customer at the bottom of the screen display of FIG. 10.

Figure 19A:
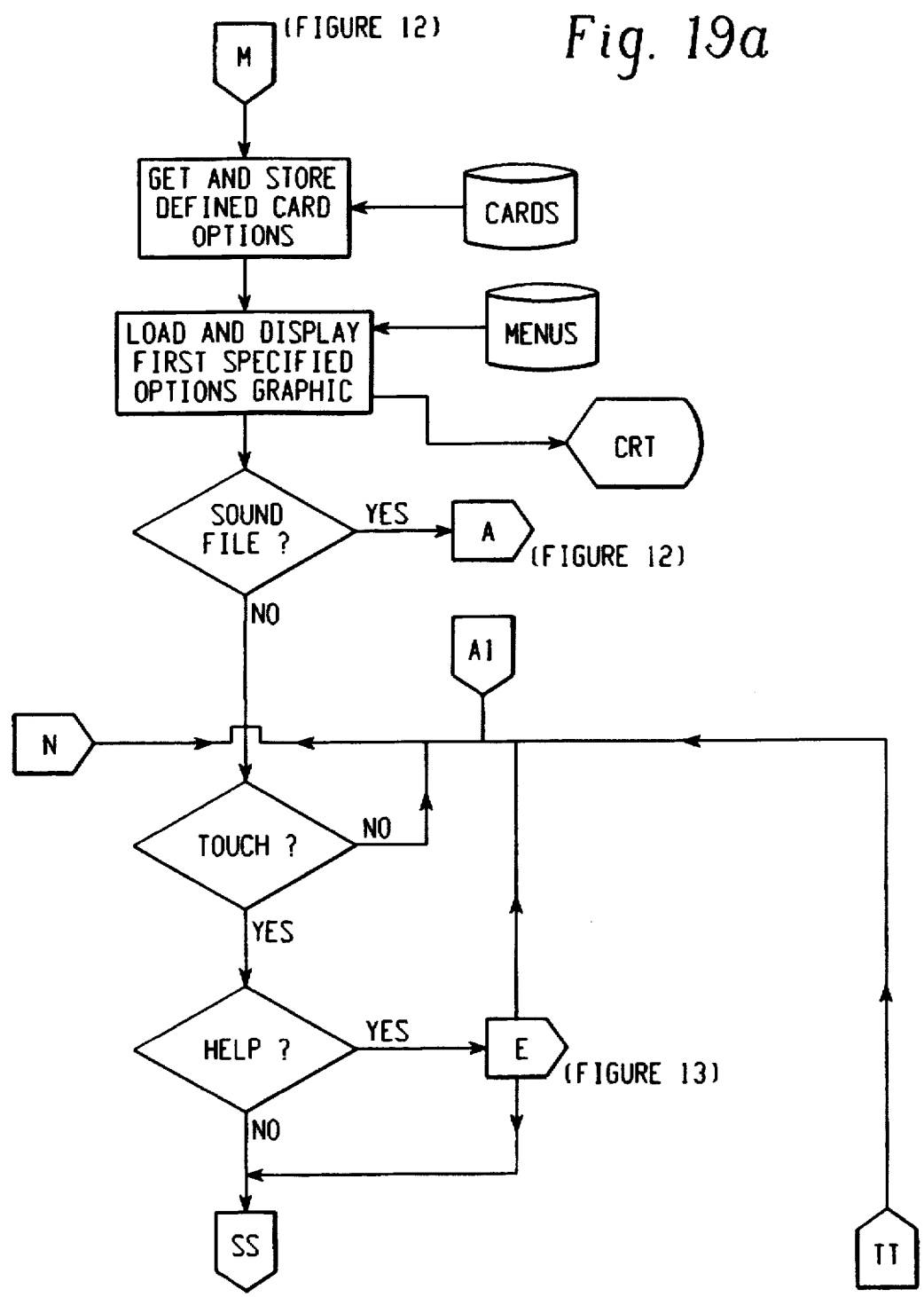
Figure 19B:
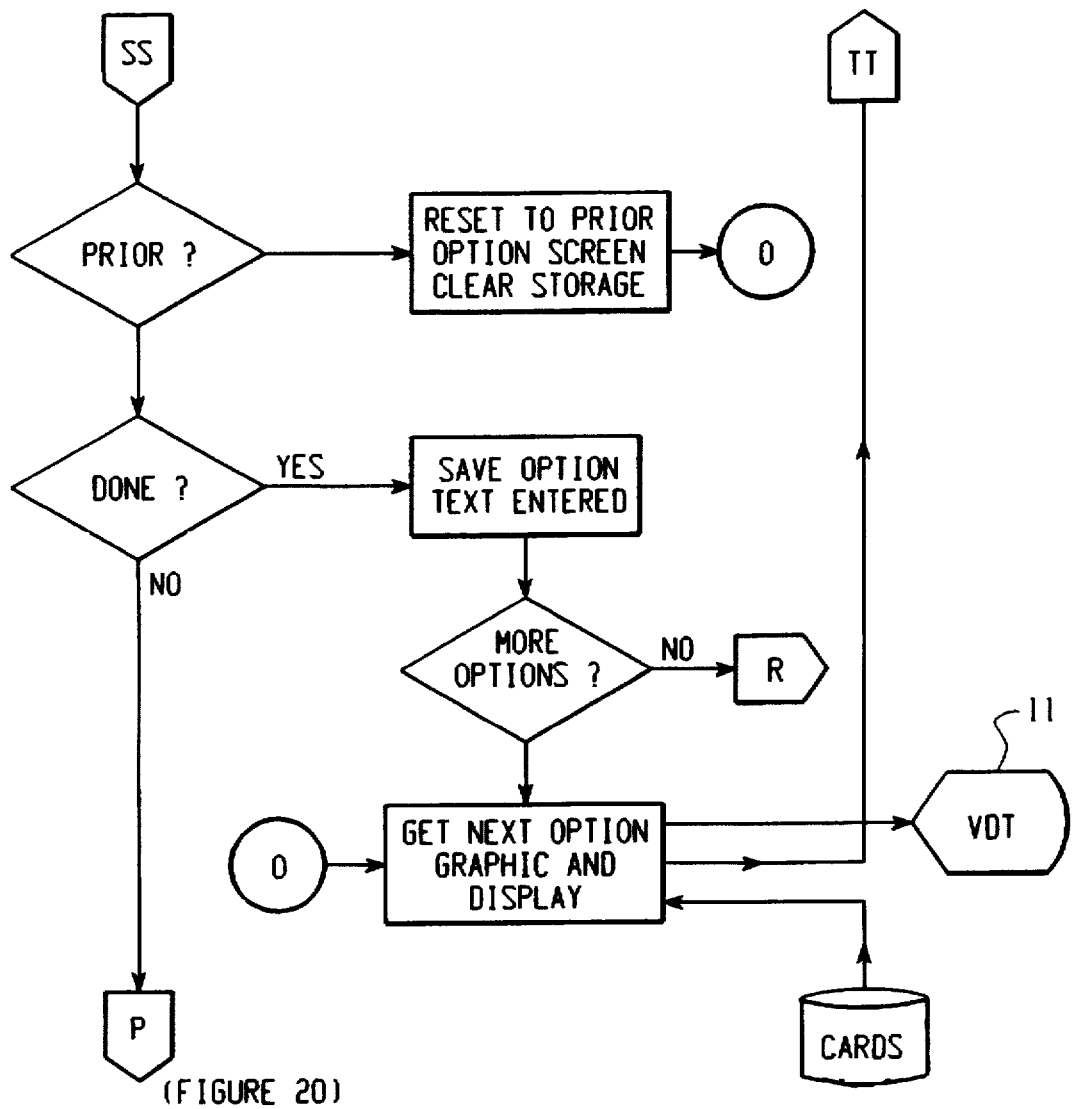

When the customer selects a card design to be personalized (step 179, FIG. 18), the computer proceeds to step 251 in FIG. 19, where it elicits and stores the chosen card design's customizing options. Depending on the screen display presented, the customer may enter a string of text, which is limited to a maximum of some value, preferably between 10 and 80 characters. Expansion beyond 80 1310 characters may be provided as an option based on fonts and space allocation on the card to be printed.

Additionally, numbers may be entered at this level for dates, age, years married, etc., depending on the application chosen. These entries may be processed in a manner similar to the above screen level selections. The button touched defines an action code that is cross-referenced to a description in a database file. When the button is selected, the program accesses the file, retrieves the description associated with the action code and holds it in memory along with the text that has been entered.

The text/number entry screens have a button defined for informing the system that the customer has completed the specific entry and to go on to the next option ("OK to Proceed" button in FIG. 9). At any point during the selection of options, the customer may back up to any prior option to change or modify any entry made at that point.

Figure 20:
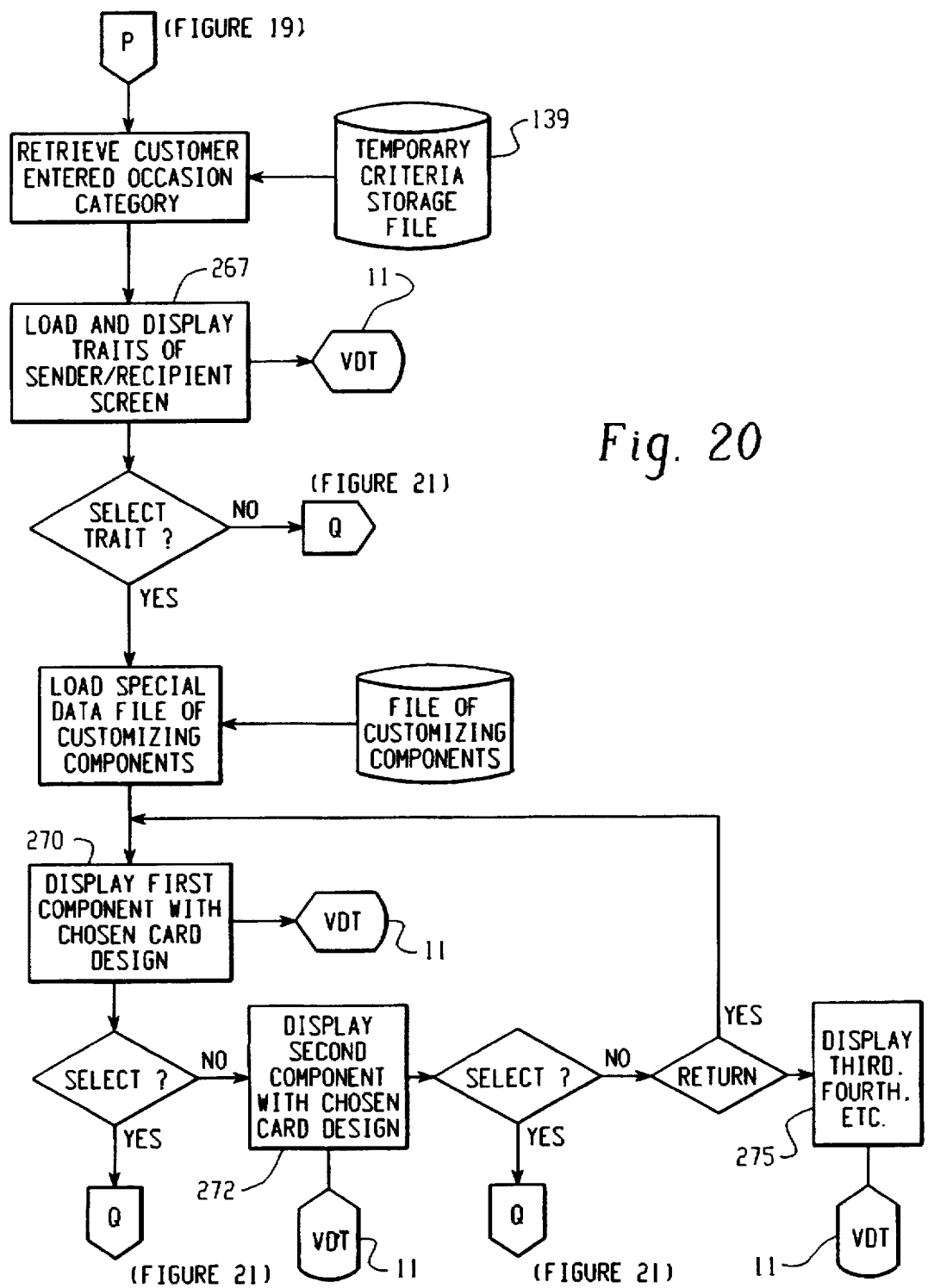

The system may also be structured so that it allows the customer to add to his chosen design a customizing component that reflects a personal trait of either the sender or the recipient. This feature is shown in FIG. 20. The customer is asked in step 267 (FIG. 20) to select a trait from among those listed on a sender/recipient screen, such as that shown in FIG. 30. The selected card design is then displayed on the monitor 11 with various proposed customizing components (steps 270, 272 and 275).

Figure 21:
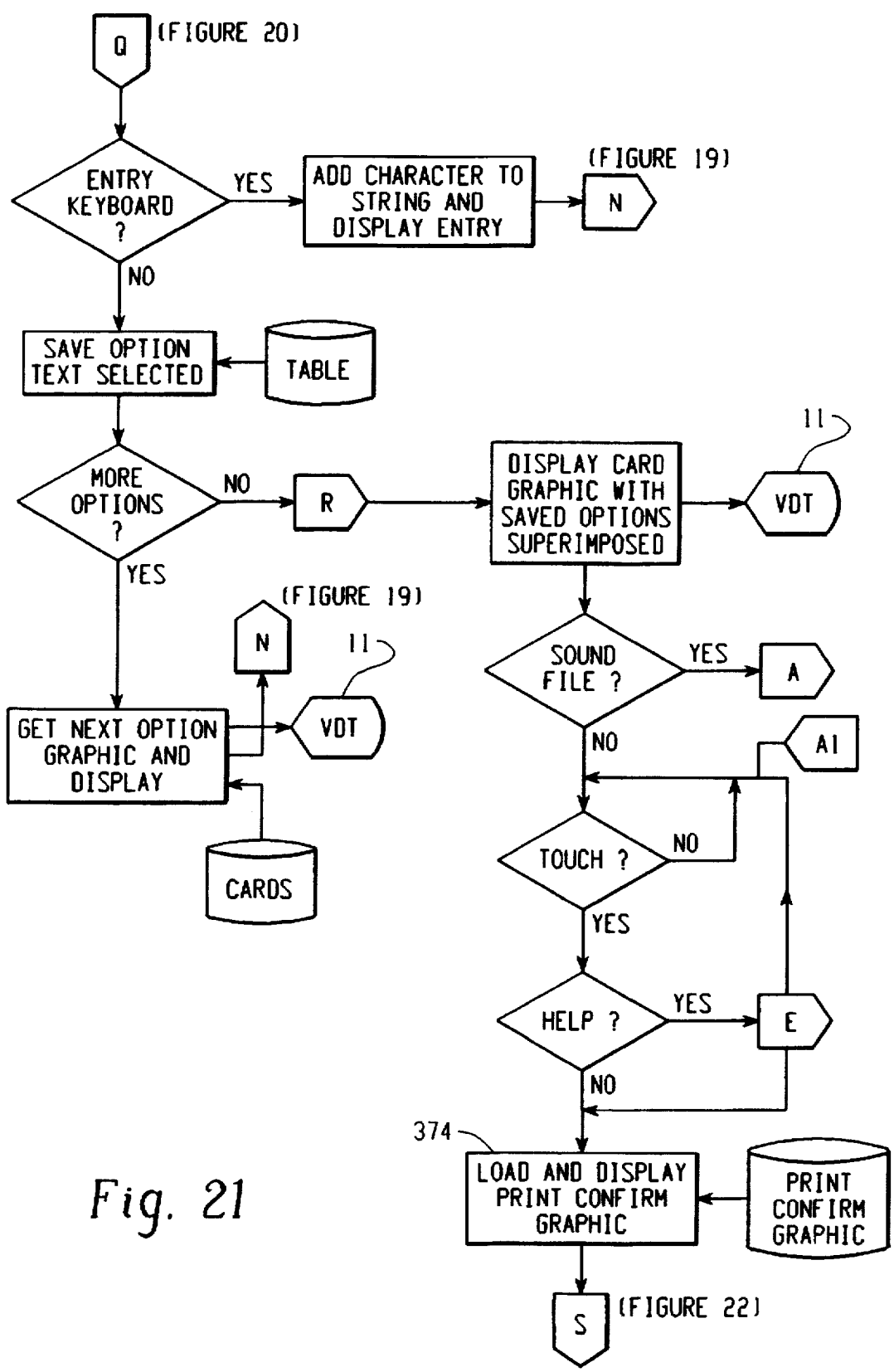

After all the customization information has been entered at this level, the card design is then redisplayed on the monitor with all the customer entries and selections overlayed onto the card design in the proper locations for final customer approval as shown in FIG. 11. A customer may choose to print the selected card design. As the system may be operated for any length of time up to this point without incurring a charge, a confirmation of printing is asked in step 374 (FIG. 21).

Figure 22:
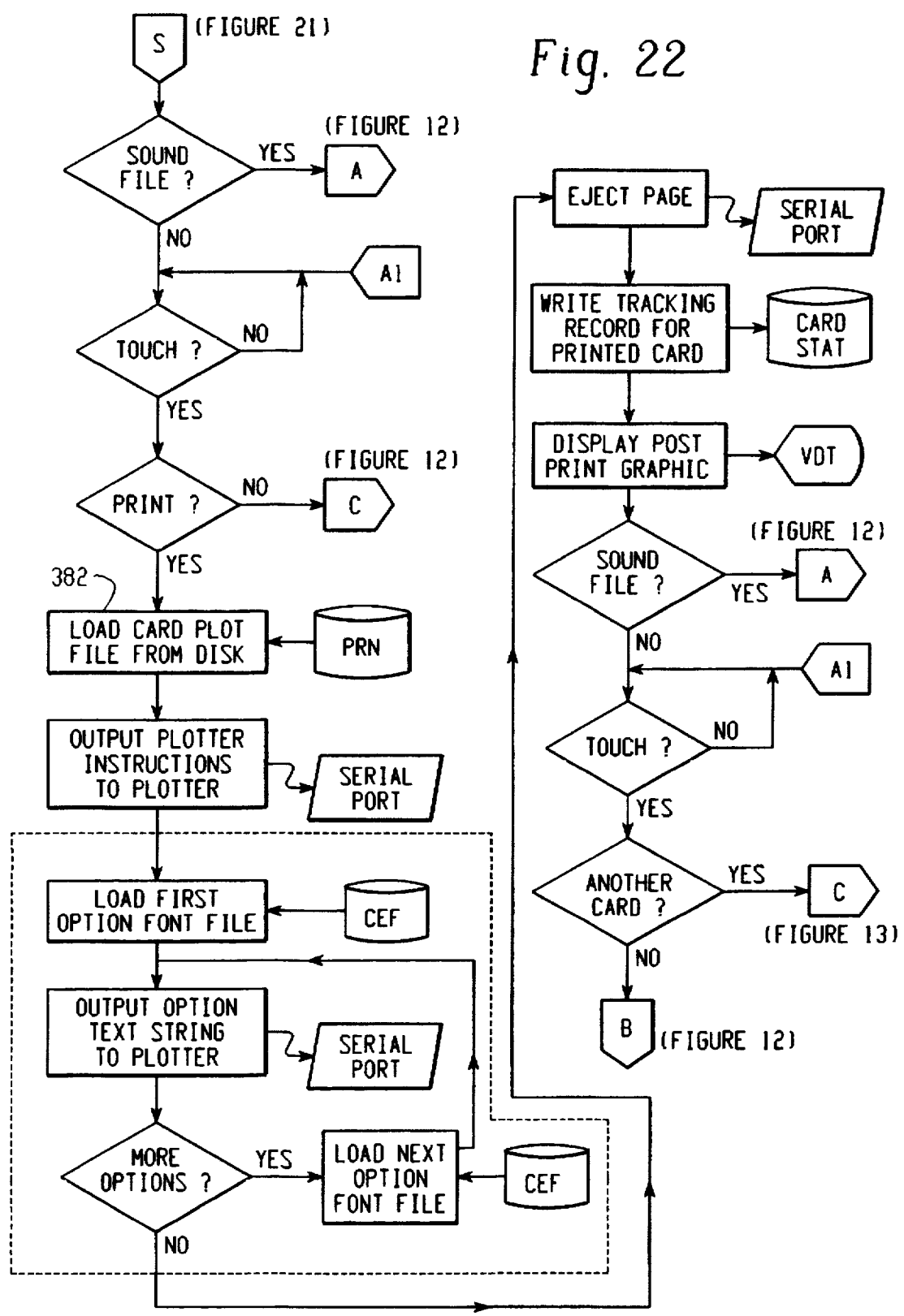

To print the selected card design, the system loads from the hard disk 23 the printer instructions for the design (step 382, FIG. 22). These instructions are then sent to the printer 16 from a serial or parallel port installed in the computer 13. After the stored design data have been printed on the card, the customization steps may be overlayed as an option. For each customer text or number entry, an appropriate printer font file is opened and a character string is output to the printer 16. When all the card customizing entries and selections have been reproduced, the card sheet is then ejected from the printer 16 into the bin 17. If desired, the program for printing the selected card can require receipt of the proper payment via the payment receiving device 18 (FIG. 1) prior to activation.

The customer is then given the option to print another card. If desired, the system then returns to the occasion selection screen at entry point 113 in FIG. 12, and if not desired, it returns to the marketing cycle display at entry point 114.

Figure 23:
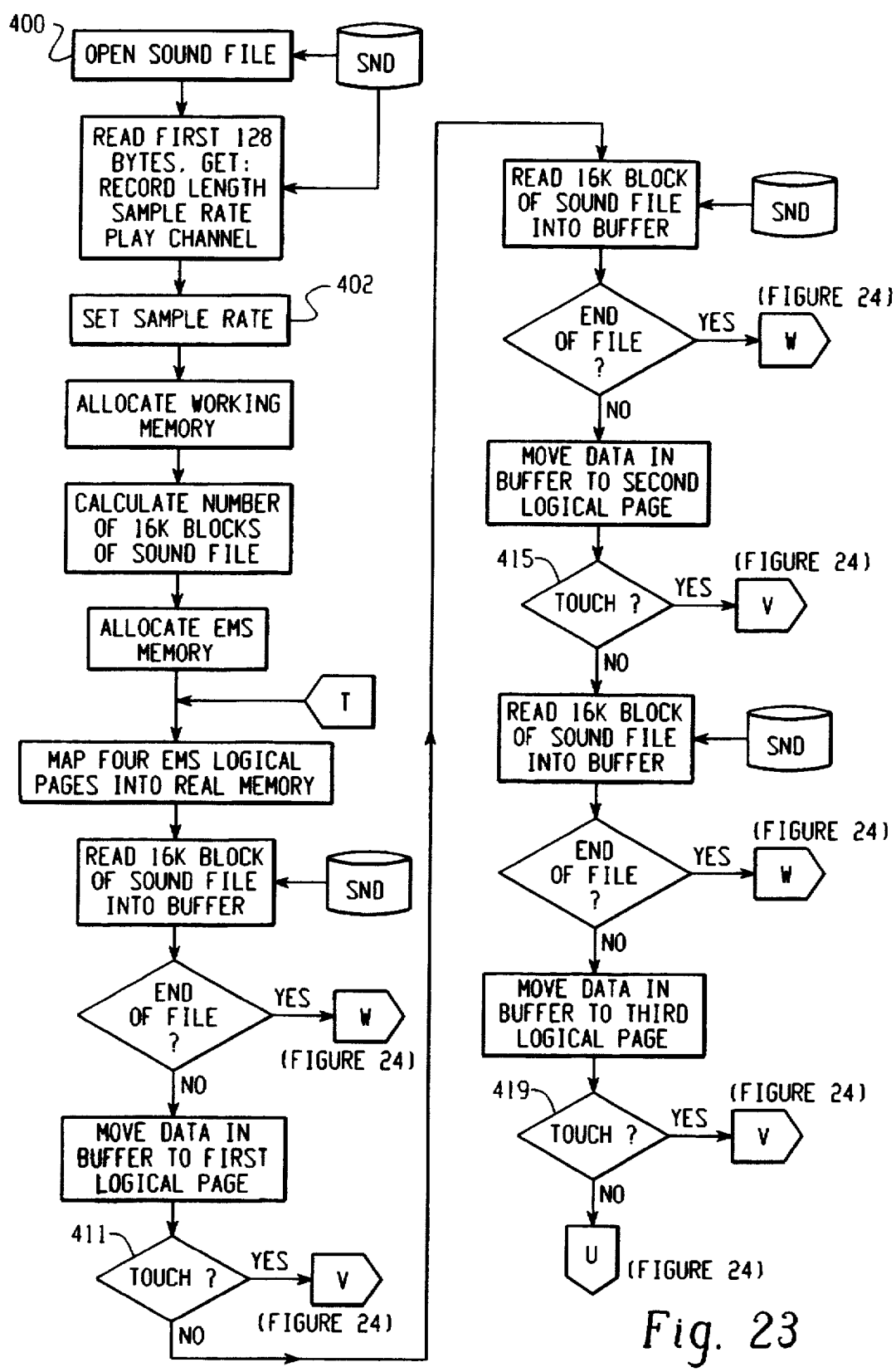
Figure 24B:
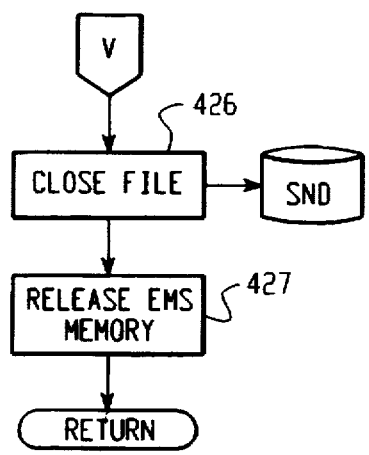
Figure 24C:
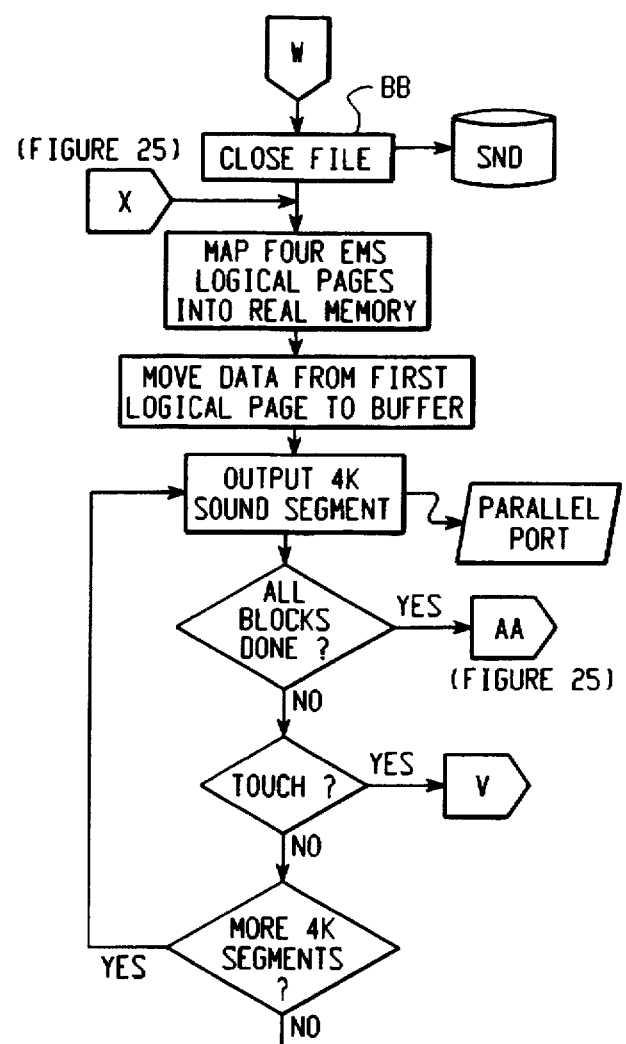
Figure 25A:
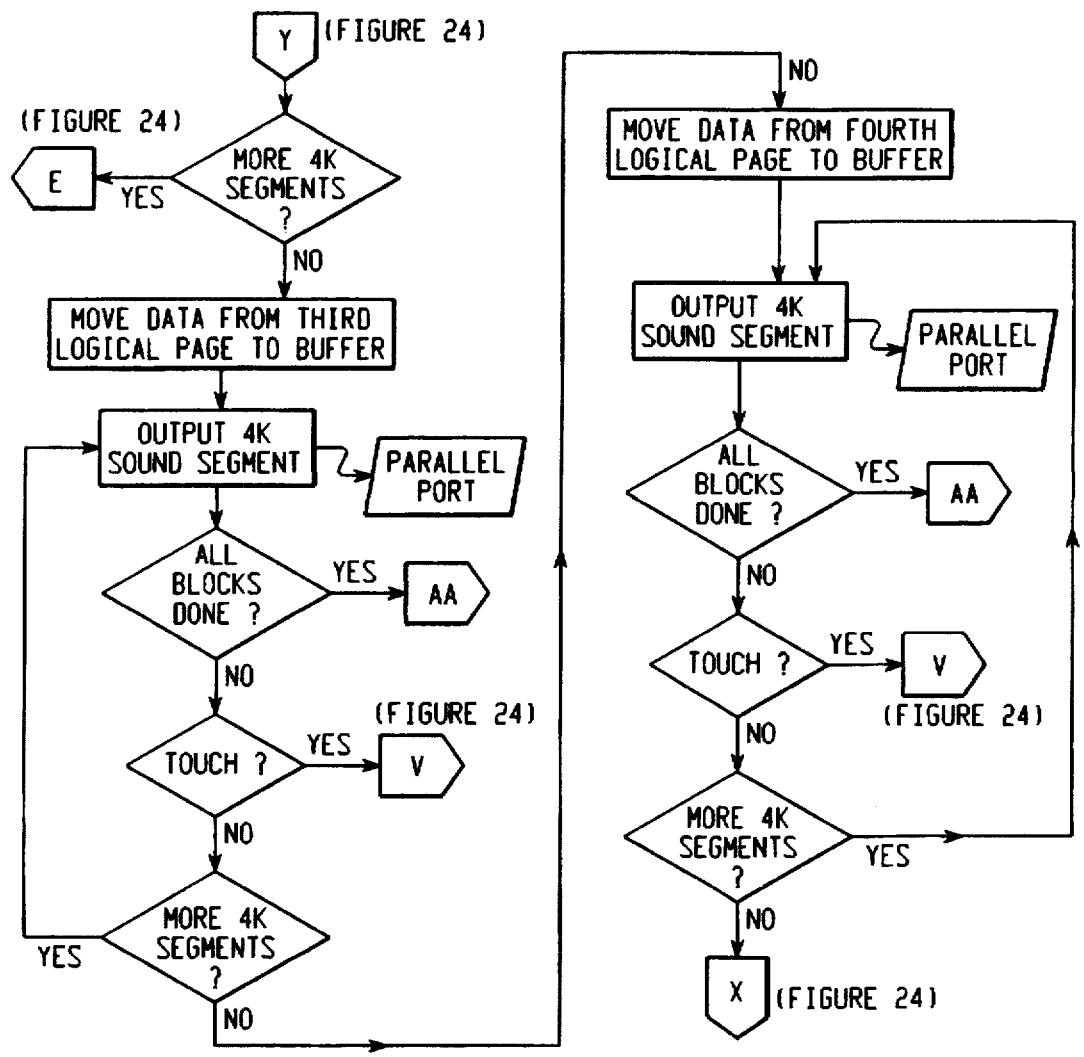
Figure 25B:
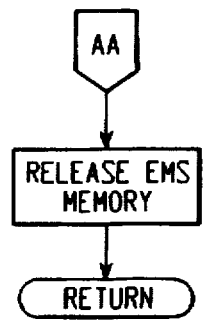
Figures 26A, 26B:
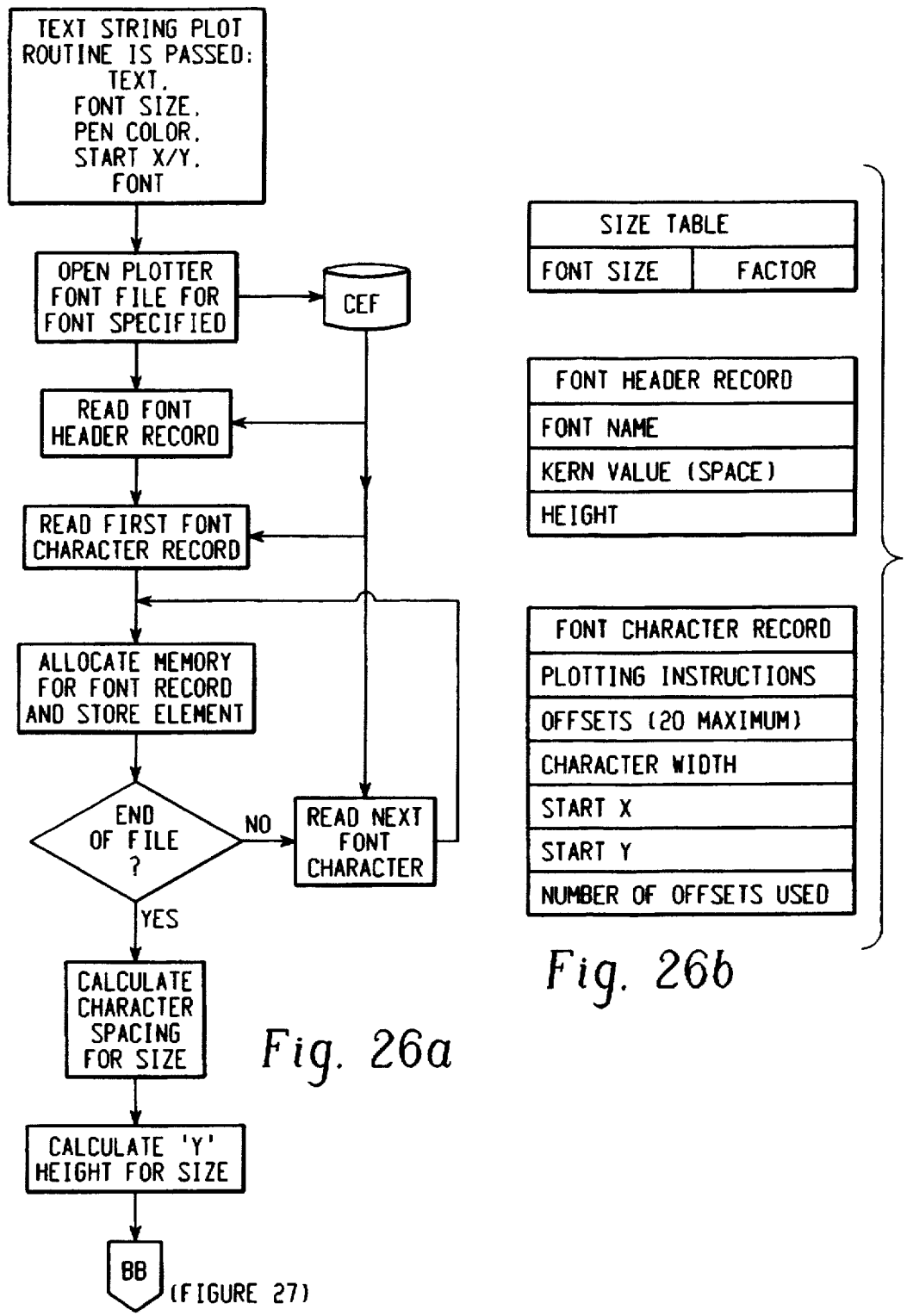
Figure 27:
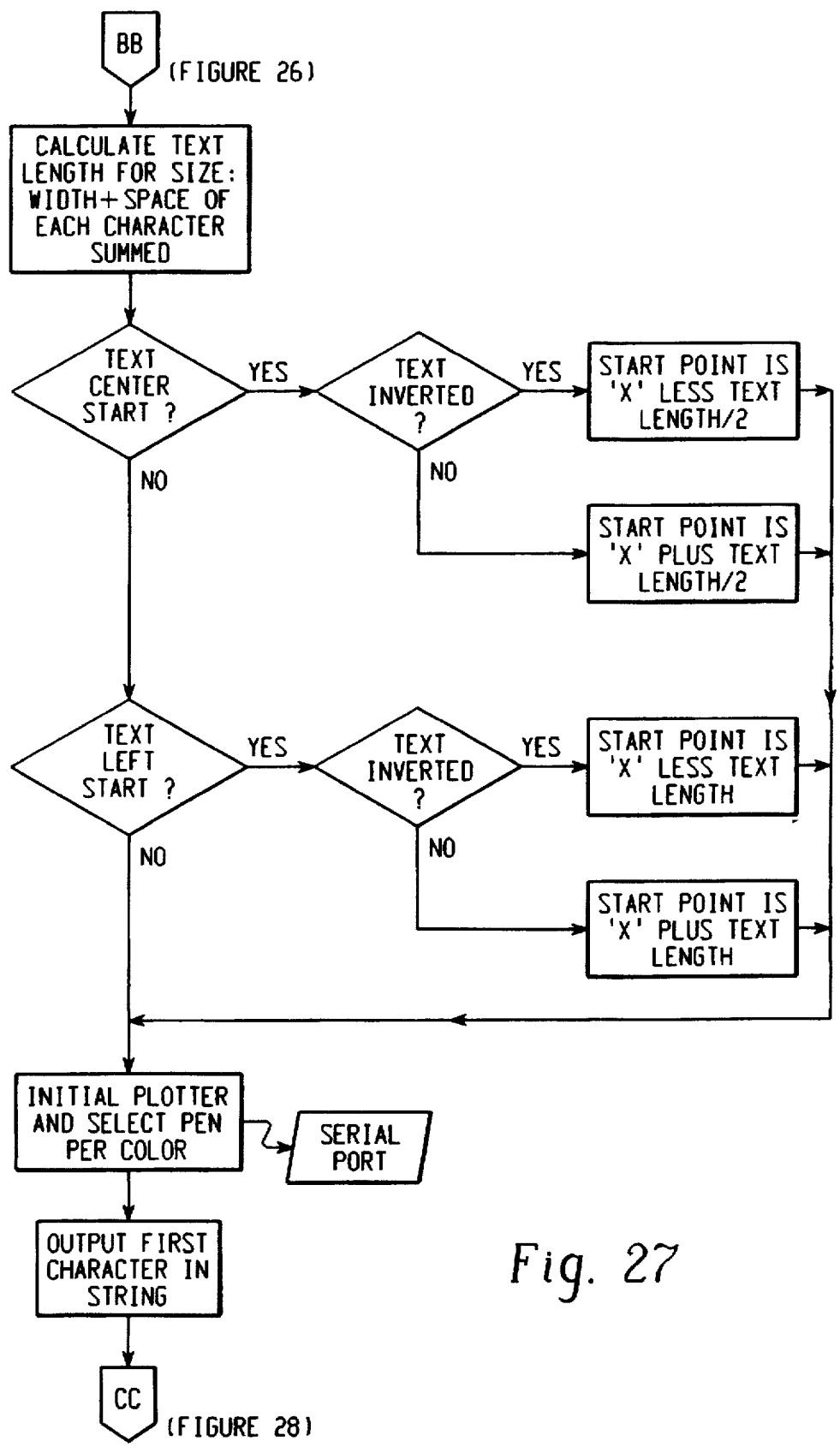
Figure 28A:
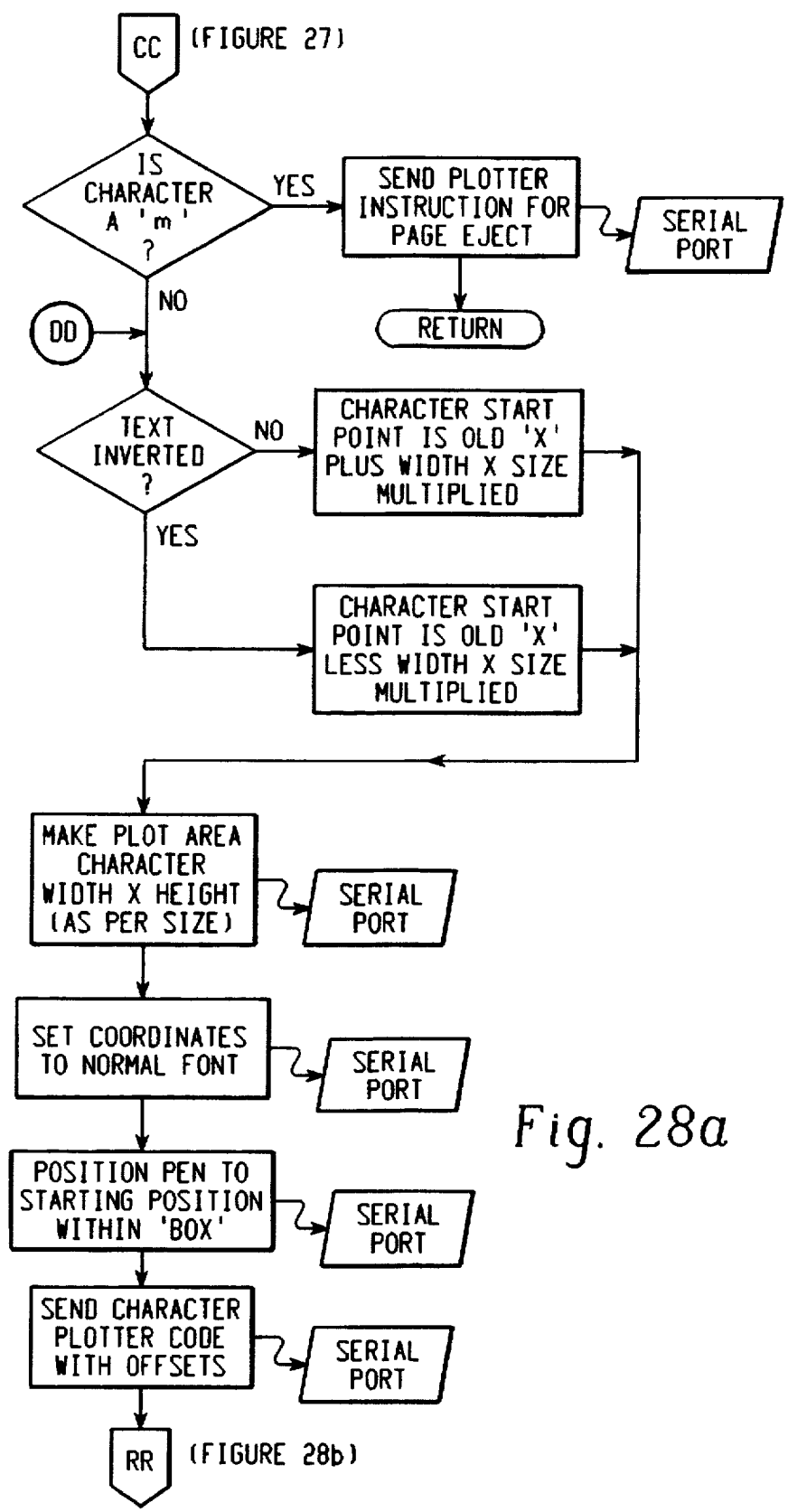
Figure 28B:
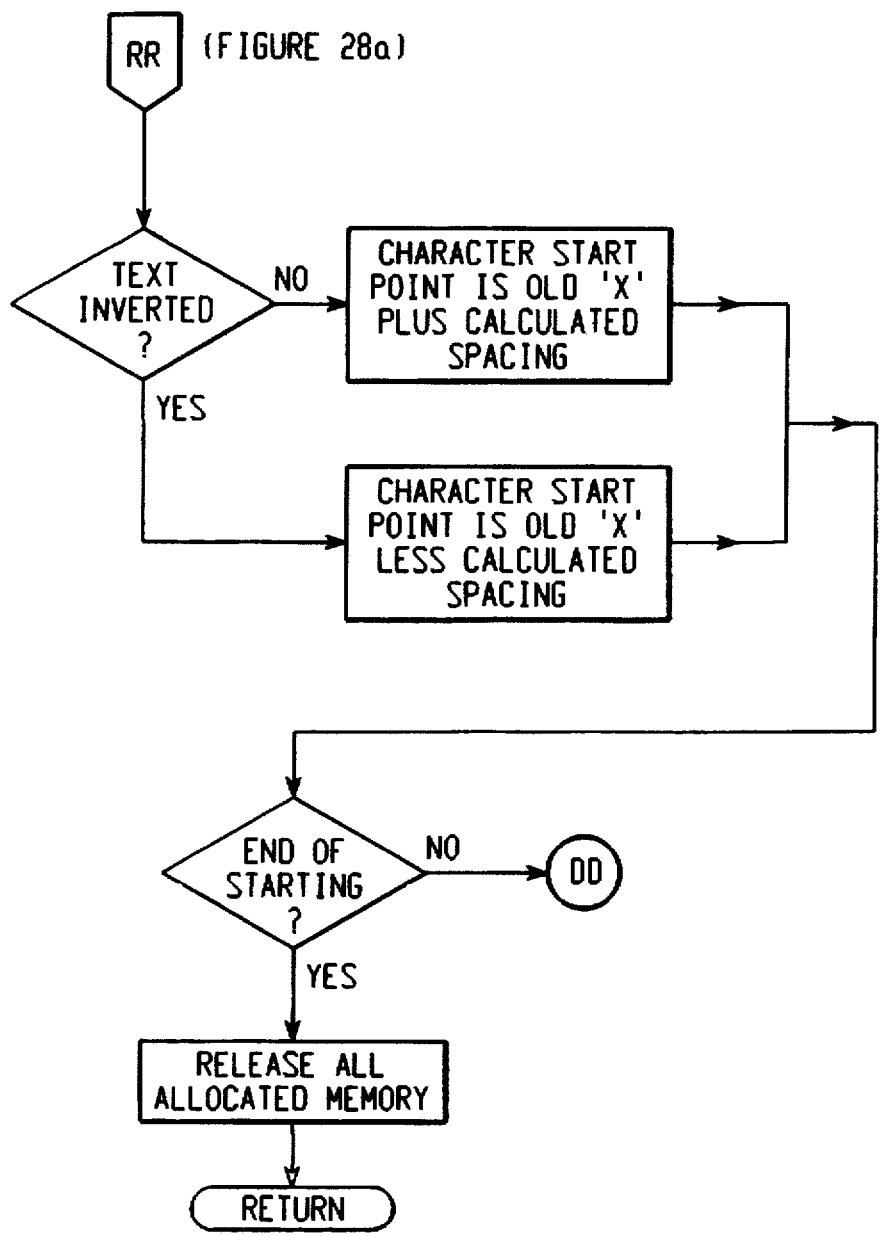

FIGS. 23 to 25 show a detail flow of the sound processing routine depicted by blocks 109 to 112 in FIG. 12. The routine begins at step 400 by opening the sound file and reading in the first 128 positions to retrieve the record length of the digital sound data, the recording sample rate and channel through which it is to be played. The sample rate is then set in step 402. Program memory is allocated to sue a buffer as each sound file block is read from the file. By using the record length, a number of 4K blocks may be calculated for use during the sound file playback. To accommodate a sound file of any size, the system may store the file in Expanded Memory (EMS). This is additional memory that is outside the system's normally accessible memory. It is accessed by mapping 64K segments of the stored data into RAM 66 (step 406, FIG. 23). Each of these 64K segments of data is further subdivided into sixteen 4K blocks. The computer 13 downloads the data one block at a time into RAM 66. To provide touch interrupt capability, the program checks for a valid touch after each 4K block of sound data is read (steps 411, 415, 419 and 424). When all sixteen blocks of a segment have been downloaded, that segment is moved to another EMS and another 64K segment is mapped into program useable memory. This process is continued until the entire file is read or a touch on the touchscreen 12 is detected. If a touch is detected, the routine closes the file and releases the EMS memory before returning to the routine's origin (FIG. 24).

If no touch on the monitor screen is detected during the file loading process, the file is then closed and the system prepares to playback the stored speech data. The system, starting at the beginning of the sound file stored in EMS, begins mapping the data into the RAM 21. Each 4K block is moved into the data buffer and played back through audio system 19 attached to the parallel port of the computer 13. As in the reading of the file, after each 4K block is played back, the system checks for a valid touch. If at any point a touch is detected or the number of blocks played is equal to the calculated block count, the routine ends by releasing the EMS memory and returning to its starting point.

While several embodiments of the present invention have been shown and described, more embodiments as well as changes to those shown will be apparent to those skilled in the art without departing from the scope of the following claims.

I claim:

1. A method of storing and selectively retrieving product data, comprising the steps of:
   (a) storing data relating to a plurality of products in a data storage device;
   (b) identifying the data relating to each product by a plurality of expert judgment factors, each expert judgment factor being a numerical value indicative of the product's suitability for a specific customer need;
   (c) requesting a customer to specify a set of criteria, each criterion having a corresponding expert judgment factor;
   (d) receiving from the customer the set of criteria requested in step (c)
   (e) calculating a suitability rating for each product design by combining by algorithm those expert judgment factors corresponding to the criteria received from the customer;
   (f) based on the suitability ratings of the products calculated in step (e), selecting a group of those products for display to the customer;
   (g) displaying to the customer the data relating to the products of the group selected in step (f);
   (h) requesting the customer to select one of the products whose data are displayed in step (g)
   (i) receiving the customer's selection of a product made in response to the request of step (h); and
   (j) delivering to the customer the product or data relating to the product of step (h).

2. The method according to claim 1 further comprising the steps of:
   (i) (1) requesting the customer to input changes to the data relating to the product of step (h); and
   (i)(2) receiving the changes input by the customer and making those changes to the data relating to the product of step (h).

3. The method according to claim 1 further comprising the steps of:
   (a)(1) storing data relating to a plurality of special product components in the data storage device;
   (b)(1) identifying the data relating to each special product component by an indicator of a customer or product receiver characteristic;
   (i)(1) requesting the customer to identify a personal characteristic of the customer or the product receiver;
   (i)(2) receiving the personal characteristic requested in step (i)(1);
   (i)(3) searching for the data relating to the special product component that is identified by an indicator that matches the personal characteristic received in step (i)(2); and
   (i)(4) adding to the data of the selected product the data of the special product component found by the searching of step (i)(3).

4. The method according to claim 1 wherein the selection of products in step (f) comprises the step of:
   (f)(1) selecting for display to the customer the data relating to those products having suitability ratings higher than a predetermined level.

5. The method according to claim 4 wherein the selection of products in step (f) also comprises the step of:

(f)(2) randomly mixing the order of the data relating to the products selected in step (f)(1);

wherein the data relating to the products is displayed in step (g) in the order determined by the random mixing of step (f)(2).

6. The method according to claim 4 further comprising the steps of:

(g)(1) requesting the customer to indicate whether he desires to view data relating to more products in addition to the data displayed in step (g);

(g)(2) receiving a customer indication of a desire to view more data;

(g)(3) selecting for further display to the customer the data relating to those products having suitability ratings below the predetermined level of step (f) (1) but higher than a second predetermined level; and (g)(4) displaying to the customer the data selected in step (g)(3).

7. The method according to claim 1 further comprising the step of:

(f)(1) ranking the products in the order of their suitability ratings and selecting for display to the customer the data relating to those products having suitability ratings higher than a predetermined level;

wherein the data relating to the products are displayed in step (g) in order of the suitability ratings of the products, from the highest to the lowest.

8. The method according to claim 7 further comprising the steps of:

(g)(1) requesting the customer to indicate whether he desires to view data relating to more products in addition to the data displayed in step (g);

(g)(2) receiving a customer indication of a desire to view more data;

(g)(3) selecting for further display to the customer the data relating to those products having suitability ratings below the predetermined level of step (f) (1) but higher than a second predetermined level; and (g)(4) displaying to the customer the data selected in step (g)(3).

9. The method according to claim 1 further comprising the step of:

(i)(1) changing the expert judgment factors for the product selected by the customer in step (i) by an amount that reflects the determination by one customer that the selected product design best suits the customer's needs as identified by the criteria received by the customer in step (d).

10. The method according to claim 9 further comprising the step of:

(i)(2) changing the expert judgment factors for the products not selected by the customer in step (k) by amounts that reflect the determination by one customer that the non-selected products were not best suited for the customer's needs as identified by the criteria received by the customer in step (d).

11. The method according to claim 10 further comprising the steps of: (i)(3) communicating the changes in expert judgment factors performed in steps (i)(1) and (i)(2) to the computers of other apparatus having data storage devices that store data relating to the same products; and (i)(4) receiving like changes in expert judgment factors for product designs from the other data storage devices and making similar changes in the same expert judgment factors for the same products stored in the first mentioned data storage device.

12. The method according to claim 1 further comprising the steps of:

(b)(1) identifying the data relating to each product by a charge code; and (i)(1) calculating and displaying to the customer a fee based on the charge code of the product selected by the customer.

13. A method of storing and selectively retrieving product data, comprising the steps of:

(a) storing data relating to a plurality of product components in a data storage device;

(b) identifying the data relating to each product component by a plurality of expert judgment factors, each expert judgment factor being a numerical value indicative of the product component's suitability for a specific customer need;

(c) requesting a customer to specify a set of criteria, each criterion having a corresponding expert judgment factor;

(d) receiving from the customer the set of criteria requested in step (c)

(e) calculating a suitability rating for each product component by combining by algorithm those expert judgment factors corresponding to the criteria received from the customer;

(f) calculating a suitability rating for a product having a plurality of product components by combining by a second algorithm the suitability ratings of said product components;

(g) repeating step (f) to produce suitability ratings for a plurality of products;

(h) based on the suitability ratings of the products calculated in step (f) and (g), selecting a group of those products for display to the customer;

(i) displaying to the customer the data relating to the products of the group selected in step (h);

(j) requesting the customer to select one of the products whose data are displayed in step (i)

(k) receiving the customer's selection of a product made in response to the request of step (j); and (l) delivering to the customer the product or data relating to the product of step (k).

14. The method according to claim 13 further comprising the steps of:

(k)(1) requesting the customer to input changes to the data relating to the product of step (h); and (k)(2) receiving the changes input by the customer and making those changes to the data relating to the product of step (h).

15. The method according to claim 13 wherein the data relating to the product components is stored in predetermined combinations, each combination being the data relating to one product and wherein the suitability rating of each product is determined in step (f) by combining by the second algorithm the suitability ratings of its product components.

16. The method according to claim 15, further comprising the steps of:

(k)(1) requesting the customer to input changes to the data relating to the product of step (h); and (k)(2) receiving the changes input by the customer and making those changes to the data relating to the product of step (h).

17. The method according to claim 15 wherein the data relating to at least some of the product components is separable from the data relating to the other product components with which it is combined and wherein the method further comprises the steps of:
- (e)(1) searching for data relating to a replacement product component that has a higher suitability rating than the separable product component; and
- (f)(1) combining the suitability rating of the replacement product component determined to have a higher suitability rating according to step (e)(1) with the suitability ratings of those components of the product not replaced to produce a suitability rating of a new product that includes the replacement product component.

18. The method according to claim 17 wherein the data relating to some product components is stored in predetermined combinations, each combination being the data relating to one product and wherein the suitability rating of each product is determined in step (f) by combining by the second algorithm the suitability ratings of its product components.

19. The method according to claim 15 further comprising the steps of:
- (f)(1) identifying by a charge code each social expression product design composed of a predetermined combination of social expression product components; and
- (k)(1) calculating and displaying to the customer a fee based on the charge code of the social expression product design chosen by the customer.

20. The method according to claim 13 wherein the data relating to at least one product component are separable from the data relating to the other components of a product selected by the customer and wherein the method further comprises the steps of:
- (k)(1) receiving a customer instruction to delete a separable product component from the selected product design; and
- (k)(2) deleting the data relating to a separable product component from the data of the selected product according to the instruction received in step (k)(1).

21. The method according to claim 13 further comprising the steps of:
- (k)(1) displaying to the customer the data relating to a plurality of replacement product components;
- (k)(2) receiving from the customer a selection of one of the replacement product components whose data are displayed in step (k)(1); and
- (k)(3) adding to the data of the selected product the data relating to the replacement product component, according to the selection received in step (k)(2).

22. The method according to claim 13 further comprising the steps of:
- (k)(1) displaying to the customer the data relating to a plurality of replacement product components;
- (k)(2) receiving from the customer a selection of one of the replacement product components whose data are displayed in step (k)(1) and an instruction to delete a separable product component from the selected product and replace the deleted separable product component with the selected replacement product component; and
- (k)(3) deleting the data relating to the separable product component from the selected product and substituting data relating to the selected replacement product component, according to the instruction received in step (k)(2).

23. The method according to claim 13 further comprising the steps of:
- (a)(1) storing the data relating to a plurality of special product components in the data storage device;
- (b)(1) identifying the data relating to each special product component by an indicator of a customer or product receiver characteristic;
- (k)(1) requesting the customer to identify a personal characteristic of the customer or the product receiver;
- (k)(2) receiving the personal characteristic requested in step (k)(1);
- (k)(3) searching for the data relating to the special product component that is identified by an indicator that matches the personal characteristic received in step (k)(2); and
- (k)(4) adding to the data of the selected product the data of the special product component found by the searching of step (k)(3).

24. The method according to claim 13 wherein the selection of products designs in step (h) comprises the step of:
- (h)(1) selecting for display to the customer the data relating to those products having suitability ratings higher than a predetermined level.

25. The method according to claim 23 wherein the selection of products in step (h) also comprises the step of:
- (h)(2) randomly mixing the order of the data relating to the products selected in step (h)(1);
- wherein the data relating to the products is displayed in step (i) in the order determined by the random mixing of step (h)(2).

26. The method according to claim 23 further comprising the steps of:
- (i)(1) requesting the customer to indicate whether he desires to view data relating to more products in addition to the data displayed in step (i);
- (i)(2) receiving a customer indication of a desire to view more data;
- (i)(3) selecting for further display to the customer the data relating to those products having suitability ratings below the predetermined level of step (h)(1) but higher than a second predetermined level; and
- (i)(4) displaying to the customer the data selected in step (i)(3).

27. The method according to claim 13 further comprising the step of:
- (h)(1) ranking the social expression product designs in the order of their suitability ratings and selecting for display to the customer the data relating to those products having suitability ratings higher than a predetermined level;
- wherein the data relating to the products is displayed in step (i) in order of the suitability ratings of the products, from the highest to the lowest.

28. The method according to claim 27 further comprising the steps of:
- (i)(1) requesting the customer to indicate whether he desires to view data relating to more products in addition to the data displayed in step (i);
- (i)(2) receiving a customer indication of a desire to view more data;
- (i)(3) selecting for further display to the customer the data relating to those products having suitability ratings below the predetermined level of step (h)(1) but higher than a second predetermined level; and
- (i)(4) displaying to the customer the data selected in step (i)(3).

29. The method according to claim 13 further comprising the step of:

(k)(1) changing the expert judgment factors for the product components of the product selected by the customer in step (k) by an amount that reflects the determination by one customer that the selected product, including its product components, best suits the customer's needs as identified by the criteria received by the customer in step (d).

30. The method according to claim 29 further comprising the step of:

(k)(2) changing the expert judgment factors for the product components of the products not selected by the customer in step (k) by amounts that reflect the determination by one customer that the non-selected products, including their product components, were not best suited for the customer's needs as identified by the criteria received by the customer in step (d).

31. The method according to claim 30 further comprising the steps of:

(k)(3) communicating the changes in expert judgment factors performed in steps (k)(1) and (k)(2) to the computers of other apparatus having data storage devices that store data relating to the same product components; and (i)(4) receiving like changes in expert judgment factors for product components from the other data storage devices and making similar changes in the same expert judgment factors for the same product components stored in the first mentioned data storage device.

32. The method according to claim 13 further comprising the steps of:

(b)(1) identifying each product component by a charge code; and (k)(1) calculating and displaying to the customer a fee based on the charge codes of the product components of the product design selected by the customer.

33. A method of storing and selectively retrieving product data, comprising the steps of:

(a) storing product data relating to a plurality of product components in a data storage device;

(b) identifying the data relating to each product component by a category indicia;

(c) further identifying the data relating to each product component by a plurality of expert judgment factors, each expert judgment factor being a numerical value indicative of the product component's suitability for a specific customer need;

(d) requesting a customer to specify a set of criteria, each criterion having a corresponding expert judgment factor;

(e) receiving from the customer the set of criteria requested in step (d) (f) calculating a suitability rating for each stored product component by combining by algorithm those expert judgment factors corresponding to the criteria received from the customer; (g) based on the suitability ratings of the product components calculated in step (f), selecting for display to the customer a group of those product components from each category, as identified by the category indicia of the data relating to those product components;

(h) displaying to the customer the data relating to the product components selected in step (g);

(i) requesting the customer to select from the product components whose data are displayed in step (h) a component from each category represented by the category indicia of the data displayed in step (i);

(j) receiving the customer's selection of product components; and (k) delivering to the customer a product or data relating to a product made of the product components selected in step (i).

34. The method according to claim 33 further comprising the steps of:

(b)(1) identifying the product components with matching indicia indicating which product components would fit well together;

(j)(1) comparing the matching indicia of the product components selected by the customer in response to the request of step (i);

(j)(2) requesting the customer to select another component or components if the components first selected by the customer do not have matching indicia that match each other;

(j)(3) and repeating steps (j)(2) and (j)(3) until the product components selected by the customer have matching indicia that match each other.

35. The method according to claim 34 further comprising the steps of:

(j)(4) requesting the customer to input changes to the product components selected by the customer in response to the request of step (i); and (j)(5) receiving the changes input by the customer and making those changes to the selected product components.

36. An apparatus that stores and selectively retrieves product data, comprising:

(a) a data storage device in which are stored data relating to a plurality of products and a plurality of expert judgment factors identifying each product and being numerical values that are indicative of the product's suitability for a specific customer need;

(b) a display device that displays for the customer choices of criteria having a corresponding expert judgment factor;

(c) a customer input device connected to the display device that receives the criteria selected by the customer;

(d) a computer that is connected to the customer input device and receives customer selected criteria from said input device, said computer also being connected to the data storage device and receiving from the data storage device the factors identifying the data relating to each product, the computer having stored therein an algorithm that calculates the suitability rating of each product based on the expert judgment factors received from the data storage device that corresponds to the criteria received from the customer input device;

the display device (b) being connected to the computer and receiving from the computer data relating to the products in an order based on their suitability ratings and displaying the data to the customer in said order, the customer input device receiving the customer's selection of a product from among those products whose data are displayed by the display device; and (f) a delivery device that is connected to the computer and delivers the product or data relating to the product selected by the customer.

37. Apparatus that stores and selectively retrieves product data comprising:

(a) a data storage device in which are stored data relating to a plurality of product components and a plurality of expert judgment factors identifying each product component and being numerical values that are indicative of the product component's suitability for a specific customer need;

(b) a display device that displays for the customer choices of criteria having a corresponding expert judgment factor;

(c) an customer input device connected to the display device that receives the criteria selected by the customer;

(d) a computer that is connected to the customer input device and receives customer selected criteria from said input device, said computer also being connected to the data storage device and receiving from the data storage device the factors identifying the data relating to each product component, the computer having stored therein a first algorithm that calculates the suitability rating of each product component based on the expert judgment factors received from the data storage device that correspond to the criteria received from the customer input device, the computer having stored therein a second algorithm that calculates the suitability rating of products having a plurality of product components, based on the suitability ratings of the product components;

said display device being connected to the computer and receiving from the computer data relating to the products in an order based on their suitability ratings and displaying to the customer the data to the customer in said order, said customer input device receiving the customer's selection of a product from among those products whose data are displayed by the display device; and (f) a delivery device that is connected to the computer and delivers the product or data relating to the product selected by the customer.

38. The apparatus of claim 37 wherein said data storage device (a) has a product design file including:

(a)(1) a partition in which are stored data relating to a plurality of product components and a plurality of expert judgment factors identifying each product component that are indicative of the product component's suitability for a specific customer need; and (a)(2) a partition in which are stored separability and replaceability data indicating which product components can be omitted from their associated product designs and which product components may be replaced by other product components.

39. The apparatus of claim 38 wherein the product design file also includes:

(a)(3) a partition in which are stored commands for removing, adding, positioning, displaying or delivering data relating to separable or replaceable components.

40. The apparatus of claim 39 wherein the product design file also includes:

(a)(4) a partition in which are stored data relating to spare components not associated with any one product.

41. The apparatus of claim 40 wherein the product design file also includes:

(a)(5) a partition in which are stored data relating to customizing components that can be retrieved by the computer (d) and inserted in the data of products selected by the customer.

42. A plurality of apparatus of claim 37, wherein the computers of all of the apparatus are connected to a common printer that receives and prints social expression product designs selected by customers of all of said apparatus.

43. A plurality of apparatus of claim 37, wherein the computers of all of the apparatus are connected to each other in a network and data relating to customer selections and rejections of products received by each computer are communicated to the other computers in the network, enabling each computer to change the expert judgment factors in its associated data storage device based on customer selections and rejections of products received by the other computers.

* * * * *